(12) United States Patent
Hao et al.

(10) Patent No.: US 12,547,372 B2
(45) Date of Patent: Feb. 10, 2026

(54) DISPLAY APPARATUS AND DISPLAY METHOD

(71) Applicants: VIDAA USA, INC., Suwanee, GA (US); VIDAA (NETHERLANDS) INTERNATIONAL HOLDINGS B.V., Duiven (NL)

(72) Inventors: Yunying Hao, Suwanee, GA (US); Zhen Wang, Suwanee, GA (US); Yuxi Li, Suwanee, GA (US); Hongxun Huang, Suwanee, GA (US); Zhaolong Zhu, Suwanee, GA (US); Yakai Lu, Suwanee, GA (US); Qi Chen, Suwanee, GA (US)

(73) Assignees: VIDAA USA, INC.; VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 330 days.

(21) Appl. No.: 18/278,537

(22) PCT Filed: Mar. 15, 2022

(86) PCT No.: PCT/US2022/020435
§ 371 (c)(1),
(2) Date: Aug. 23, 2023

(87) PCT Pub. No.: WO2022/197737
PCT Pub. Date: Sep. 22, 2022

(65) Prior Publication Data
US 2024/0053957 A1 Feb. 15, 2024

(30) Foreign Application Priority Data
Mar. 15, 2021 (CN) .................. 202110277130.X
Mar. 17, 2021 (CN) .................. 202110286305.3
(Continued)

(51) Int. Cl.
G06F 3/16 (2006.01)

(52) U.S. Cl.
CPC .................. *G06F 3/167* (2013.01)

(58) Field of Classification Search
None
See application file for complete search history.

(56) References Cited

U.S. PATENT DOCUMENTS 11,422,772 B1 * 8/2022 Mutagi .................. G10L 15/02
2003/0105637 A1 6/2003 Rodriguez et al.
(Continued)

FOREIGN PATENT DOCUMENTS

CN 101516005 A 8/2009
CN 102196204 A 9/2011
(Continued)

OTHER PUBLICATIONS

Sony (https://www.youtube.com/watch?v=fsRW7dDHa8I&t=1s) (Year: 2019).*

(Continued)

*Primary Examiner* — Jonathan C Kim
(74) *Attorney, Agent, or Firm* — Meunier Carlin & Curfman LLC

(57) ABSTRACT

Disclosed are a display apparatus, and display method. The display apparatus includes a display, a control device configured to control the display apparatus and including a power key and a shortcut key for voice control, a voice receiving device configured for receiving voice content from a user and a controller, in connection with the display, the control device and the voice receiving device.

9 Claims, 53 Drawing Sheets

(30) Foreign Application Priority Data

Mar. 19, 2021 (CN) .......................... 202110296619.1
Apr. 6, 2021 (CN) .......................... 202110368889.9
Jun. 30, 2021 (CN) .......................... 202110738814.5

(56) References Cited

U.S. PATENT DOCUMENTS

| | | |
|---|---|---|
| 2003/0234824 A1 | 12/2003 | Litwiller |
| 2006/0217985 A1 | 9/2006 | Noguchi et al. |
| 2007/0005370 A1 | 1/2007 | Elshout |
| 2010/0313219 A1 | 12/2010 | Jung |
| 2014/0136205 A1* | 5/2014 | Jang ................ H04N 21/42203 704/249 |
| 2014/0181865 A1* | 6/2014 | Koganei ............ H04N 21/4312 725/38 |
| 2014/0223477 A1 | 8/2014 | Han et al. |
| 2014/0245339 A1* | 8/2014 | Zhang ................ H04N 21/8358 725/18 |
| 2015/0029089 A1 | 1/2015 | Kim |
| 2015/0160919 A1 | 6/2015 | Kim et al. |
| 2015/0382047 A1* | 12/2015 | Van Os ............ H04N 21/41265 725/38 |
| 2016/0007083 A1 | 1/2016 | Gurha |
| 2016/0210966 A1* | 7/2016 | Koganei ................ G10L 15/22 |
| 2017/0006329 A1* | 1/2017 | Jang .................. H04N 21/4782 |
| 2017/0076724 A1* | 3/2017 | Park ....................... G06F 16/00 |
| 2017/0154625 A1* | 6/2017 | Heo ................. H04N 21/42203 |
| 2018/0144745 A1* | 5/2018 | Park ..................... H04N 21/266 |
| 2018/0167516 A1* | 6/2018 | Warrick ............... G05B 19/042 |
| 2018/0191670 A1* | 7/2018 | Suyama ................ H04L 67/125 |
| 2019/0147848 A1* | 5/2019 | Mai .......................... G10L 15/26 181/206 |
| 2020/0194007 A1 | 6/2020 | Fan et al. |
| 2020/0211563 A1* | 7/2020 | Arunachalam ......... G10L 15/30 |
| 2022/0053228 A1* | 2/2022 | Kameoka ................ G10L 15/30 |
| 2022/0057989 A1* | 2/2022 | Watanabe ............. G06F 3/0485 |
| 2022/0167040 A1* | 5/2022 | Richardson .......... H04R 29/004 |
| 2022/0406300 A1* | 12/2022 | Verhoeve ................ G10L 15/22 |
| 2023/0054251 A1* | 2/2023 | Kim ........................ G10L 15/18 |
| 2024/0053957 A1* | 2/2024 | Hao ....................... G06F 3/0482 |
| 2024/0121464 A1* | 4/2024 | Li .................... H04N 21/42228 |
| 2024/0221739 A1* | 7/2024 | Prasad ................... G10L 15/22 |
| 2024/0302937 A1* | 9/2024 | Chen ..................... G06F 3/0483 |
| 2025/0085774 A1* | 3/2025 | Vertegaal ................ G10L 15/22 |

FOREIGN PATENT DOCUMENTS

| | | |
|---|---|---|
| CN | 103474068 A | 12/2013 |
| CN | 103634644 A | 3/2014 |
| CN | 105574101 A | 5/2016 |
| CN | 105897854 A | 8/2016 |
| CN | 205787647 U | 12/2016 |
| CN | 107527614 A | 12/2017 |
| CN | 108877791 A | 11/2018 |
| CN | 109243444 A | 1/2019 |
| CN | 109547840 A | 3/2019 |
| CN | 109656501 A | 4/2019 |
| CN | 110737840 A | 1/2020 |
| CN | 111142837 A | 5/2020 |
| CN | 111324041 A | 6/2020 |
| CN | 111526402 A | 8/2020 |
| CN | 111726673 A | 9/2020 |
| CN | 112118400 A | 12/2020 |
| CN | 112153440 A | 12/2020 |
| CN | 112165641 A | 1/2021 |
| CN | 112435665 A | 3/2021 |
| CN | 112565849 A | 3/2021 |
| CN | 113038217 A | 6/2021 |
| JP | 2002022865 A | 1/2002 |
| WO | 2018121767 A1 | 7/2018 |

OTHER PUBLICATIONS

Showhow2 (https://www.youtube.com/watch?v=FJUM37-hiuY) (Year: 2012).*
CIPO First Office Action, 2021102966191 dated Jul. 21, 2023.
Henshaws, "Bibliographic information for 'Using your TV through voice control!'", XP93175576, Retrieved from the internet: URL: https://www.youtube.com/watch?v=P8pcBLybcHo, Jul. 16, 2018.
Tampatec, "Bibliographic information for 'Samsung TV Motion & Voice Control Demo'", XP93176407, Retrieved from the internet: URL: https://www.youtube.com/watch?v=8b9CNZRL_ec&lc= UgyHiYZ-KAdVLTKqcg94AaABAg, Jun. 27, 2012.
Anonymous, "Q60T QLED Smart 4K TV (2020) e-manual" Apr. 3, 2020, XP093207780, p. 74.
Anonymous, "Q60T QLED Smart 4K TV (2020) User Manual 80T 70T 60T" Apr. 2, 2020, XP093175828, p. 10.
International Search Report issued in PCT/US2022/020435, Mailed Jun. 7, 2022.
English translation of Chinese Office Action issued in CN202110738814. 5, mailed Dec. 5, 2022.
Office Action issue for Chinese Application No. 202110277130.X, dated Feb. 3, 2024.
Office Action issue for Chinese Application No. 202110286305.3, dated Feb. 24, 2024.
Office Action issue for Chinese Application No. 202110368889.9, Oct. 29, 2023.

* cited by examiner

| Input Names | |
|---|---|
| ANT /CABLE<br>ANT /CABLE | > |
| AV<br>AV | > |
| HDMI 1<br>HDMI 1 | > |
| HDMI 2<br>HDMI 2 | > |
| HDMI 3<br>HDMI 3 | > |
| VIDAA Plus<br>VIDAA Plus | > |

Fig. 6

| Input Names | |
|---|---|
| ANT /CABLE<br>ANT /CABLE | > |
| AV<br>AV | > |
| HDMI 1<br>HDMI 1 | > |
| HDMI 2<br>HDMI 2 | > |
| HDMI 3<br>home | > |
| VIDAA Plus<br>VIDAA Plus | > |

Fig. 7

| Input Names | |
|---|---|
| ANT /CABLE<br>ANT /CABLE | > |
| AV<br>AV | > |
| HDMI 1<br>HDMI 1 | > |
| HDMI 2<br>HDMI 2 | > |
| HDMI 3<br>☐ | > |
| VIDAA Plus<br>VIDAA Plus | > |

Fig. 9

DISPLAY APPARATUS AND DISPLAY METHOD

CROSS-REFERENCE TO RELATED APPLICATIONS

The present application is a National Stage of International Application No. PCT/US2022/020435 filed Mar. 15, 2022, which claims the priorities of the Chinese patent applications No. 202110277130.X filed on Mar. 15, 2021, No. 202110286305.3 filed on Mar. 17, 2021, No. 202110296619.1 filed on Mar. 19, 2021, No. 202110368889.9 filed on Apr. 6, 2021, and No. 202110738814.5 filed on Jun. 30, 2021. The entire contents of these applications are incorporated herein by reference.

FIELD

The present disclosure relates to display technology, in particular to a display apparatus and display method.

BACKGROUND

At present, in order to bring more convenient operations for users, a voice function is widely applied to a display apparatus. The users may use a control device such as a remote control that matches with the display apparatus to input a voice command to the display apparatus, and control the display apparatus through voice to perform related operations, so that the users can obtain expected media resources or certain functions more conveniently.

SUMMARY

An embodiment of the present disclosure provides a display apparatus. The display apparatus includes: a display; a control device configured to control the display apparatus and including a power key and a shortcut key for voice control; a voice receiving device configured for receiving voice content from a user; and a controller, in connection with the display, the control device and the voice receiving device and configured to: in response to a starting command for starting the display apparatus from the user, determining a starting manner of the starting command, wherein the starting manner includes starting via the power key on a remote control, starting via the shortcut key for voice control and starting via the voice receiving device; in response to the starting manner being starting via the power key, present first prompt information for indicating starting the display apparatus via voice control; in response to the starting manner being starting via the shortcut key, present second prompt information for indicating starting the display apparatus via a voice control manner different from a current starting manner; and in response to the starting manner being starting via the voice receiving device, present no prompt information for indicating interaction via voice control.

An embodiment of the present disclosure provides a display method. The method includes: in response to a starting command for starting the display apparatus from a user, determining a starting manner of the starting command, wherein the starting manner comprises starting via a power key on a remote control, starting via a shortcut key for voice control and starting via a voice receiving device; in response to the starting manner being starting via the power key, presenting first prompt information for indicating starting the display apparatus via voice control; in response to the starting manner being starting via the shortcut key, presenting second prompt information for indicating starting the display apparatus via a voice control manner different from a current starting manner; and in response to the starting manner being starting via the voice receiving device, presenting no prompt information for indicating interaction via voice control.

An embodiment of the present disclosure provides a non-transitory computer storage medium, wherein the computer storage medium stores computer instructions which are configured to cause the computer to perform embodiments of the present disclosure.

BRIEF DESCRIPTION OF THE DRAWINGS

FIG. 6 shows a schematic diagram of a channel name page according to some embodiments of the present disclosure.

FIG. 7 shows a second schematic diagram of a channel name page according to some embodiments of the present disclosure.

FIG. 9 shows a third schematic diagram of a channel name page according to some embodiments of the present disclosure.

DETAILED DESCRIPTION OF THE EMBODIMENTS

In order to make the schemes of the present disclosure more clear, the embodiments of the present disclosure will be described with reference to the drawings in the embodiments of the present disclosure. Obviously, the embodiments are part of the embodiments of the present disclosure, but not all the embodiments.

It should be noted that the brief description of the terms in the present disclosure is for convenience of understanding the following implementations, and is not intended to limit the present disclosure. Unless otherwise noted, these terms should be understood according to their common and usual meanings.

Figure 1:
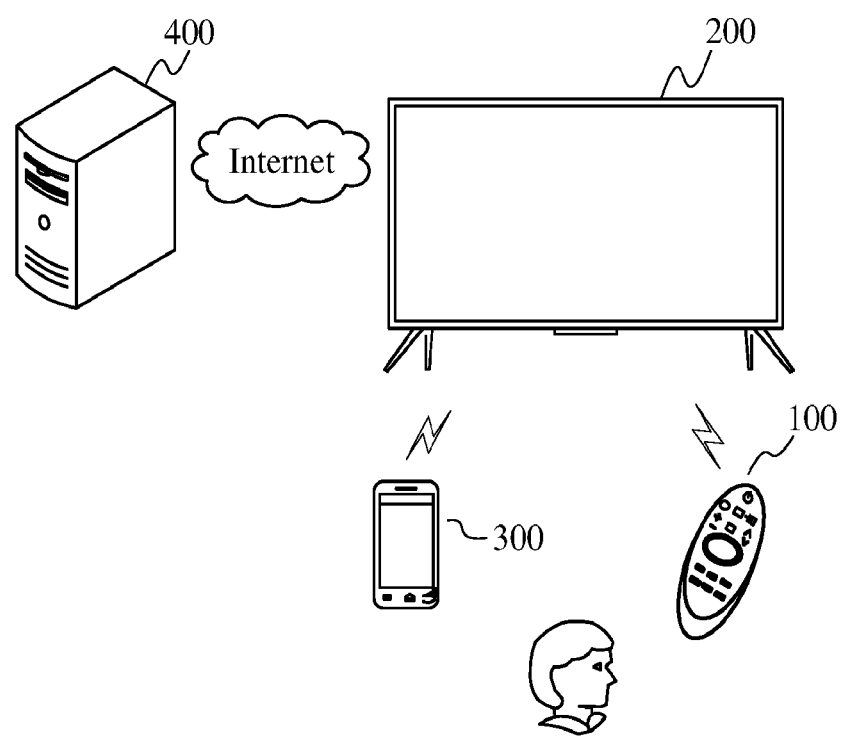
FIG. 1 shows a schematic diagram of a scenario of a display apparatus according to some embodiments of the present disclosure.

FIG. 1 shows a schematic diagram of a scenario of a display apparatus according to some embodiments of the present disclosure. As shown in FIG. 1, a display apparatus 200 is in data communication with a server 400. A user may operate the display apparatus 200 through a smart device 300 or a control device 100.

The control device 100 may be a remote control. Communications between the remote control and the display apparatus 200 include at least one of infrared protocol communication, Bluetooth protocol communication, or other short-distance communication manners. The control device 100 controls the display apparatus 200 in a wireless or wired manner. The user may control the display apparatus 200 by inputting a user command by adopting at least one of input methods such as key input on the remote control, voice input, and control panel input, etc.

The smart device 300 may include any one of a mobile terminal, a tablet computer, a computer, a notebook computer, an augmented reality (AR) device, a virtual reality (VR) device, or the like.

The user uses the smart device 300 to control the display apparatus 200. For example, the user uses an application running on the smart device 300 to control the display apparatus 200.

The smart device 300 is in data communication with the display apparatus 200.

The display apparatus 200 may be controlled by adopting a manner other than the control device 100 and the smart device 300. For example, a component for obtaining a voice command inside the display apparatus 200 directly receives voice command from a user, or a voice control device disposed outside the display apparatus 200 receives voice command from the user.

The display apparatus 200 is in data communication with the server 400. The display apparatus 200 is in communication with the server 400 through a local area network (LAN), a wireless local area network (WLAN) or other networks. The server 400 may provide various contents and interactions for the display apparatus 200. The server 400 may be one or more clusters, and may include one or more kinds of servers.

Figure 2:
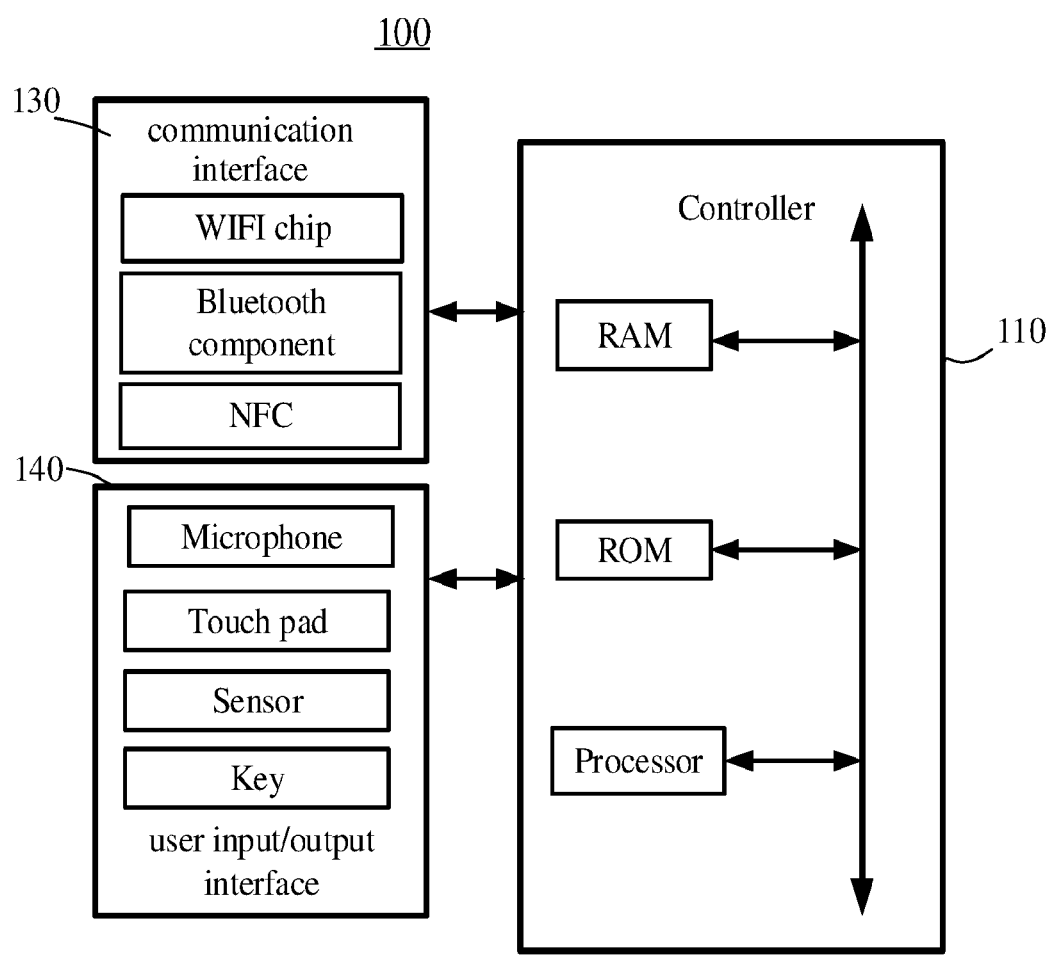
FIG. 2 shows a block diagram of hardware configuration of a control device 100 according to some embodiments of the present disclosure.

FIG. 2 shows a block diagram of hardware configuration of a control device 100 according to some embodiments of the present disclosure. As shown in FIG. 2, the control device 100 includes a controller 110, a communication interface 130, a user input/output interface 140, a memory (such as a random access memory (RAM) and a read-only memory (ROM)), a power supply (not shown in FIG. 2) and a processor.

The control device 100 receives an operation command input from the user, and converts the operation command into an instruction which can be identified and responded by the display apparatus 200. The control device 100 is configured to realize an interaction between the user and the display apparatus 200.

The communication interface 130 is configured to communicate with an external device. The communication interface 130 includes at least one of a WIFI chip, a Bluetooth component, a near field communication (NFC) component or an alternative component.

The user input/output interface 140 includes at least one of a microphone, a touch pad, a sensor, a key or an alternative component.

Figure 3:
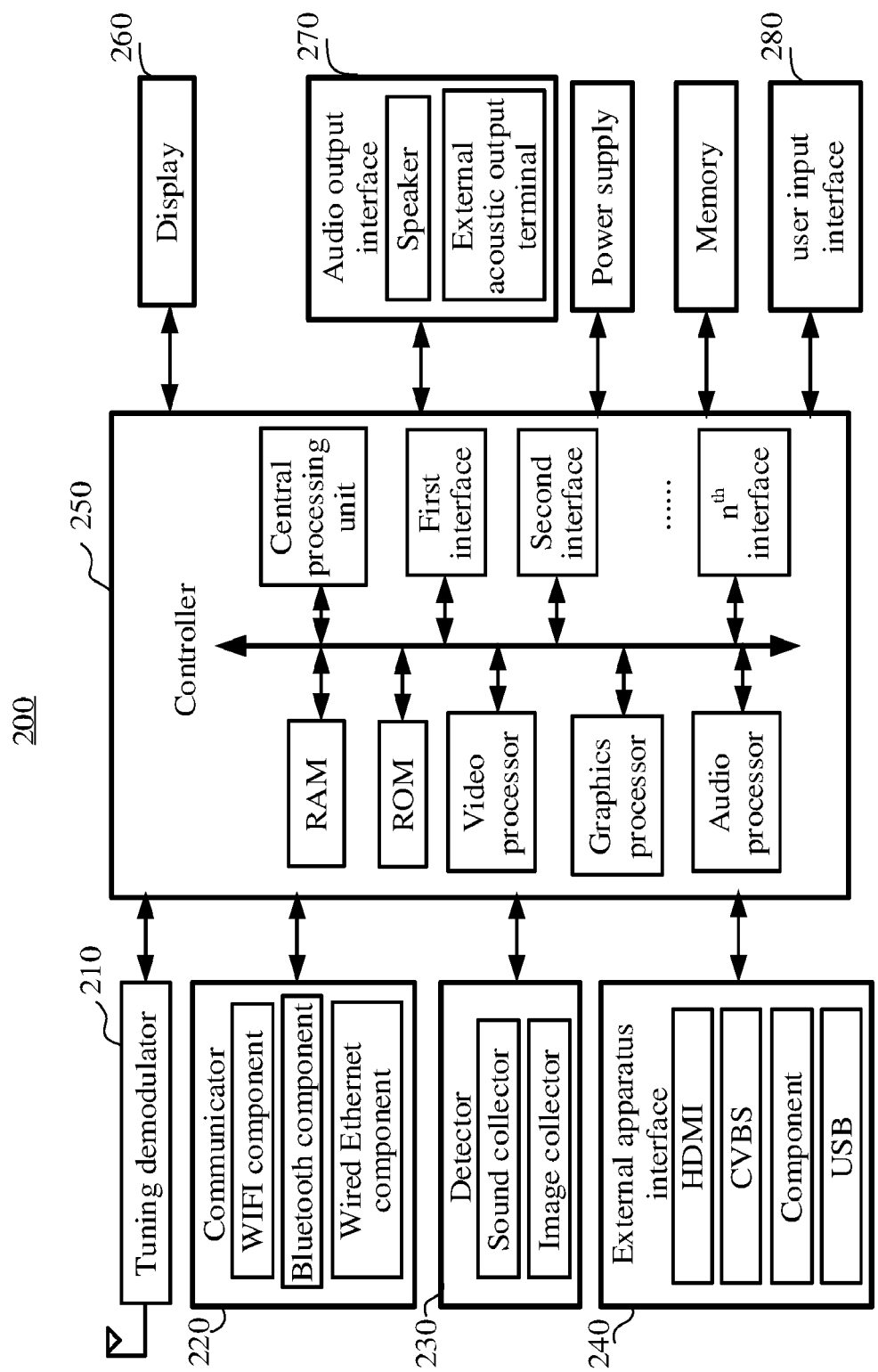
FIG. 3 shows a block diagram of hardware configuration of a display apparatus 200 according to some embodiments of the present disclosure.

FIG. 3 shows a block diagram of hardware configuration of a display apparatus 200 according to some embodiments of the present disclosure.

The display apparatus 200 includes at least one of a tuning demodulator 210, a communicator 220, a detector 230, an external apparatus interface 240, a controller 250, a display 260, an audio output interface 270, a memory, a power supply, or a user interface 280.

The controller 250 includes a central processing unit, a video processor, an audio processor, a graphics processor, an RAM, an ROM, and a first interface to an nth interface for user input/output, wherein n is an integer greater than or equal to 1.

The display 260 includes a panel configured to present a picture and a driving component for driving image display. The display 260 is configured to receive an image signal output from the controller 250, and present video content, image content, components of a menu manipulation interface, a user manipulation user interface (UI), and the like. The display 260 may be at least one of a liquid crystal display, an organic light-emitting diode (OLED) display, or a projection display, and may also be a projection apparatus and a projection screen.

The tuning modulator 210 receives a broadcast television signal in a wired or wireless manner, and demodulates an audio and video signal, such as an electronic program guide (EPG) data signal, from a plurality of wireless or cable broadcast television signals.

The communicator 220 is configured to communicate with an external device or a server according to various communication protocols. For example, the communicator 220 may include at least one of a WiFi component, a Bluetooth component, a wired Ethernet component, and other network communication protocol chips or near field communication protocol chips, or an infrared receiver. The display apparatus 200 may send or receive a control signal and a data signal to the control device 100 or the server 400 through the communicator 220.

The detector 230 is configured to collect a signal from an external environment or a signal interacting with the outside. For example, the detector 230 includes an optical receiver and a sensor configured to collect an ambient light intensity; or the detector 230 includes an image collector, such as a camera, which may be configured to collect an external environment scenario, user attributes or user interaction gesture; or the detector 230 includes a sound collector, such as a microphone, for receiving external sound.

The external apparatus interface 240 may include but is not limited to the following interfaces: a high definition multimedia interface (HDMI), an analog or data high-definition component input interface (component), a composite video input interface (a composite video broadcast signal (CVBS)), a universal serial bus (USB) input Interface (USB), or a RGB port. Alternatively, the external apparatus interface 240 may also be a composite input/output interface formed by the above plurality of interfaces.

The controller 250 and the tuning modulator 210 may be located in individual devices. That is, the tuning modulator 210 may also be in an external device of a main body device where the controller 250 is located, such as an external set top box.

The controller 250 controls work of the display apparatus and responds to operations of the user through various software control programs stored on the memory. The controller 250 controls an overall operation of the display apparatus 200. For example, in response to a user command for selecting a UI object to display on the display 260, and the controller 250 may execute an operation relevant to the object selected by the user command.

The object may be any one of optional objects, such as a hyperlink, an icon or other operable controls. The operation relevant to the selected object is: an operation of displaying connection to a hyperlink page, a file, an image and the like, or an operation of executing an application corresponding to the icon.

The controller 250 includes at least one of a central processing unit (CPU), a video processor, an audio processor, a graphics processor (GPU), an RAM, an ROM, a first interface to an $n^{th}$ interface for inputting/outputting, a communication bus or the like.

CPU is configured to run an operation system and application instructions stored in the memory, and execute various applications, data and contents according to various interaction instructions input externally, so as to finally display and play various audio and video contents. The CPU may include a plurality of processors. For example, the CPU includes a main processor and one or more sub-processors.

The graphics processor is configured to generate various graphic objects, such as at least one of an icon, an operation menu, a display graphic of a command input from a user or the like. The graphics processor includes an arithmetic unit, which performs computation by receiving various interaction commands input from the user and displays various objects according to a display attribute. The graphics processor further includes a renderer, for rendering various objects obtained based on the arithmetic unit. The above rendered objects are presented on the display.

The video processor is configured to receive an external video signal, and then perform video processing on the received external video signal according to a standard codec protocol of an input signal to obtain a signal that can be directly displayed or played on the display apparatus 200.

The audio processor is configured to receive an external audio signal and perform at least one of decompression, decoding, noise reduction, digital-to-analog conversion or amplifying processing on the audio signal according to a standard encoding and decoding protocol of the input audio signal to obtain a sound signal which can be played in a speaker.

The user may input a command on a graphical user interface (GUI) displayed on the display 260, and then the user input interface receives the command input from the user through the graphical user interface (GUI). Alternatively, the user may input the command by inputting a specific sound or gesture, and then the user input interface identifies the sound or gesture through a sensor so as to receive the command input from the user.

In some embodiments, the user input interface 280 is an interface (such as a physical key on a display apparatus body) configured to receive control input.

The system of the display apparatus may include a kernel, a command parser (shell), a file system and an application. The kernel, the shell and the file system constitute a basic operation system. The operation system makes the user to manage a file, run programs and use the system. After the display apparatus is powered on, the kernel is started to activate a kernel space, abstract hardware, initialize hardware parameters and the like, and run and maintain a virtual memory, a scheduler, and signal and inter-process communication (IPC). After the kernel is started, the shell and the user applications are loaded. The applications are compiled to machine codes after being launched, to form progresses.

Figure 4:
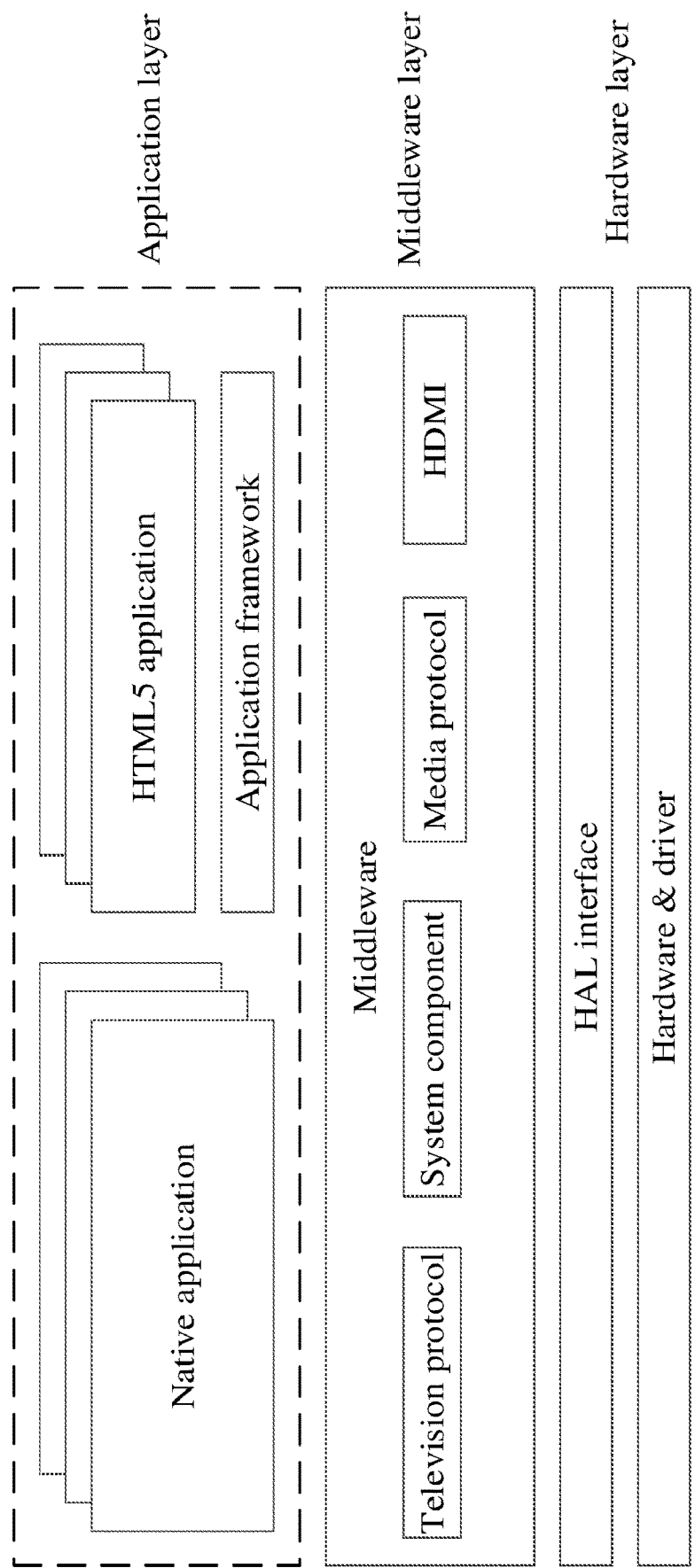
FIG. 4 shows a software configuration diagram in a display apparatus 200 according to some embodiments of the present disclosure.

As shown in FIG. 4, a system of the display apparatus includes three layers: an application layer, a middleware layer and a hardware layer from top to bottom respectively.

The application layer mainly includes common applications on television and an application framework. The common application is mainly applications developed based on a browser, such as HTML5 Applications (Apps) and a native application (native APPs).

The application framework is a complete program model, and has all basic functions required by standard application software, such as file access and data exchange. The application framework further includes use interfaces (such as a toolbar, status bar, a menu and a dialog box) of these functions. The native application may support online or offline, and message push or local resource access.

The middleware layer includes middleware such as various television protocols, multimedia protocols and system components. The middleware may use a basic service or function provided by the system software, to link applications of various parts of an application system on a network or different applications, and can achieve resource sharing and function sharing.

The hardware layer mainly include a hardware abstraction layer (HAL) interface, hardware and a driver, wherein the HAL interface is a uniform interface docked with all television chips, and specific logic is implemented by all the chips. The drive mainly includes: an audio driver, a display driver, a Bluetooth driver, a camera driver, a WIFI driver, a USB driver, an HDMI driver, a sensor driver, a power driver and the like. For example, the sensor driver may be a fingerprint sensor, a temperature sensor, a pressure sensor and the like.

In the related art, the user may select different channels via voice mode, and then use different functions. For example, the HDMI interface may be connected with a power amplifier to amplify the volume of the display apparatus, a TV channel may be used to watch online videos, and a USB interface may be connected with devices such as a USB flash disk to play media resources, etc. The addition of the voice function on the display apparatus can allow the user to quickly switch the display apparatus to a target channel.

However, the realization of the voice function also depends on the function of the display apparatus and a recognition degree of the voice command itself. Many voice products rely on pronunciation of the user. If the user cannot accurately say a name of a target channel, the display apparatus cannot identify a target name for the user, and thus cannot identify a target channel to which the user wants to switch, resulting in channel switching failure.

Figure 5:
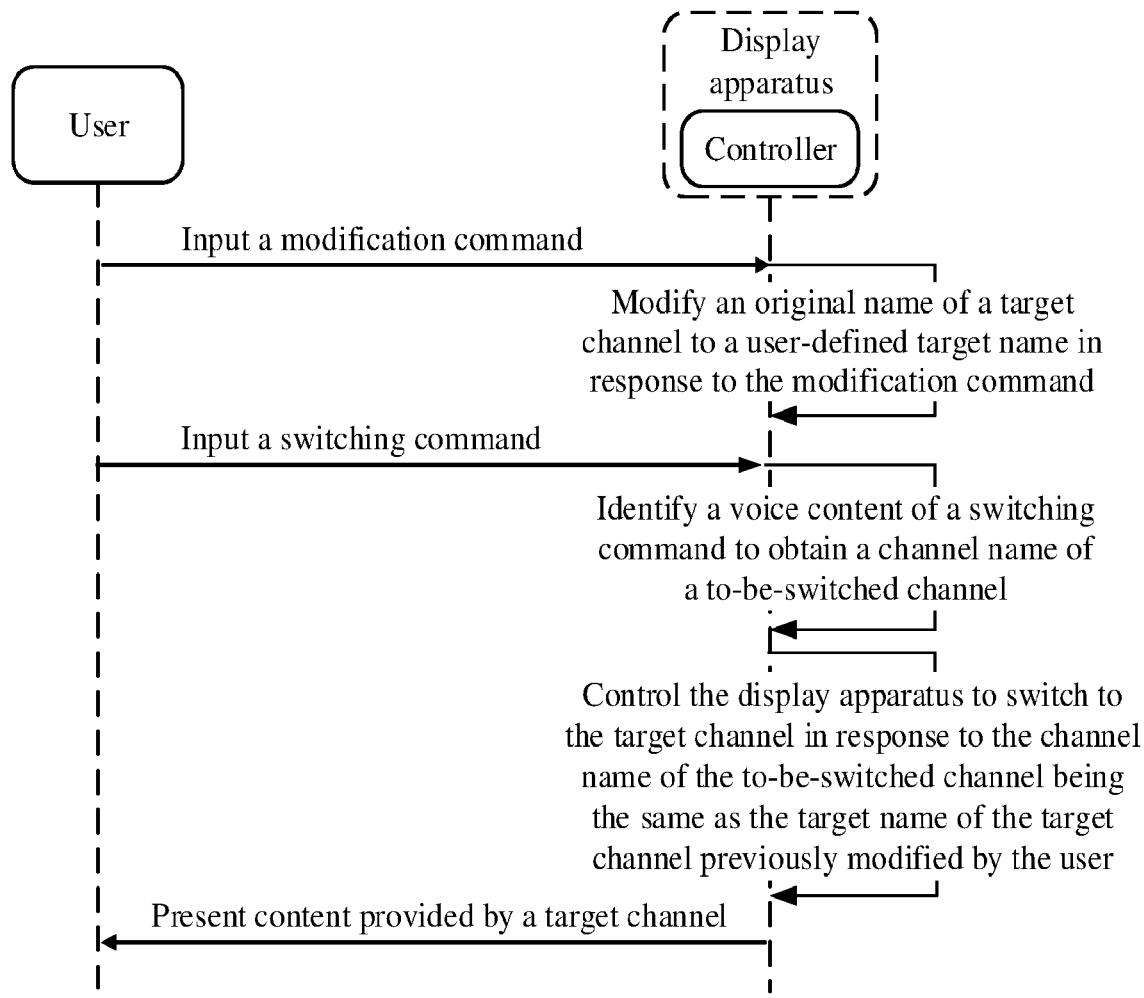
FIG. 5 shows a control flow diagram of a controller 250 according to some embodiments of the present disclosure.

FIG. 5 shows a control flow diagram of a controller 250 according to some embodiments of the present disclosure.

As shown in FIG. 5, before a user controls channel switching by voice, the controller 250 may modify a channel name of a target channel that the user cannot pronounce accurately, or modify a channel name of a target channel that the user wants to change the name according to user's requirements, and then the controller 250 may modify the channel name of the target channel to a target name that the user can pronounce accurately or a target channel that the user wants to do name change.

Usually, when modifying the channel name, the user may input a modification command to the display apparatus 200. As shown in FIG. 1, the user may input the modification command through the control device 100. The control device 100 may be a remote control or a virtual remote control installed on the smart device 300 or the like. For example, the user operates keys of the remote control, performs a selection operation on the display 260 of the display apparatus 200, and then inputs the modification command to the display apparatus 200; or, the user operates keys on the virtual remote control, performs a selection operation on the display 260 of the display apparatus 200, and then inputs the modification command to the display apparatus 200.

As shown in FIG. 5, upon receiving the modification command, the controller 250 of the display apparatus 200 will modify the original name of the target channel to a user-defined target name in response to the modification command immediately.

Usually, each channel on the display apparatus 200 has a configured original name, such as "TV", "AV", "HDMI1", "HDMI2", and "HDMI3". In some embodiments, if the user pronunciation of the original name of a certain channel is not accurate enough, the display apparatus 200 may not identify the channel corresponding to the original name. For example, if the user pronunciation of "HDMI3" is inaccurate, the user cannot control the display apparatus 200 to switch from a current channel to the "HDMI3" channel via voice control. In this case, the user needs to change the original name "HDMI3" of the "HDMI3" channel to "home", then the controller 250 will modify the original name"HDMI3" of the "HDMI3" channel to "home" in response to the command for channel modification.

Moreover, the original name is a fixed configuration of a target channel, and will exist even if a target name for the target channel has been created. Both the original name and the target name for the target channel can be identified as a channel name for the target channel.

After modifying the channel name of the target channel, the user may continue to use the display apparatus 200, and when the channel needs to switch to another channel, the user may input a switching command to the display apparatus 200 via voice command to control the display apparatus 200 to perform channel switching, for example, "switch input to home on kitchen tv", etc.

The user may input the voice content to the display apparatus 200 through the control device 100. For example, the control device 100 may be a remote control or a virtual remote control installed on the smart device 300 or the like. Alternatively, the user may also input voice content to the display apparatus 200 through a microphone in the display apparatus 200. For example, the microphone may be a MIC electronic component in the display apparatus 200 for collecting external sound, and the like.

As shown in FIG. 5, after receiving the switching command, the controller 250 of the display apparatus 200 may identify the voice content of the switching command, for example, identifying the channel name (namely, a target name) of a to-be-switched channel (namely, a target channel), such as "home".

Then, as shown in FIG. 5, the controller 250 detects whether channel names of all current channels of the display apparatus 200 are the same as the channel name of the to-be-switched channel. Wherein, some channels whose names have been modified by the user may have two names, namely the original name and the target name.

When it is detected that the channel name of the to-be-switched channel to which the user wants to switch is the same as a target name of a target channel previously modified by the user, the controller 250 controls the display apparatus 200 to switch to the target channel in response to the switching command input from the user, and then the display 260 may display contents provided by the target channel. For example, the user previously modifies the original name of the target channel HDMI3 to the target name "home", when the controller 250 identifies that the channel name of the to-be-switched channel in the voice content of the switching command input from the user is "home", the controller 250 may determine that the channel name of the to-be-switched channel is the same as the target name "home" of the previously modified target channel HDMI3. In this case, the controller 250 may control the display apparatus 200 to switch to the target channel HDMI3.

It can be seen that the controller 250 of the display apparatus 200 in the embodiments of the present disclosure may control the display 260 to present a setting page, a channel page or a resource display page required by the user, and modify the channel name of the target channel in the display apparatus 200 according to users' requirements or pronunciation habits. When the user wants to switch to the target channel again, the user can pronounce the target name of the target channel accurately, and correspondingly, the controller 250 may also accurately identify the target name and find the target channel corresponding to the target name.

FIG. 6 shows a schematic diagram of a channel name page according to some embodiments of the present disclosure. FIG. 7 shows a second schematic diagram of a channel name page according to some embodiments of the present disclosure.

The display apparatus 200 provides a plurality of channel name pages for presenting channel names to users, such as an "Input Names" page as shown in FIG. 6. FIG. 6 illustrates original names of a plurality of channels available for switching on the display apparatus 200, and each original name occupies an item bar, for example, "ANT/CABLE", "AV", "HDMI1", "HDMI2", "HDMI3", "VIDAA Plus", etc. Each item bar presents two rows of names, wherein the first row is configured to represent respective channels, which cannot be modified; and the second row is configured to present original names corresponding to the respective channels, which can be modified. If a user wants to modify an original name of a certain channel, the user may control a focus selector on the display 260 to move to different item bars. As shown in FIG. 6, if a user wants to modify an original name of the HDMI3 channel, the user may control the focus selector to move to an item bar where the HDMI3 channel is located. Then, the user modifies the original name of the HDMI3 channel as shown in FIG. 6 to "home", and the target name of the modified HDMI3 channel is shown in FIG. 7, that is, the original name of the second row in the item bar of the target channel HDMI3 is changed to the target name "home".

A channel name page is a sub-page of a certain setting page and will not be presented directly. When a user wants to view the channel name page, the user needs to input a page display command to the display apparatus 200 first, so that the display apparatus 200 will present the channel name page.

Figure 8:
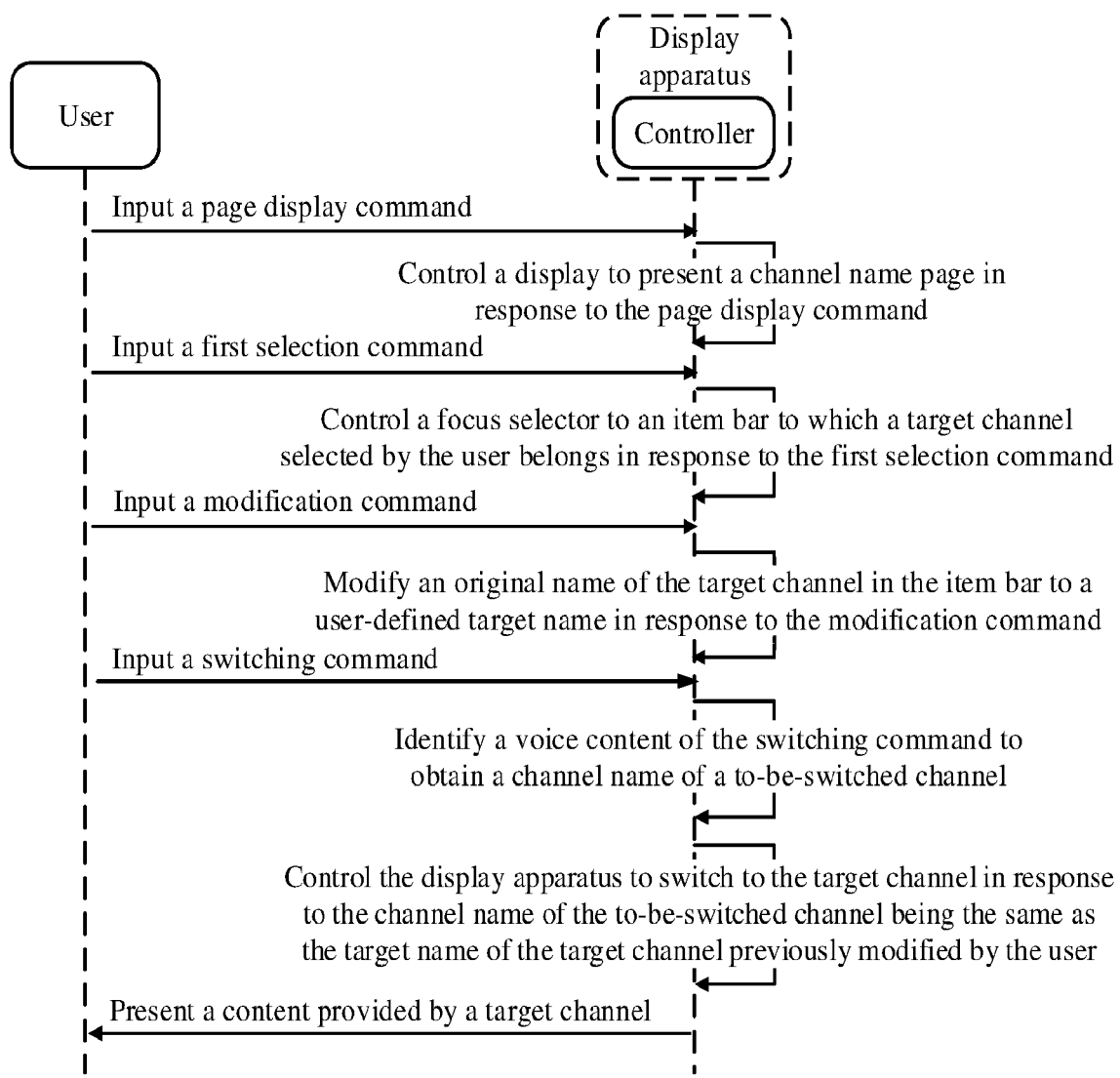
FIG. 8 shows a second control flow diagram of a controller 250 according to some embodiments of the present disclosure.

FIG. 8 shows a second control flow diagram of a controller 250 according to some embodiments of the present disclosure.

In some embodiments, after the user inputs a page display command to the display apparatus 200, the controller 250 of the display apparatus 200 receives the page display command, and controls the display 260 to display the channel name page in response to the page display command, as shown in FIG. 6. Then, the user inputs a first selection command for selecting a target channel to the display apparatus 200 by moving a focus selector on the channel name page, and the controller 250 receives and responds to the first selection command to control the focus selector to an item bar to which the target channel selected by the user belongs. Finally, the user inputs a modification command to the display apparatus 200 by modifying the channel name of the target channel at the item bar of the target channel, and the controller 250 receives and responds to the modification command to modify the original name of the target channel in the item bar to a user-defined target name, for example, "HDMI3" as shown in FIG. 6 is modified to "home" as shown in FIG. 7.

In some embodiments, the display apparatus 200 provides a user with a channel name page where channel names can be modified. The user may control the channel name page to present according to user's requirements, and select a name of the target channel on the channel name page for modification, and modify the name of the target channel to a target name that conforms to user's own pronunciation habits. The channel name page may intuitively display more channels for the user to select, and it is also convenient for the user to modify the channel name at any time; and the channel name page may further present the modified target name. If the user forgets the target name set by himself or herself, it may further be found on the channel name page.

FIG. 9 shows a third schematic diagram of a channel name page according to some embodiments of the present disclosure.

After the user selects the target channel HDMI3 on the channel name page as shown in FIG. 6, if the original name needs to be modified, the user needs to input a first confirmation command at the item bar of the target channel, for example, clicking an "OK" key on the remote control. At this time, an input box will be presented at a location for representing the original name of the target channel in the selected item bar, that is, the input box is present at the second row of the selected item bar, as shown in FIG. 9. The user may input a user-defined target name into the input box, and then the user inputs a second confirmation command to the display apparatus 200, such as clicking the "OK" key on the remote control. At this time, the second row of the selected item bar presents the target name, for example, presenting "home", etc.

Figure 10:
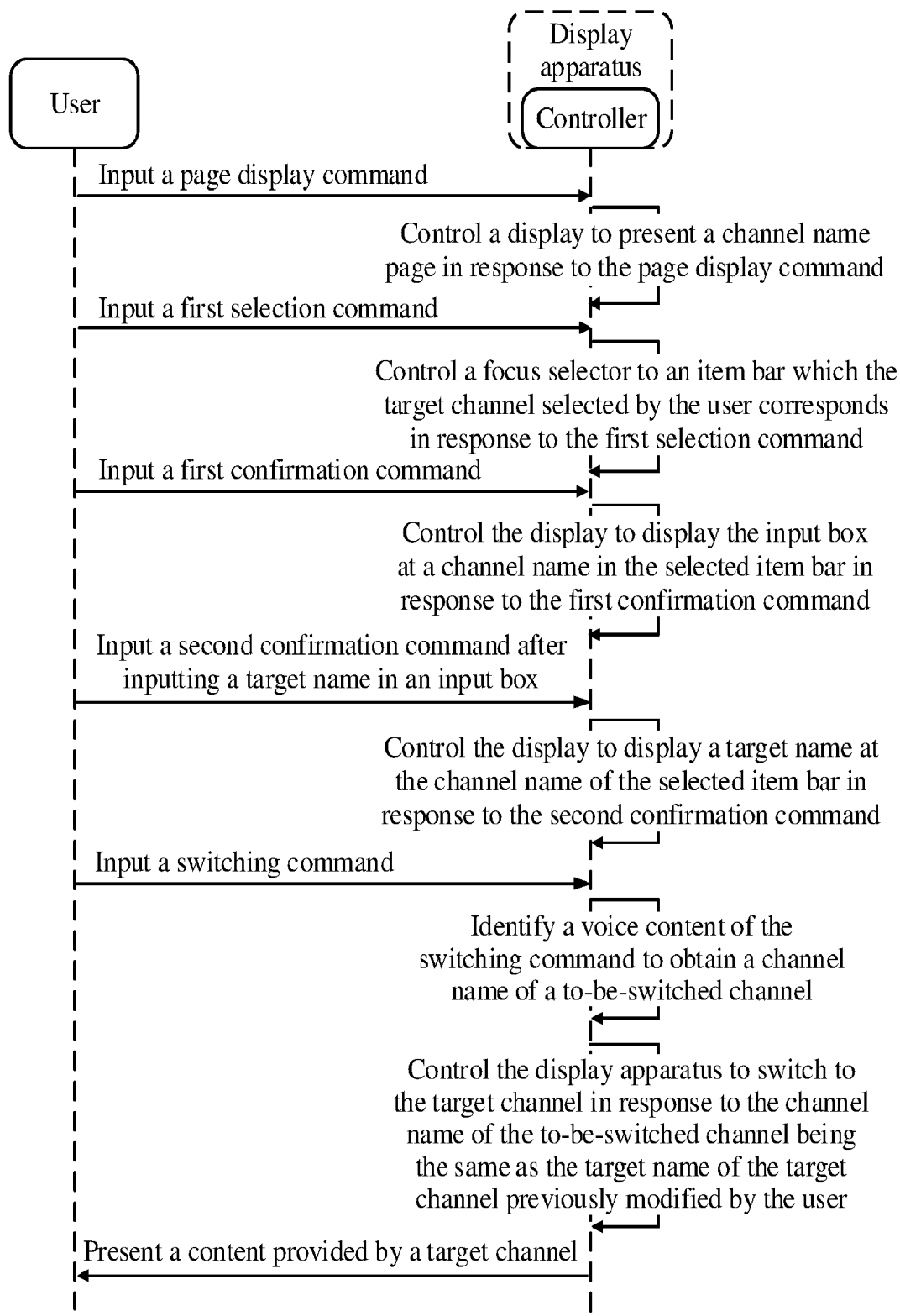
FIG. 10 shows a third control flow diagram of a controller 250 according to some embodiments of the present disclosure.

FIG. 10 shows a third control flow diagram of a controller 250 according to some embodiments of the present disclosure.

In some embodiments, after the user inputs a command for displaying a page to the display apparatus 200, the controller 250 of the display apparatus 200 receives the command, and controls the display 260 to display the channel name page in response to the command, for example, as shown in FIG. 6. Then, the user inputs a first selection command for selecting a target channel to the display apparatus 200 by moving a focus selector on the channel name page, and the controller 250 receives and responds to the first selection command, and controls the focus selector to an item bar which the target channel selected by the user corresponds. At this time, if the user wants to modify an original name of the target channel, the user needs to input a first confirmation command for presenting an input box to the display apparatus 200. The controller 250 receives and responds to the first confirmation command to control the display 260 to present the input box at the channel name in the selected item bar, that is, to present the input box at the second row of the selected item bar, as shown in FIG. 9. The user may input a user-defined target name in the input box, and input a second confirmation command to the display apparatus 200, to notify the display apparatus 200 that a name modification operation is completed. The controller 250 receives and responds to the second confirmation command to control the display 260 to present the target name at the channel name of the selected item bar, and the presented target name is shown in FIG. 7.

Figure 11:
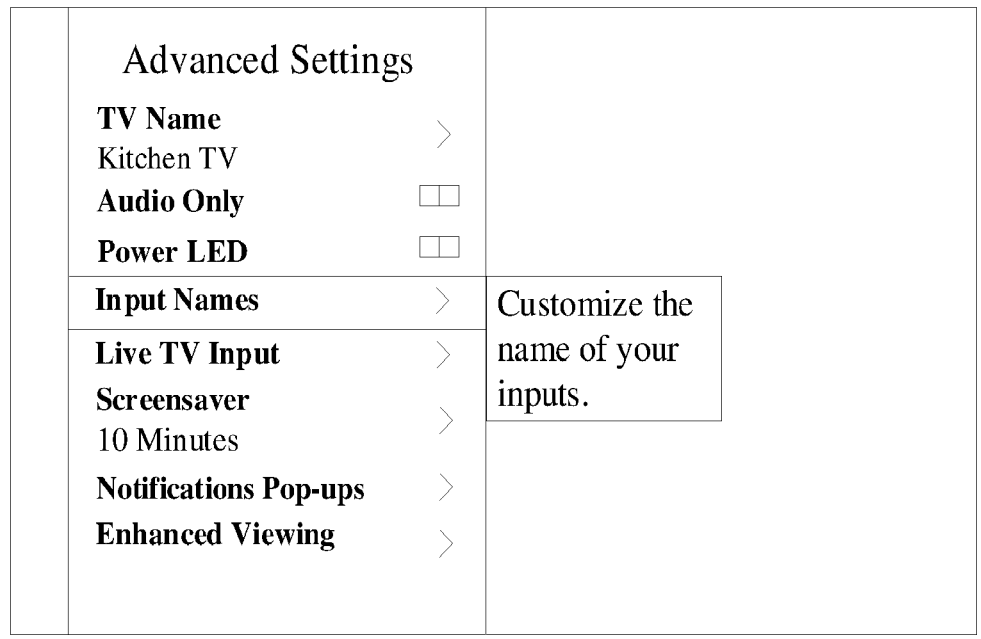
FIG. 11 shows a schematic diagram of a setting page according to some embodiments of the present disclosure.

FIG. 11 shows a schematic diagram of a setting page according to some embodiments of the present disclosure.

As described in the foregoing embodiments, the channel name page is a sub-page of a certain setting page. Therefore, the user usually needs to open the setting page on the display apparatus 200 first, and then select an item bar of the channel name page in respective item bars of the setting page, and then the display apparatus 200 presents the channel name page for the user. As shown in FIG. 11, for example, the setting page is an "Advanced Settings" page, which includes "TV Name/Kitchen TV", "Audio Only", "Power LED (a power indicator light)", "Input Names", "Live TV Input", "Screensaver/10 Minutes", "Notifications Pop-ups", "Enhanced Viewing" and other item bars. The user may move the focus selector to the "Input Names" item bar on the setting page, at this time, a prompt dialog box will be displayed on the right side, for prompting the user to "Customize the name of your inputs", etc. After the user inputs a confirmation command, the display apparatus 200 will present the channel name page corresponding to the "Input Names" item bar for the user, as shown in FIG. 6.

In some embodiments, the user may input a command to the display apparatus 200 through the remote control or the virtual remote control installed on the smart device 300. When using the remote control, the user may press a physical key and the like on the remote control; when using the virtual remote control, the user may press a virtual key and the like on the virtual remote control.

It should be noted that the remote control or the virtual remote control may further be provided with customized function keys, such as: input key, etc. This key is associated with a channel page configured to present respective channels, and after the user presses the key, the display apparatus 200 present a corresponding channel page for the user.

Figure 12:
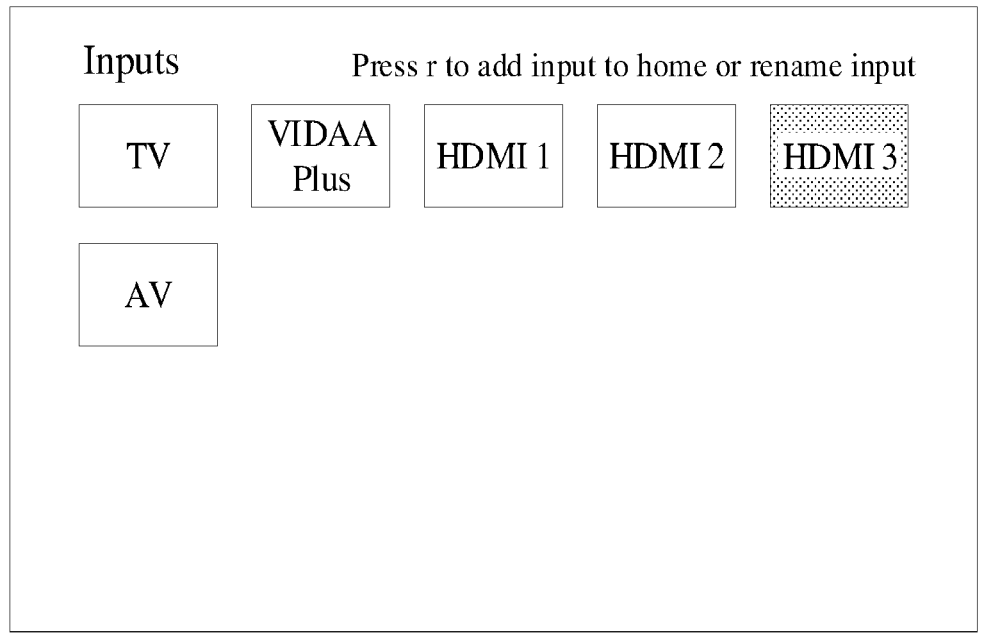
FIG. 12 shows a schematic diagram of a channel page according to some embodiments of the present disclosure.
Figure 13:
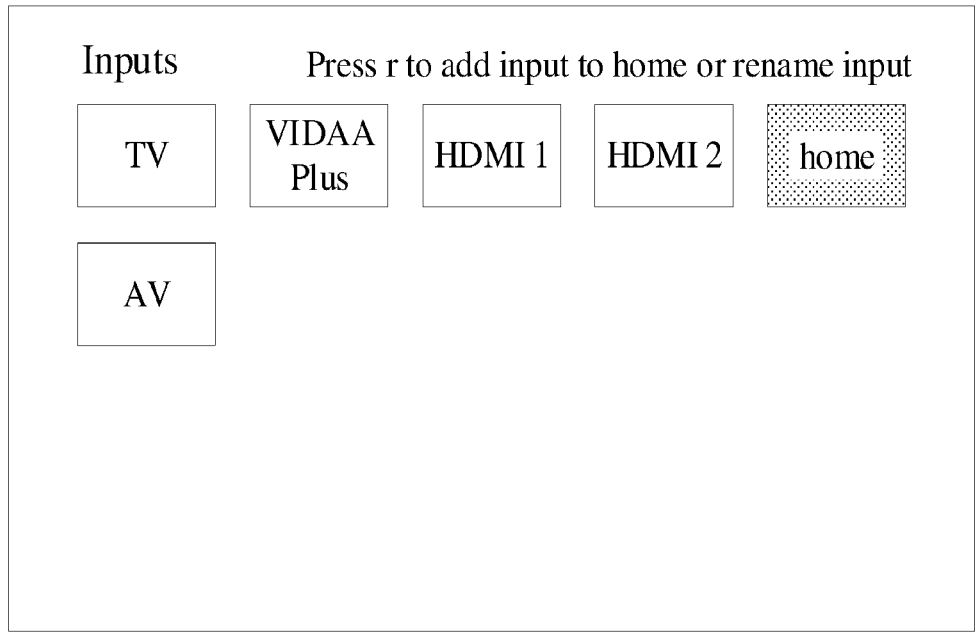
FIG. 13 shows a second schematic diagram of a channel page according to some embodiments of the present disclosure.

FIG. 12 shows a schematic diagram of a channel page according to some embodiments of the present disclosure. FIG. 13 shows a second schematic diagram of the channel page according to some embodiments of the present disclosure.

The user may input a page display command to the display apparatus 200 to control the display apparatus 200 for presenting a channel page, such as an "Inputs" page as shown in FIG. 12. On the "Inputs" page, each channel may be presented as an icon, and an original name of the each channel is also presented on the icon, such as "TV", "VIDAA Plus", "HDMI1", "HDMI2", "HDMI3", "AV", etc. On the channel page, the user may move the focus selector to an icon corresponding to the target channel that the user wants to modify its name, for example, the selected target channel is HDMI3. Then, the user modifies the original name "HDMI3" of the target channel to the target name "home", and the modified target channel is shown in FIG. 13.

Figure 14:
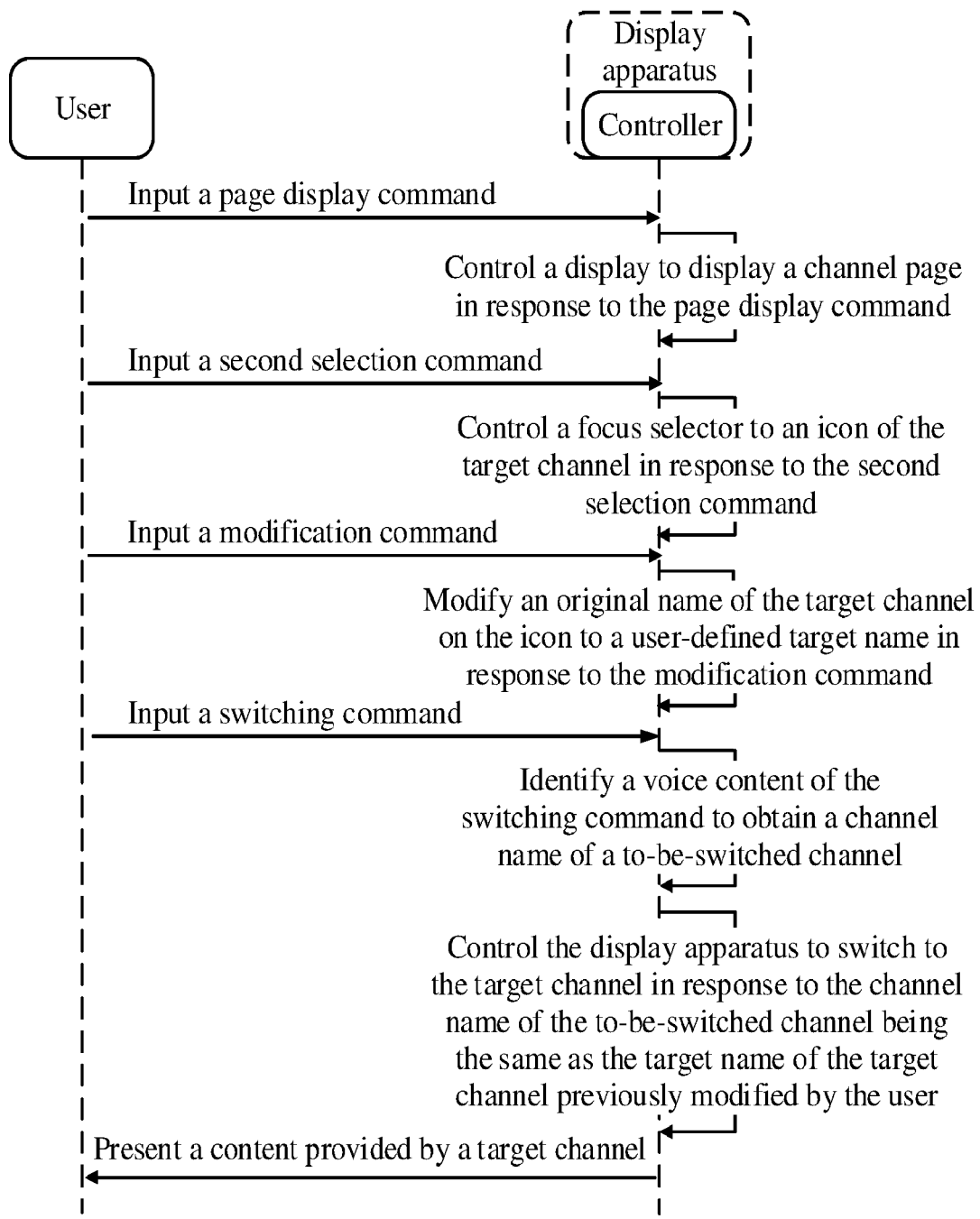
FIG. 14 shows a fourth control flow diagram of a controller 250 according to some embodiments of the present disclosure.

FIG. 14 shows a fourth control flow diagram of a controller 250 according to some embodiments of the present disclosure.

In some embodiments, after the user inputs a page display command to the display apparatus 200, the controller 250 receives and responds to the page display command to control the display 260 for presenting a corresponding channel page, for example, as shown in FIG. 12. Then, the user inputs a second selection command for selecting a target channel to the display apparatus 200 by moving the focus selector on the channel page, and the controller 250 receives and responds to the second selection command to control the focus selector to an icon corresponding to the target channel. Finally, the user inputs a modification command to the display apparatus 200 by modifying the channel name at the icon corresponding to the target channel, and the controller 250 then receives and responds to the modification command to modify the original name of the target channel on the icon to the user-defined target name, for example, "HDMI3" as shown in FIG. 12 is modified to "home" as shown in FIG. 13.

Figure 15:
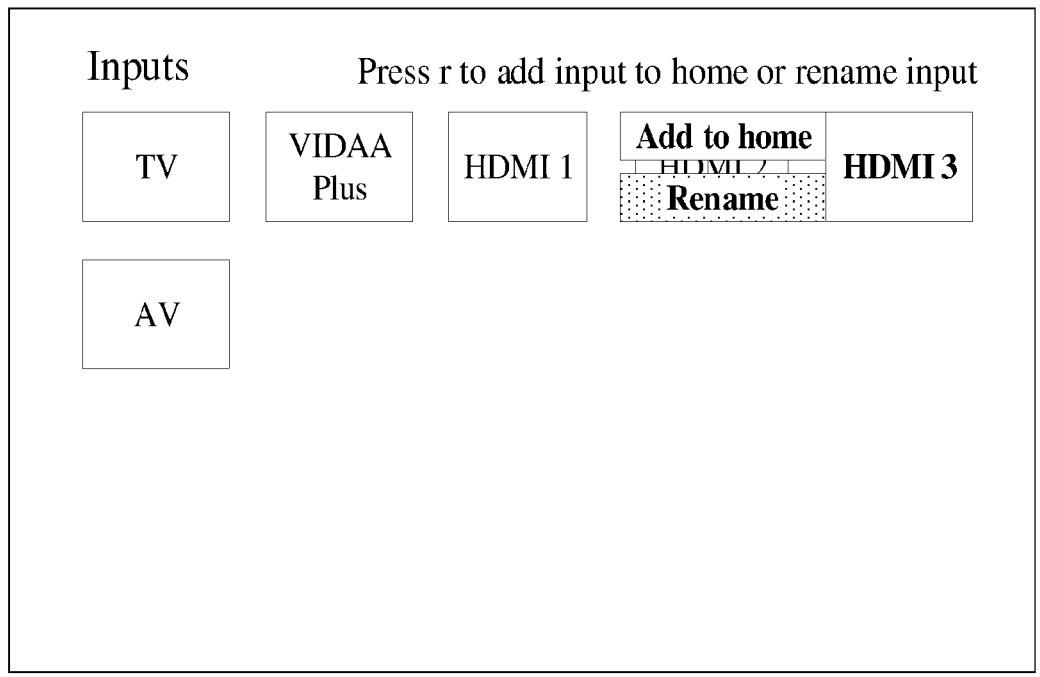
FIG. 15 shows a third schematic diagram of a channel page according to some embodiments of the present disclosure.

FIG. 15 shows a third schematic diagram of a channel page according to some embodiments of the present disclosure.

After selecting the target channel HDMI3 on the channel page as shown in FIG. 12, if the original name needs to be modified, the user needs to input a third confirmation command in the icon of the target channel, for example, clicking the "OK" key on the remote control. At this time, a rename option will be presented next to the selected icon, such as a "Rename" option as shown in FIG. 15. The user then moves a focus frame to a rename option, and then inputs a fourth confirmation command, so that the channel name on the selected icon will present an input box. The user may input the user-defined target name in the input box, and then input a fifth confirmation command to the display apparatus 200. The selected icon presents the target name, for example, presenting "home", etc., as shown in FIG. 13.

In addition, as shown in FIG. 15, prompting contents for the user may be presented on the channel page, for example, "Press . . . to add input to home or rename input", etc. After the user inputs the third confirmation command at the icon of the target channel, an option of "Add to home" will also be presented next to the selected icon. The user moves the focus frame to the option of "Add to home", and then inputs the fourth confirmation command, and thus the controller 250 will add the channel HDMI3 to the home page of the display apparatus 200.

Figure 16:
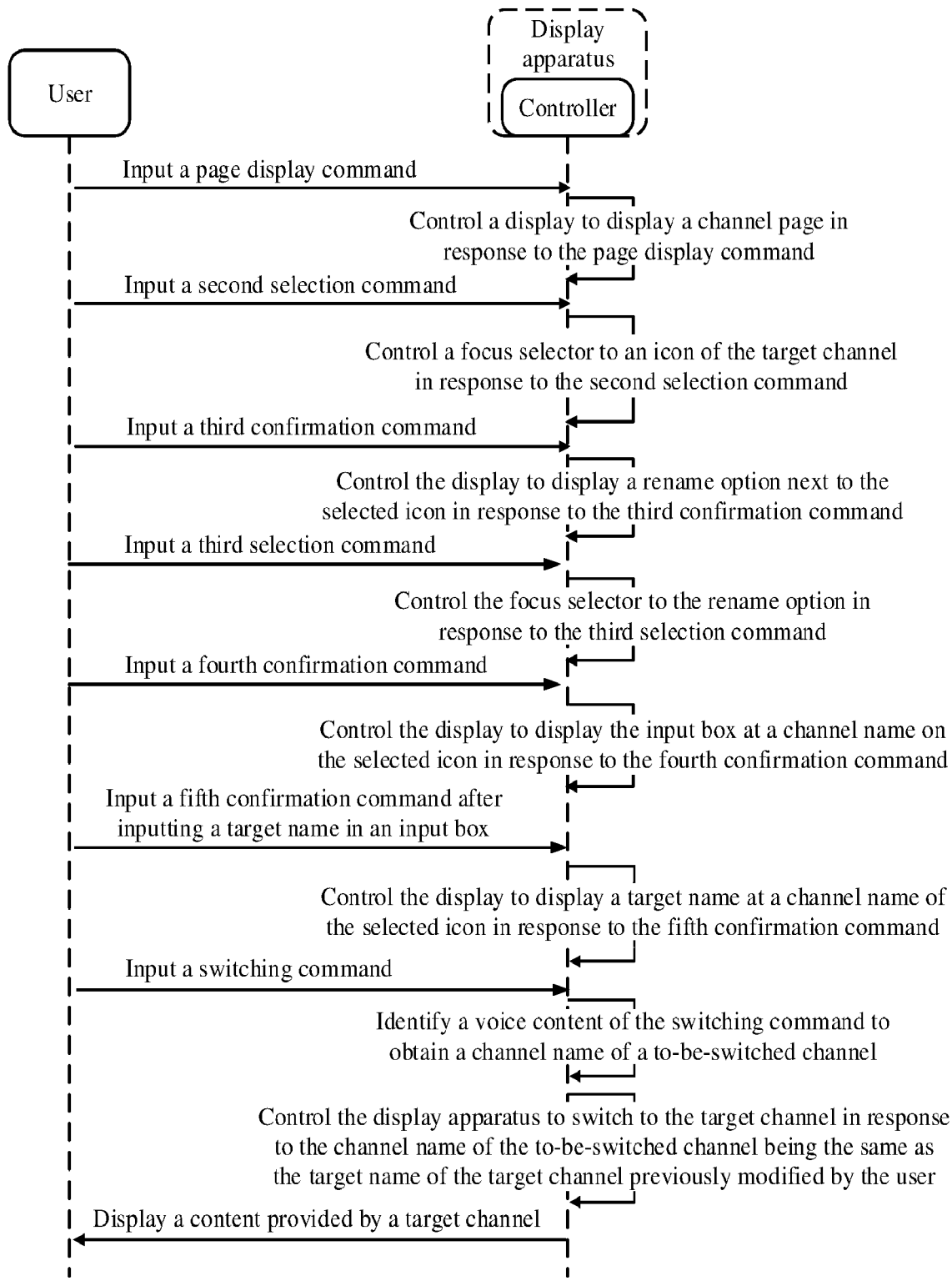
FIG. 16 shows a fifth control flow diagram of a controller 250 according to some embodiments of the present disclosure.

FIG. 16 shows a fifth control flow diagram of a controller 250 according to some embodiments of the present disclosure.

In some embodiments, after a user inputs a page display command to the display apparatus 200, the controller 250 receives and responds to the page display command to control the display 260 to present a corresponding channel page. The user inputs a second selection command to the display apparatus 200, and the controller 250 receives and responds to the second selection command to control the focus selector to an icon of a target channel. The user inputs a third confirmation command to the display apparatus 200 at the selected icon, and the controller 250 receives and responds to the third confirmation command to control the display 260 to present a rename option next to the selected icon. The user inputs a third selection command to the display apparatus 200, and the controller 250 receives and responds to the third selection command to control the focus selector to the rename option. The user inputs a fourth confirmation command to the display apparatus 200 at the rename option, and the controller 250 receives and responds to the fourth confirmation command to control the display 260 to present an input box at the channel name on the selected icon. The user inputs a user-defined target name in the input box, and then inputs a fifth confirmation command to the display apparatus 200, and the controller 250 receives and responds to the fifth confirmation command to control the display 260 to present the target name at the channel name of the selected icon.

The manners in which a user controls the display apparatus 200 to present a channel name page or a channel page are merely for illustration. In some other embodiments, a user may further control the display apparatus 200 to correspondingly present a channel page by pressing a direction key of the control device 100, or the user may further control the display apparatus 200 to correspondingly present a channel name page by pressing a function key of the control device 100.

In some embodiments, in order to increase identification accuracy of respective channels, after a user modifies a name of a target channel to a target name, an original name of the target channel is also maintained. At this time, the target channel corresponds to the original name and the target name both. When the user requests to switch to the target channel on the display apparatus 200, the user may speak either the original name or the target name of the target channel, and both the two names may be identified by the controller 250. Further, after the user inputs a switching command to the display apparatus 200, the controller 250 may identify a voice content of the switching command to obtain a channel name of a to-be-switched channel, and compare the channel name of the to-be-switched channel with channel names of all the channels. In a case where the channel name of the to-be-switched channel is the same as the original name of the target channel, the controller 250 controls the display apparatus 200 to switch to the target channel in response to the switching command.

The foregoing embodiments only take an example that the user modifies the channel of one target channel. In some other embodiments, the user may modify the channel names of the plurality of channels, and the channels after the names are modified correspond to the two names, namely, the original name and the target name, and a mode of performing channel through the original name and the target name is the same as the mode in the foregoing embodiments.

In addition, the use may also modify the channel name of one channel for multiple times, and the name after each modification is the target name, while the original name of the channel remains unchanged.

In some embodiments, in order to accurately identify a voice content input from the user, the controller 250 needs to have a built-in third-party voice service. The third-party voice service may obtain a channel list corresponding to the display apparatus 200 from a server 400, and the target channel is associated with its original name and target name respectively in the channel list. The controller 250 uses the third-party voice service to identify the original name or the target name of the target channel from the voice content input from the user, and then uses the third-party voice service to compare the identified original name or target name with each name in the channel list, if the name which is the same as the original name or the target name is found, the channel corresponding to the name is the target channel to which the user wants to switch. The controller 250 finally controls the display apparatus 200 to switch to the target channel.

In some embodiments, if a user modifies a certain channel name of the display apparatus 200, after modifying the channel name, the controller 250 further needs to upload a new channel list including the modified channel name to the server 400, and the server 400 issues the new channel list to the third-party voice service corresponding to the display apparatus 200, so that the channel list in the third-party voice service can be updated in real time, ensuring that the channel list in the third-party voice service is always up-to-date. In this way, the controller 250 can more accurately find the target channel to which the user wants to switch by using the third-party voice service.

In some embodiments, a modification operation of a user on a channel name is usually only for one display apparatus 200 that the user often uses, that is, when the user uses a display apparatus A, a channel name "a" may be modified to "one"; and when the user uses a display apparatus B, if the channel name "a" is not modified, an original name of the channel "a" still needs to be used for voice identification. The third-party voice service in display apparatus A only updates the channel list corresponding to the display apparatus A, while the third-party voice service in the display apparatus B only updates the channel list corresponding to the display apparatus B.

Figure 17:
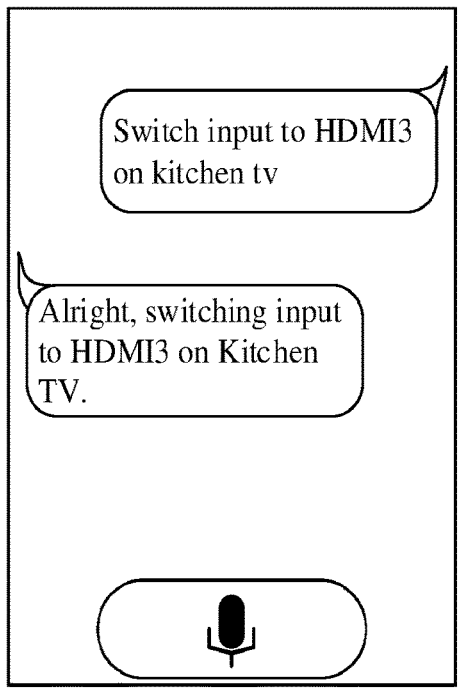
FIG. 17 shows a schematic diagram of a display page on a virtual remote control according to some embodiments of the present disclosure.

FIG. 17 shows a schematic diagram of a display page on a virtual remote control according to some embodiments of the present disclosure.

In some embodiments, if a user uses the virtual remote control to input a voice content of the switching command to the display apparatus 200, the smart device 300 where the virtual remote control is located may further provide the user with a display page of an input content, and the display page includes a voice input key. For example, as shown in FIG. 17, the user may press a key with a microphone logo on the display page, and input the voice content including the original name of the channel, the smart device 300 may identify the voice content input from the user as a text content to be presented, such as "switch input to HDMI3 on kitchen tv", etc. Moreover, the smart device 300 may further reply to the voice content on the display page of the virtual remote control, for example, "Alright, switching input to HDMI3 on Kitchen TV", etc.

Figure 18:
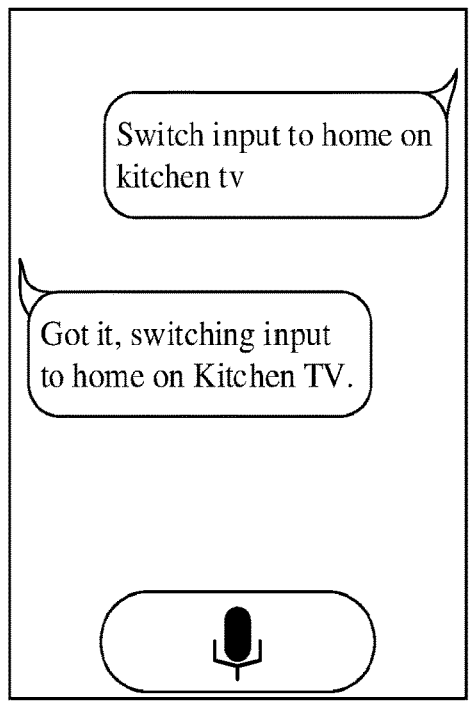
FIG. 18 shows a second schematic diagram of a display page on a virtual remote control according to some embodiments of the present disclosure.

FIG. 18 shows a second schematic diagram of the display page on the virtual remote control according to some embodiments of the present disclosure.

In some embodiments, after a user modifies a target name of a target channel, the user may use the target name to input the voice content to the virtual remote control. For example, as shown in FIG. 18, the user may press a key with the microphone logo on a display page, and input the voice content including the target name of the channel, the smart device 300 may identify the voice content input from the user as the text content to be presented, such as "switch input to home on kitchen tv", etc. Moreover, the smart device 300 may further reply to the voice content on the display page of the virtual remote control, for example, "Alright, switching input to home on Kitchen TV", etc.

In some embodiments, a display apparatus 200 is provided. During modifying a channel name, a controller 250 of the display apparatus 200 modifies an original name of a target channel to a user-defined target name in response to a modification command input from a user. For example, the original name is modified to a word or character that is easy to pronounce. During channel switching, the controller 250 may identify a voice content input from the user, so as to obtain a channel name of a to-be-switched channel to which the user wants to switch; then, the controller 250 controls the display apparatus 200 to switch to the target channel in a case that the channel name of the to-be-switched channel is the same as the target name of the target channel. The display apparatus 200 in the embodiments of the present disclosure may modify the name of the channel according to the user's requirements. When the user wants to switch to a target channel, a voice command with a target name may be pronounced accurately, and the display apparatus 200 may accurately identify the target name and find a corresponding target channel.

Figure 19:
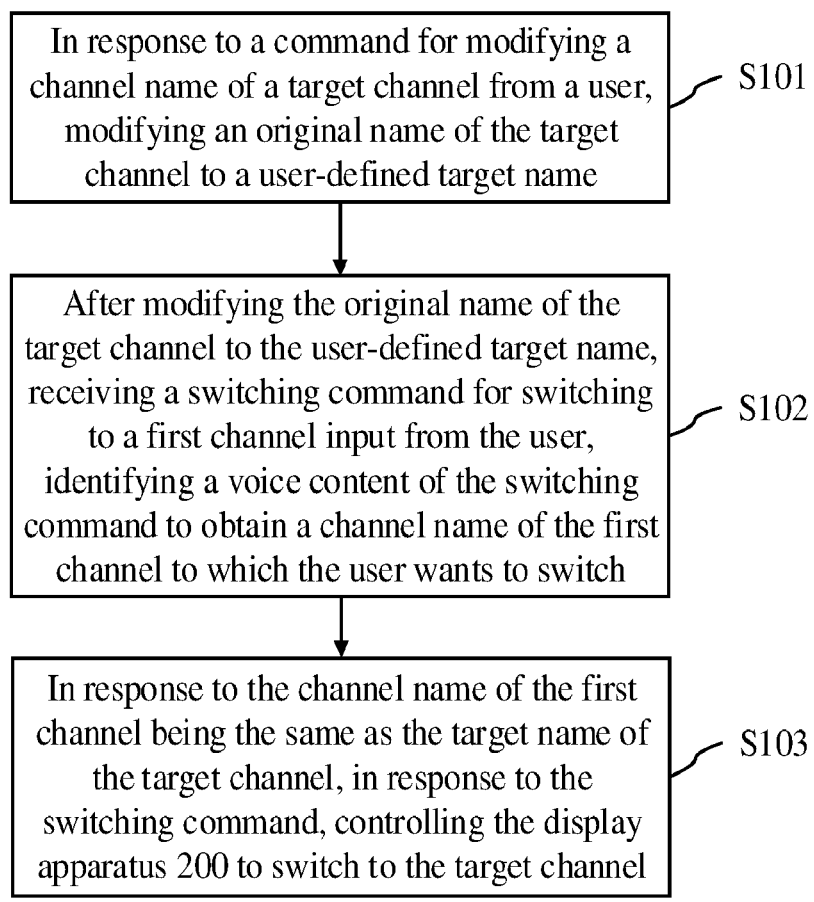
FIG. 19 shows a flow diagram of a channel switching method of a display apparatus according to some embodiments of the present disclosure.

FIG. 19 shows a flow diagram of a channel switching method of a display apparatus according to some embodiments of the present disclosure.

An embodiment of the present disclosure further provides a channel switching method in a display apparatus. The method may be applied to a controller 250 in the foregoing embodiments or a control component capable of achieving such control function. As shown in FIG. 19, the method includes S101, S102 and S103.

S101, in response to a command for modifying a channel name of a target channel from a user, modifying an original name of the target channel to a user-defined target name.

The target channel has the original name and the target name after the modification. The target channel may be a signal source, such as HDMI1, HDMI2 and so on. In other embodiments, the target channel may be a multimedia content provider.

S102, after modifying the original name of the target channel to the user-defined target name, receiving a switching command for switching to a first channel input from the user, identifying a voice content of the switching command to obtain a channel name of the first channel to which the user wants to switch.

S103, in response to the channel name of the first channel being the same as the target name of the target channel, in response to the switching command, controlling the display apparatus 200 to switch to the target channel.

In some embodiments, the method further includes: in response to a page display command input from the user, controlling a display 260 to present a channel name page; in response to a first selection command for selecting the target channel input from the user on the channel name page, controlling a focus selector to an item bar corresponding to the target channel; and in response to a modification command for modifying the channel name input from the user, modifying the original name of the target channel in the item bar to the user-defined target name.

In some embodiments, the method further includes: in response to a first confirmation command at the item bar input from the user, controlling the display 260 to present an input box at a channel name in the item bar; and in response to a second confirmation command after inputting the target name in the input box, controlling the display 260 to present the target name at the channel name input from the user.

In some embodiments, the method further includes: in response to the page display command input from the user, controlling the display 260 to present a channel page; in response to a second selection command for selecting the target channel input from the user on the channel page, controlling the focus selector to an icon of the target channel; and in response to the modification command for modifying the channel name input from the user, controlling the controller to change the original name of the target channel on the icon to the user-defined target name.

In some embodiments, the method further includes: in response to a third confirmation command input from the user at the icon, controlling the display 260 to display a rename option next to the icon; in response to a third selection command for selecting the rename option from the user, controlling the focus selector to the rename option; in response to a fourth confirmation command at the rename option for the user, controlling the display 260 to present the input box at the channel name on the icon; and in response to a fifth confirmation command input from the user after inputting the target name in the input box, controlling the display 260 to present the target name input from the user at the channel name.

In some embodiments, the method further includes: if the channel name of the first channel is the same as the original name of the target channel, in response to the switching command, controlling the display apparatus 200 to switch to the target channel.

In some embodiments, the method further includes: in response to the modification command for modifying the channel name input from the user through a control device 100, modifying the original name of the target channel to the user-defined target name. The control device 100 includes a remote control or a virtual remote control installed on a smart device 300.

In some embodiments, the method further includes: during using the display apparatus 200 after the display apparatus has modified the channel name, identifying voice content of a switching command for switching channel input from the user through the control device 100, to obtain the channel name of the to-be-switched channel to which the user wants to switch. The control device 100 includes a remote control or a virtual remote control installed on a smart device 300.

In some embodiments, the method further includes: during using the display apparatus 200, identifying the voice content of the switching command input from the user through a microphone in the display apparatus 200, to obtain the channel name of the to-be-switched channel to which the user wants to switch.

Because the channel switching method of the display apparatus in the embodiments of the present disclosure may be applied to the controller 250 in the foregoing embodiments, other contents related to the channel switching method of the display apparatus in the embodiments of the present disclosure may refer to the content of the foregoing embodiments, which is not repeated herein.

An alarm clock is a function item of a menu of a display apparatus. In a process of setting the alarm clock, a user needs to select an alarm clock function from multiple function items in the menu, and then set the alarm clock. The alarm clock setting process is relatively complicated, resulting poor user experience.

Figure 20:
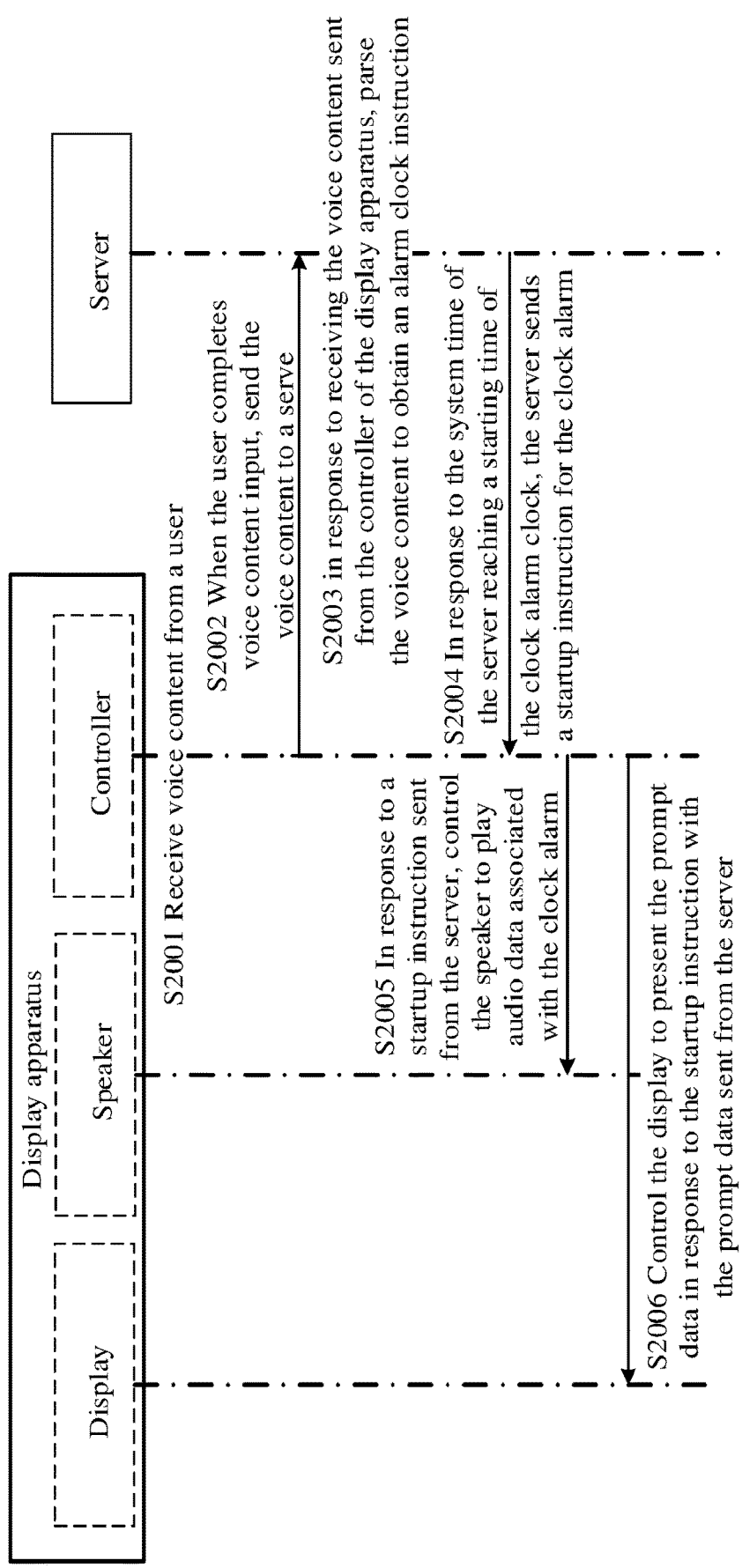
FIG. 20 is a flow diagram of interaction of a display apparatus and a server according to some embodiments of the present disclosure.

An embodiment of the present disclosure provides a display apparatus. The display apparatus may include a controller, a display, and a speaker. An interaction process between the display apparatus and a server in the process of setting the alarm clock may refer to FIG. 20.

The controller is configured to: receive voice content from a user (S2001).

When the user completes voice content input, the controller is configured to send the voice content to a server (S2002).

The server is configured to, in response to receiving the voice content sent from the controller of the display apparatus, parse the voice content to obtain an alarm clock instruction (S2003).

Different startup instructions may be generated by the server for different alarm clocks. An embodiment of the present disclosure shows a mode of generating a startup instruction, which may refer to FIG. 21.

Figure 21:
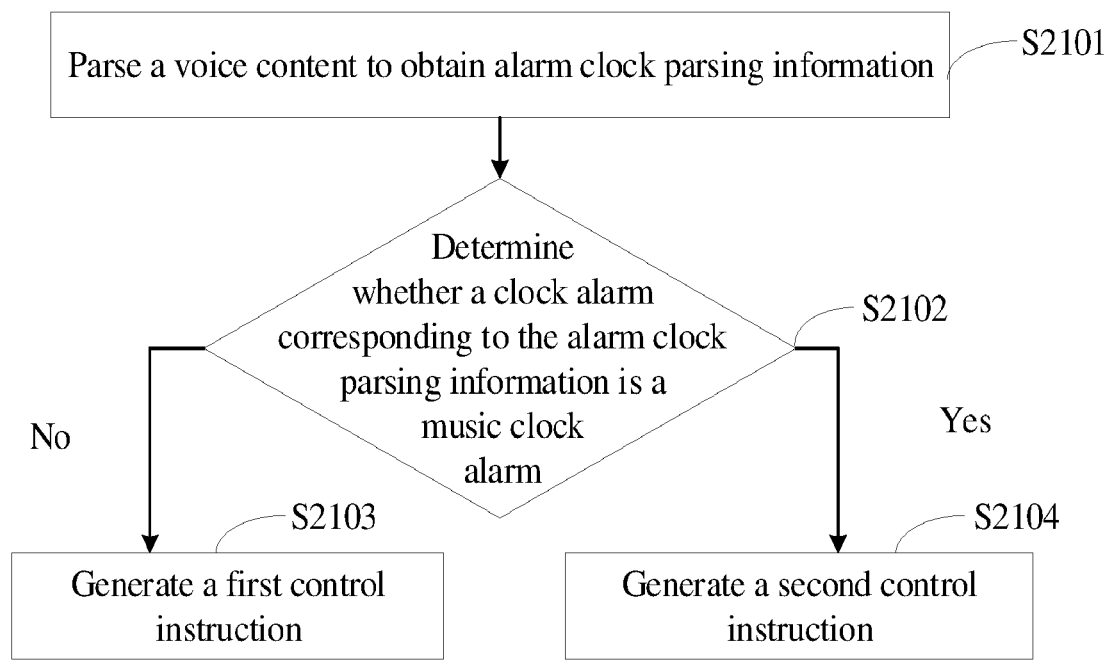
FIG. 21 is a flow diagram of a method for generating a startup instruction according to some embodiments of the present disclosure.

FIG. 21 is a flow diagram of a method for generating a startup instruction according to some embodiments of the present disclosure. The server is configured to execute S2101-S2104.

S2101: parsing the voice content to obtain alarm clock parsing information.

S2102: determining whether a clock alarm corresponding to the alarm clock parsing information is a music clock alarm.

There are various schemes for determining whether the clock alarm corresponding to the alarm clock parsing information is a music clock alarm. In some embodiments, whether the alarm clock parsing information includes the "music clock alarm" may be identified. If the alarm clock parsing information includes the "music clock alarm", then the alarm corresponding to the alarm clock parsing information is the music alarm. If the alarm clock parsing information does not include the "music clock alarm", the clock alarm corresponding to the alarm clock parsing information is not the music clock alarm. In some embodiments, whether the alarm clock parsing information includes music-related information may be identified. If the alarm clock parsing information includes the music-related information, the clock alarm corresponding to the alarm clock parsing information is the music clock alarm. If the alarm clock parsing information does not include the music-related information, the alarm corresponding to the alarm clock parsing information is not the music alarm. The music-related information may be a type of music, for example: as piano music, pop music, jazz music, etc.; the music-related information may also be a name of the song, such as "JN", etc.; and the music-related information may also be a name of a singer, such as ZJL, etc.

If the clock alarm corresponding to the alarm clock parsing information is not the music alarm clock, a first control instruction is generated (S2103).

If the clock alarm corresponding to the alarm clock parsing information is the music alarm, a second control instruction is generated (S2104).

In some embodiments, the second control instruction includes network audio data, or includes network audio data and network video data, wherein the network audio data is audio data associated with the user voice, and the network video data is video data associated with the music alarm clock configured by the user.

In response to the system time of the server reaching a starting time of the clock alarm clock, the server sends a startup instruction for the clock alarm (S2004).

In some embodiments, the display apparatus is in connection with the server through a wireless network, and the corresponding startup instruction is sent to the display apparatus through the wireless network. In some embodiments, the display apparatus is in connection with the server through a wired network, and the corresponding startup instruction is sent to the display apparatus through the wired network.

In response to a startup instruction sent from the server, the controller is configured to control the speaker to play audio data associated with the clock alarm, and the startup instruction is an instruction sent from the server when the system time of the server is equal to the start time of the clock alarm (S2005).

In some embodiments, the controller is further configured to: control the speaker to play local alarm clock data in response to a first instruction sent from the server, and the local alarm clock data is stored in a memory of the controller in the display apparatus. In some embodiments, the alarm clock set by the user is a conventional alarm clock. In this case, the control instruction sent from the server does not include audio data, so that the transmission of the first instruction occupies less bandwidth.

In some embodiments, the startup instruction includes a second instruction, and the controller is further configured to: control the speaker to play network audio data associated with the clock alarm in response to the second instruction sent from the server, wherein the second instruction comprises network audio data associated with the clock alarm.

Figure 22:
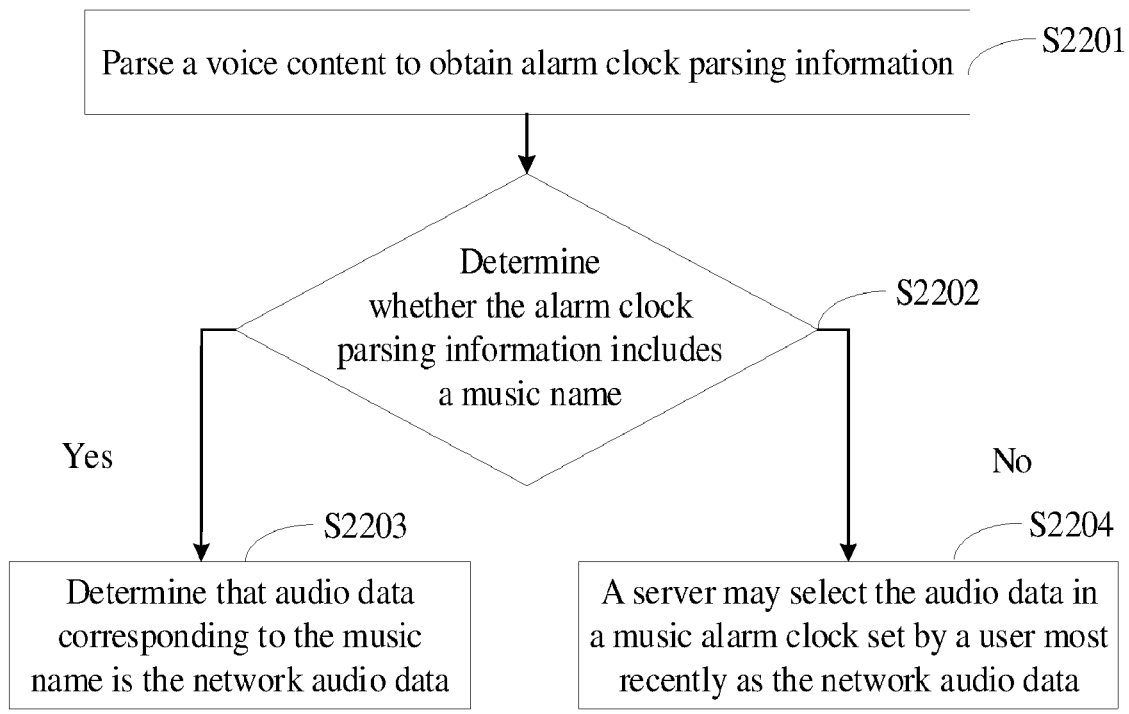
FIG. 22 is a flow diagram of a method for generating network audio data according to some embodiments of the present disclosure.

The network audio data comprises audio data associated with the voice content. In some embodiments, the present embodiment further shows a scheme for generating network audio data, which may refer to FIG. 22. FIG. 22 is a flow diagram of a method for generating network audio data according to some embodiments of the present disclosure. The server is configured to execute S2201-S2204.

S2201: Parsing the voice content to obtain alarm clock parsing information.

S2202: Determining whether the alarm clock parsing information includes a music name.

A scheme of determining whether the alarm clock parsing information comprises the music name may comprise: the server pre-stores a song list, determines whether a song name in the alarm clock parsing information is in the song list, determines that the alarm clock parsing information comprises the music name if the song name in the alarm clock parsing information is in the song list, and determines that the alarm clock parsing information does not comprise the music name if a song name in the alarm clock parsing information is not in the song list.

If the alarm clock parsing information includes the music name, it is determined that the audio data corresponding to the music name is the network audio data (S2203).

If the alarm clock parsing information does not contain the music name, the audio data in the music alarm clock set by the user most recently is selected as the network audio data (S2204).

In some embodiments, the server may select the audio data in the music alarm clock set by the user most recently as the network audio data.

In some embodiments, the server may also select the audio data with the highest playback times as the network audio data, and the server may select the most recently released audio data as the network audio data.

In some embodiments, the startup instruction further includes prompt data, wherein the prompt data is configured to record what the user intends to do when the alarm clock is started, and the controller is further configured to control the display to present the prompt data in response to the startup instruction with the prompt data sent from the server (S2006).

In some embodiments, the controller is further configured to control the speaker to play the prompt data.

Figure 23:
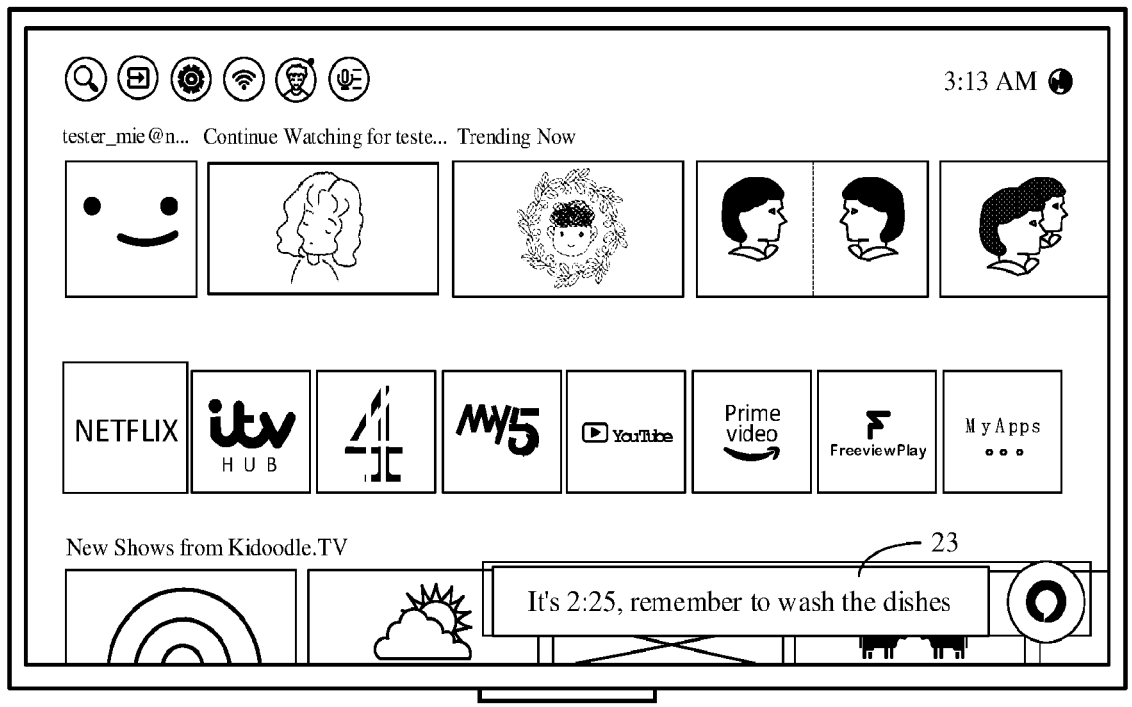
FIG. 23 is a schematic diagram of a display with prompt data according to some embodiments of the present disclosure.

The display effect of the prompt data is illustrated below with reference to the specific implementations. FIG. 23 is a schematic diagram of the display with the prompt data according to some embodiments. As shown in FIG. 23, the prompt data 23 is located at the lower right of a display interface of the display. FIG. 23 is only an example showing that the prompt data is located at the lower right of the display interface of the display. The location of the prompt data may be set according to user's requirements. For example, the prompt data 23 may be located in the upper left corner of the display interface of the display. In order to prevent the prompt data from blocking the content played by the user for a long time, the controller may control the display to cancel the prompt data in response to a cancel operation of the alarm clock from the user.

In order to prevent the prompt data from blocking the content played by the user for a long time, in some embodiments, the controller may count a display time of the prompt data, and if the display time is equal to a preset time, the controller may control the display to cancel the prompt data. The present embodiment does not limit the preset time, and the preset time may be set according to user's requirements, for example, the preset time may be 3 s. In some embodiments, the second instruction further includes the network video data, and the controller is further configured to: control the display to show the network video data in response to the second instruction sent from the server.

In some embodiments, the network video data may be presented in the form of windows, or the network video data may be presented in the form of image layers.

In some embodiments, the network video data may be, but is not limited to, a playing page of the music clock alarm for a song.

Figure 24:
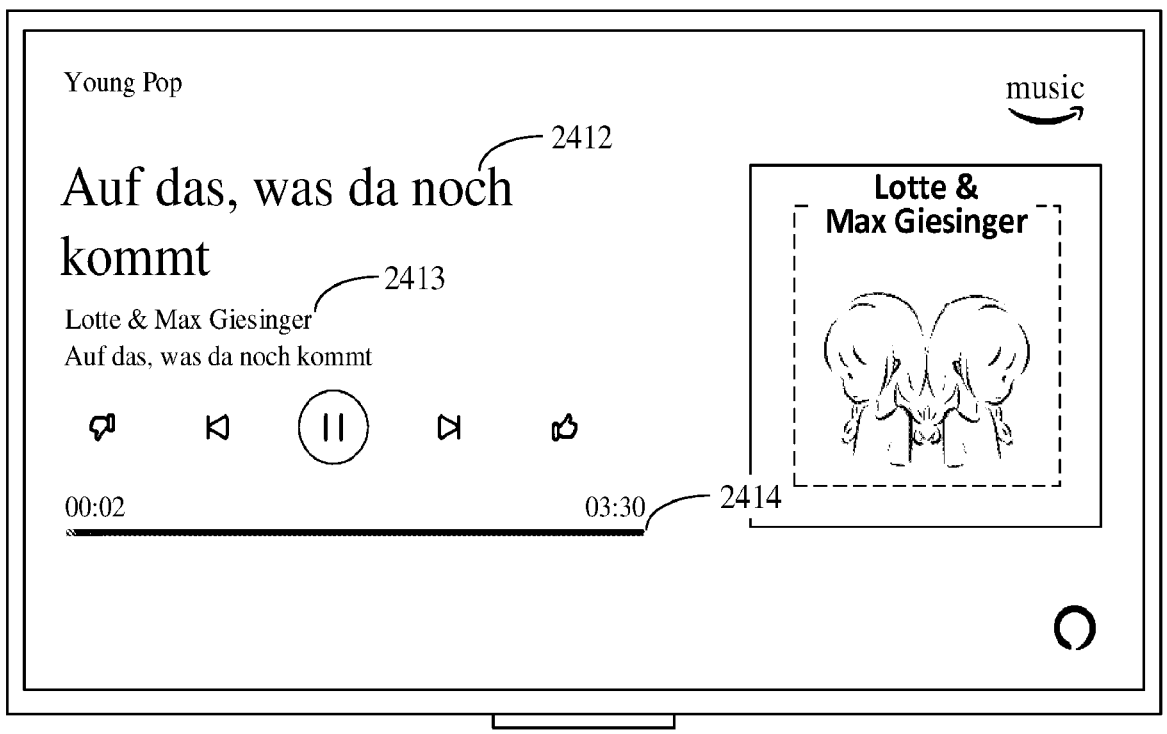
FIG. 24 is a schematic diagram of a display with network video data according to some embodiments of the present disclosure.

The display effect of the network video data is illustrated below with reference to specific implementations. FIG. 24 is a schematic diagram of a display with the network video data according to some embodiments of the present disclosure. As shown in FIG. 24, the network video data is displayed on the display in the form of layers. The network video data may include data such as a name of music 2412, a singer of the music 2413, and a playing progress of the music 2414.

In order to prevent the network video data from blocking the content played by the user for a long time, in some embodiments, the controller may control the display to cancel the network video data in response to the completion of playing the network video data.

The display apparatus receives voice content via a remote control for. However, some display apparatuses include a sound receiving device, which may directly support a voice receiving function and does not communicate with the remote control any more.

Figure 25:
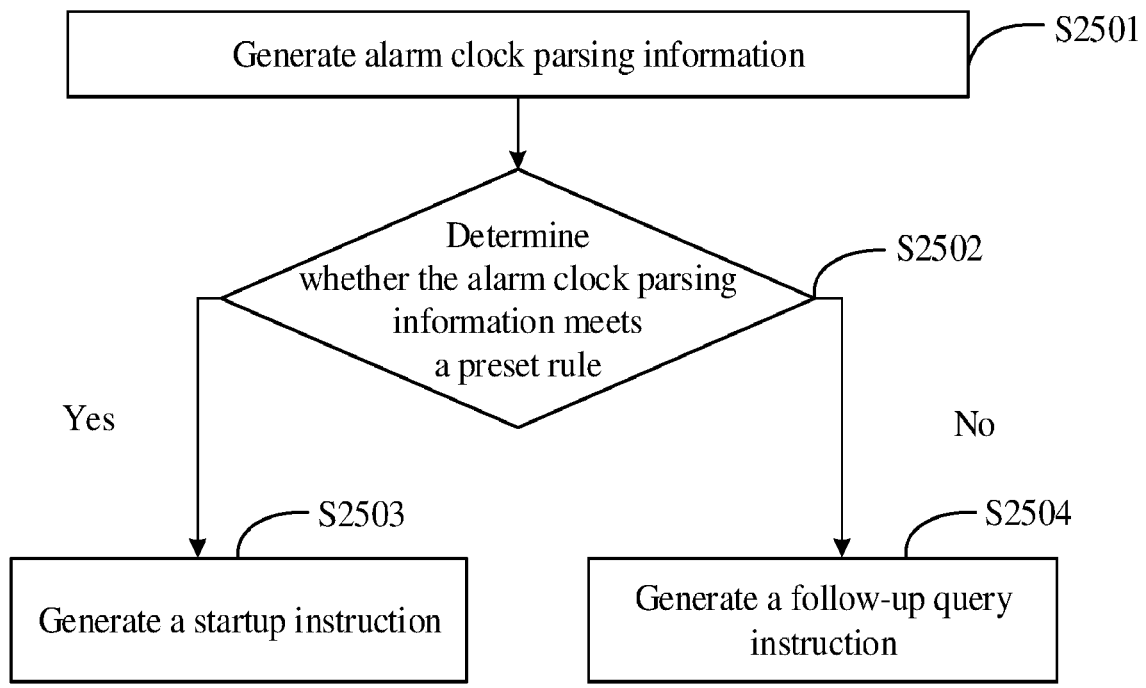
FIG. 25 is a flow diagram of a method for generating an alarm clock instruction according to some embodiments of the present disclosure.

FIG. 25 is a flow diagram of a method for generating a clock alarm instruction according to some embodiments of the present disclosure. The server is configured to execute S2501-S2504.

S2501: Generating alarm clock parsing information.

S2502: Determining whether the alarm clock parsing information meets a preset rule.

A processor pre-stores one or more alarm clock statements. After the processor parses the alarm clock parsing information, the processor determines a matching degree between the parsed alarm clock parsing information and the one or more pre-stored alarm clock statements. If the matching degree is greater than or equal to a preset matching degree, it is determined that the alarm parsing information meets the preset rule; and if the matching degree is less than the preset matching degree, it is determined that the alarm parsing information does not meet the preset rule. The preset matching degree may be set according to user's requirements, for example, the preset matching degree may be 70%.

If the alarm clock parsing information meets the preset rule, the startup instruction is generated (S2503).

If the alarm clock parsing information does not meet the preset rule, a follow-up query instruction is generated (S2504). Wherein the follow-up query instruction is associated with the clock alarm received from the display apparatus.

Figure 26:
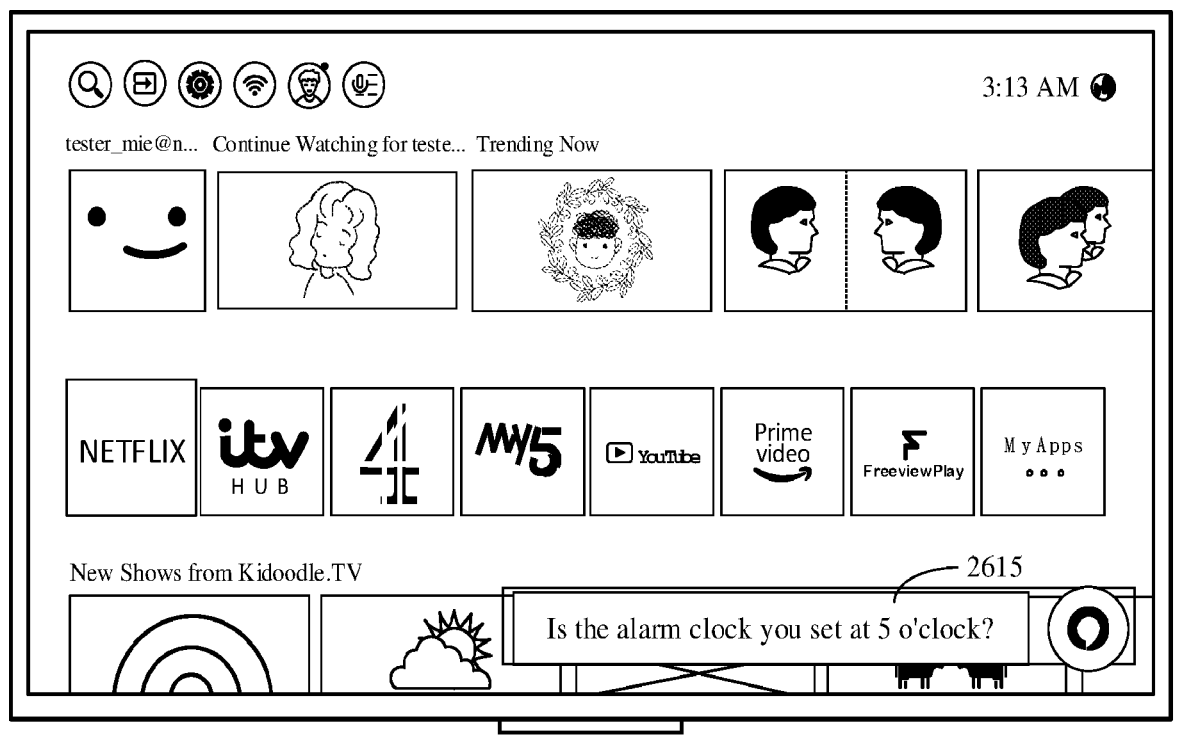
FIG. 26 is a schematic diagram of a display with query data disclosed according to some embodiments of the present disclosure.
Figure 27:
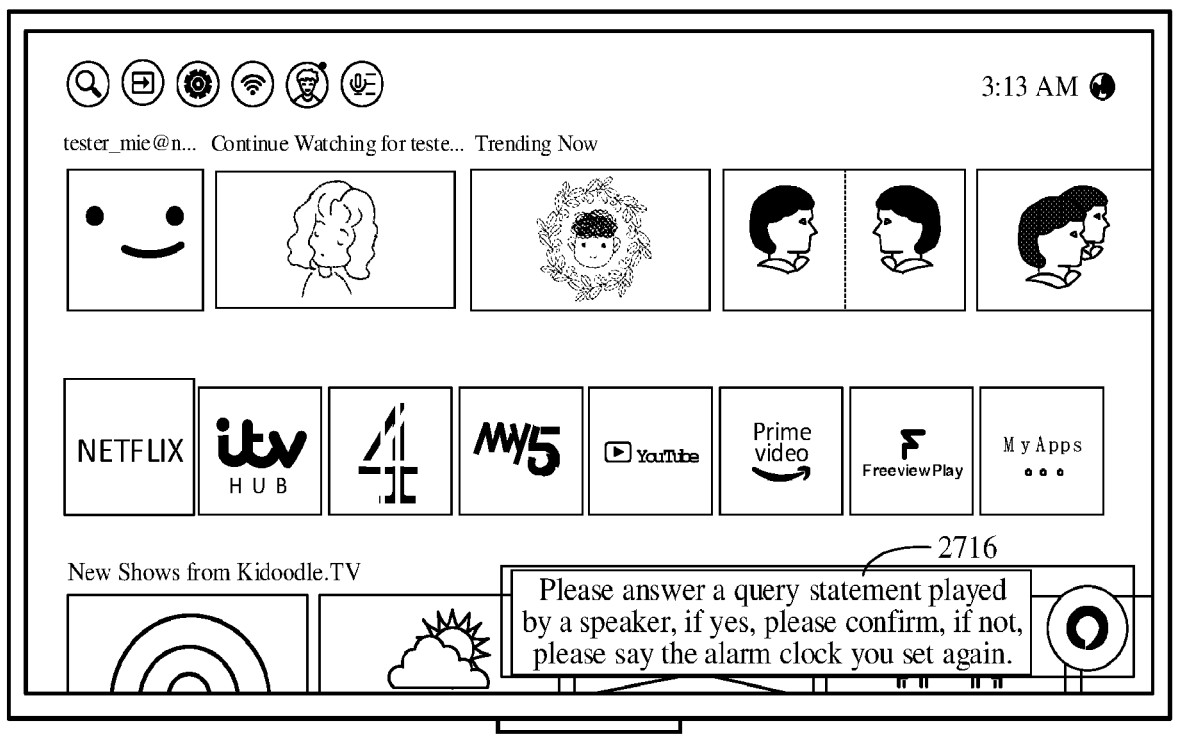
FIG. 27 is a schematic diagram of a display with query prompt data according to some embodiments of the present disclosure.

FIG. 26 is a schematic diagram of a display with query data according to some embodiments of the present disclosure. As shown in FIG. 26, the query data 2615 is that "Is the alarm clock you set at 5 o'clock?" FIG. 27 is a schematic diagram of a display with query prompt data according to some embodiments of the present disclosure. As shown in FIG. 27, the query prompt data 2716 is that "please answer a query statement played by a speaker, if yes, please confirm, if not, please say the alarm clock you set again".

Figure 28:
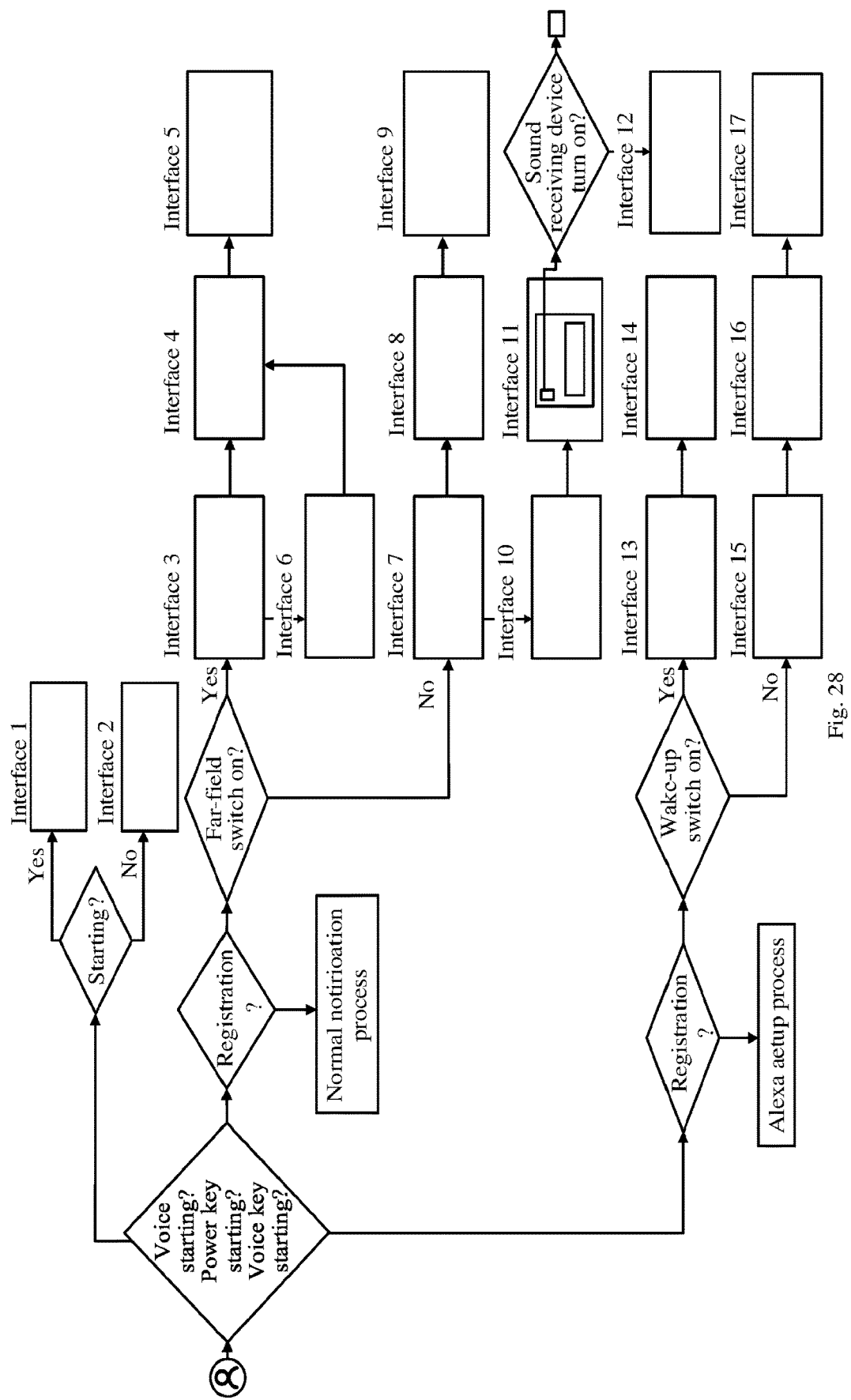
FIG. 28 is a flow diagram of an overall work process of a display apparatus according to some embodiments of the present disclosure.

An embodiment of the present disclosure shows a display apparatus, including at least a display and a controller. FIG. 28 is a flow diagram of an overall working process of a display apparatus according to some embodiments of the present disclosure.

Figure 29:
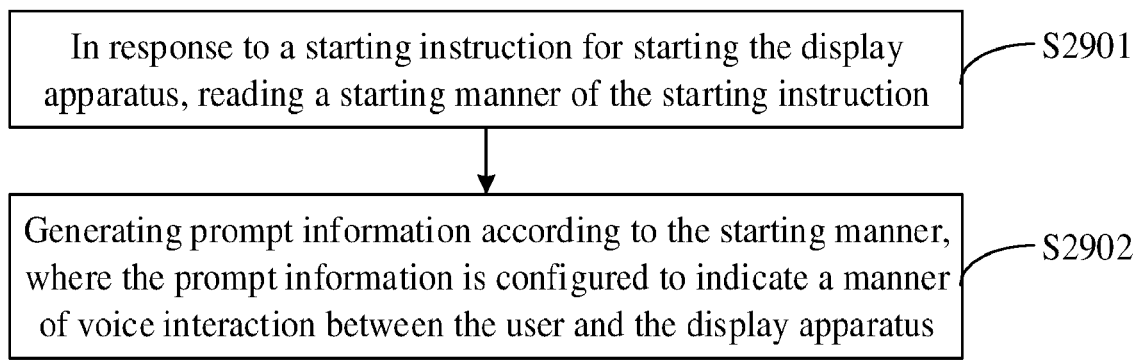
FIG. 29 is an operation flow diagram of a display apparatus according to some embodiments of the present disclosure.

FIG. 29 is an operation flow diagram of a display apparatus according to some embodiments of the present disclosure. The controller is configured to execute S2901-S2902.

S2901: in response to a starting instruction for starting the display apparatus, reading a starting manner of the starting instruction.

The starting manners in the present disclosure may be, but are not limited to, voice starting, voice key starting, and power key starting, and the three starting manners will be discussed in detail later.

In some embodiments, the display will present different prompt information for the different starting manners, and the prompt information is configured to remind a manner of voice interaction between a user and a display apparatus. Therefore, the controller needs to read the starting manner when starting the display apparatus.

In some embodiments, the display apparatus may include a remote control, and the remote control has multiple keys. The user may turn on the display apparatus by touching a key that can power the display apparatus. Key codes sent by the different keys are different, and the controller may identify the starting manner of the display apparatus by reading the key codes. The remote control is provided with a power key and a voice key, and the user may turn on the display apparatus by pressing the power key or the voice key. When the user touches the power key, the key code sent by the remote control is different from the key code sent by the remote control when the user touches the voice key. Therefore, the controller may distinguish the starting manner according to the key code.

In some embodiments, the starting manner of the display apparatus only involves voice starting, voice key starting, and power key starting. In the case of voice key starting and power key starting, the controller will receive the key code sent by the remote control, and in the case of voice starting, the controller will not receive the key code. Based on this, the controller may determine whether the starting manner of the display apparatus is voice starting according to whether a key code for starting the display apparatus is received.

S2902: Generating prompt information according to the starting manner, where the prompt information is configured to indicate a manner of voice interaction between the user and the display apparatus.

In some embodiments, the display will present different alert information for different starting manners. The prompt or alert information is configured to indicate a manner of voice interaction between the user and the display apparatus, so that the user may use a voice interaction function of the display apparatus conveniently and quickly.

Further description will be given below with reference to the specific implementations.

In some embodiments, the starting manner may be voice starting. In the case that the user starts the display apparatus by voice command, it means that the user has already learn the manner of voice interaction with the display apparatus, and in this case, no prompt information will be presented. The manner of voice starting may be, but is not limited to: utilizing the remote control to collect the voice starting command input from the user, and then sending the received voice starting command to the controller, so that the controller starts in response to the voice starting command. The manner of voice starting may be: receiving voice starting command input from the user by utilizing a sound-receiving device in the controller, and then sending the received voice starting command to the controller by the remote control, so that the controller starts in response to the voice starting command.

The operation process of the display apparatus is illustrated below with reference to the specific drawings.

Figure 30:
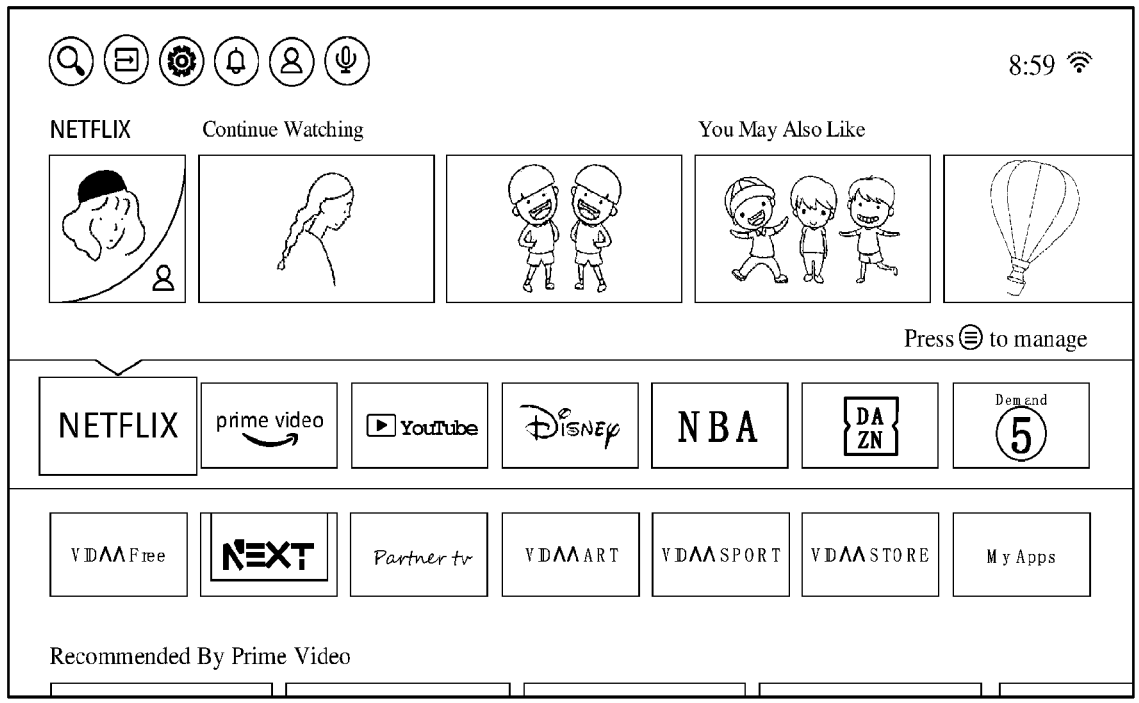
FIG. 30 is a schematic diagram of an interface 1 in FIG. 28.
Figure 31:
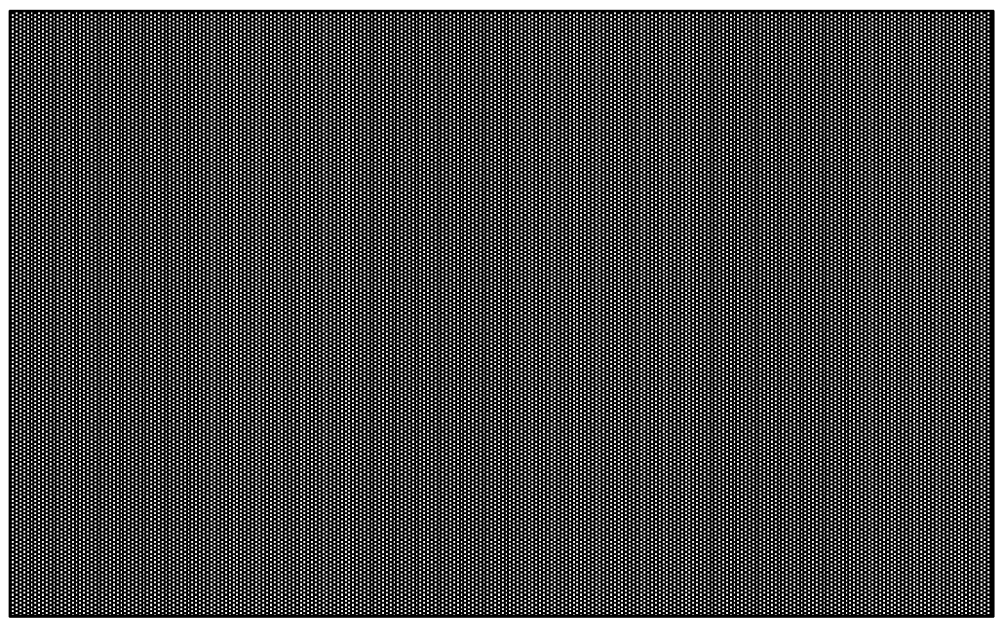
FIG. 31 is a schematic diagram of an interface 2 in FIG. 28.

In some embodiments, the controller determines that the starting manner is voice starting in response to the starting instruction command. If starting is successful, the interface shown by the display may refer to FIG. 30, which is a schematic diagram of an interface 1 in FIG. 28. If the starting manner is voice starting, no prompt message will be presented on the display, and the display will directly present a home page. If starting is unsuccessful, the interface shown by the display may refer to FIG. 31, which is a schematic diagram of an interface 2 in FIG. 28. That is, if starting is unsuccessful, no content is presented on the display.

Figure 32:
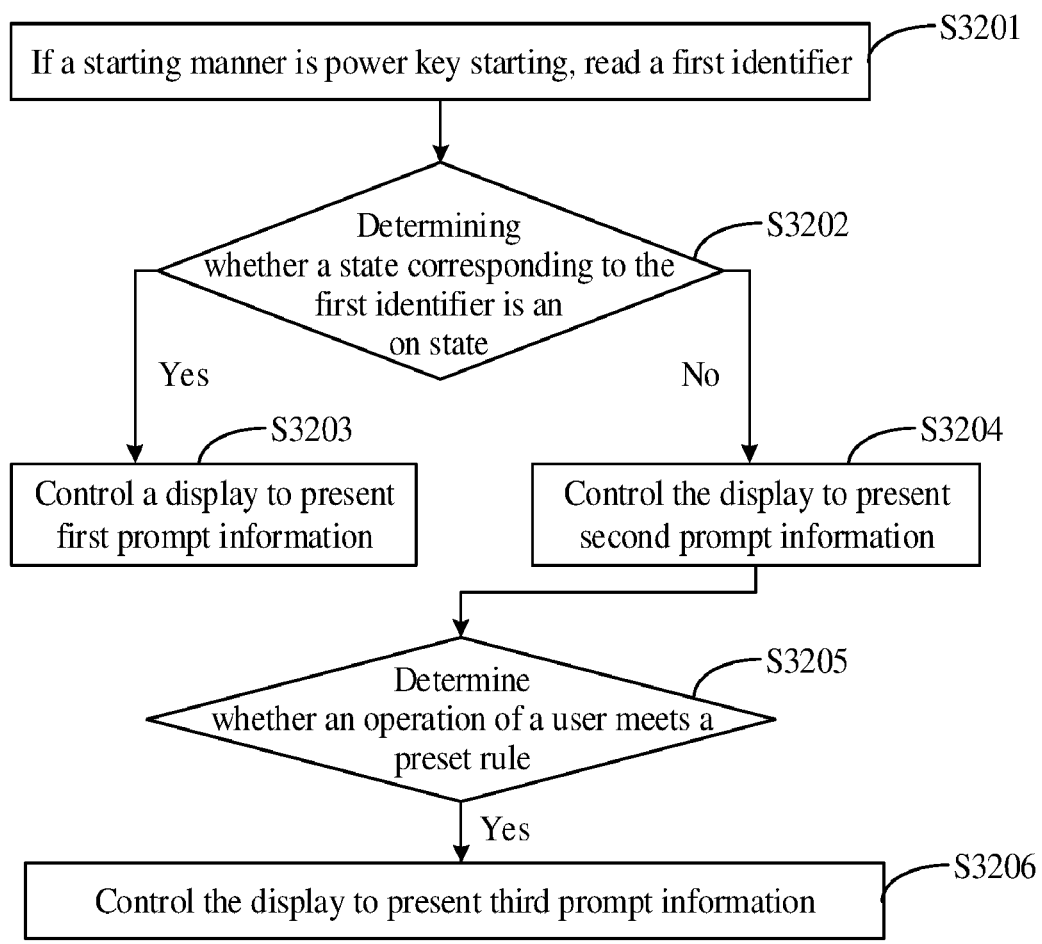
FIG. 32 is a flow diagram of a prompt information display process according to some embodiments of the present disclosure.

In some embodiments, the display apparatus further includes a remote control. The remote control is provided with a power key, and in response to a selection on the power key from a user, the remote control may send a starting command to the controller, so that the controller starts in response to the starting command. The following illustrates a display process of prompt information in a scenario where the starting manner is power key starting with reference to the specific drawings. FIG. 32 is a flow diagram of a prompt information display process shown according to some embodiments of the present disclosure. The controller is further configured to execute S3201-S3206.

If a starting manner is power key starting, the controller reads a first identifier (S3201).

The first identifier is an identifier for a far-field switch. The far-field switch is configured to control a far-field sound receiving function of the controller to be on or off. When the far-field switch is on, the far-field sound receiving function of the controller is turned on, and the corresponding controller may utilize a sound receiving device to receive voice. When the far-field switch is off, the far-field sound receiving function of the controller is closed, and the corresponding controller cannot utilize the sound receiving device to receive voice. The first identifier may be configured for the far-field switch, so that the controller knows that the far-field switch is in the on state or in the off state. When the far-field switch is turned off, a state corresponding to the first identifier is the off state, and when the far-field switch is turned on, a state corresponding to the first identifier is the on state. Therefore, the controller may determine the state of the far-field switch based on the first identifier.

Determining whether a state corresponding to the first identifier is an on state (S3202).

If the state corresponding to the first identifier is the on state, the display is controlled to present first prompt information (S3203), and the first prompt information reminds the user that the far-field switch is in the on state.

If the state corresponding to the first identifier is the on state, the far-field switch is in the on state, and correspondingly, the first prompt information will pop up on the display.

If the state corresponding to the first identifier is not the on state, the display is controlled to present second prompt information (S3204).

Whether an operation of a user meets a preset rule is determined (S3205).

If the operation of the user meets the preset rule, the display is controlled to present third prompt information (S3206).

Figure 34:
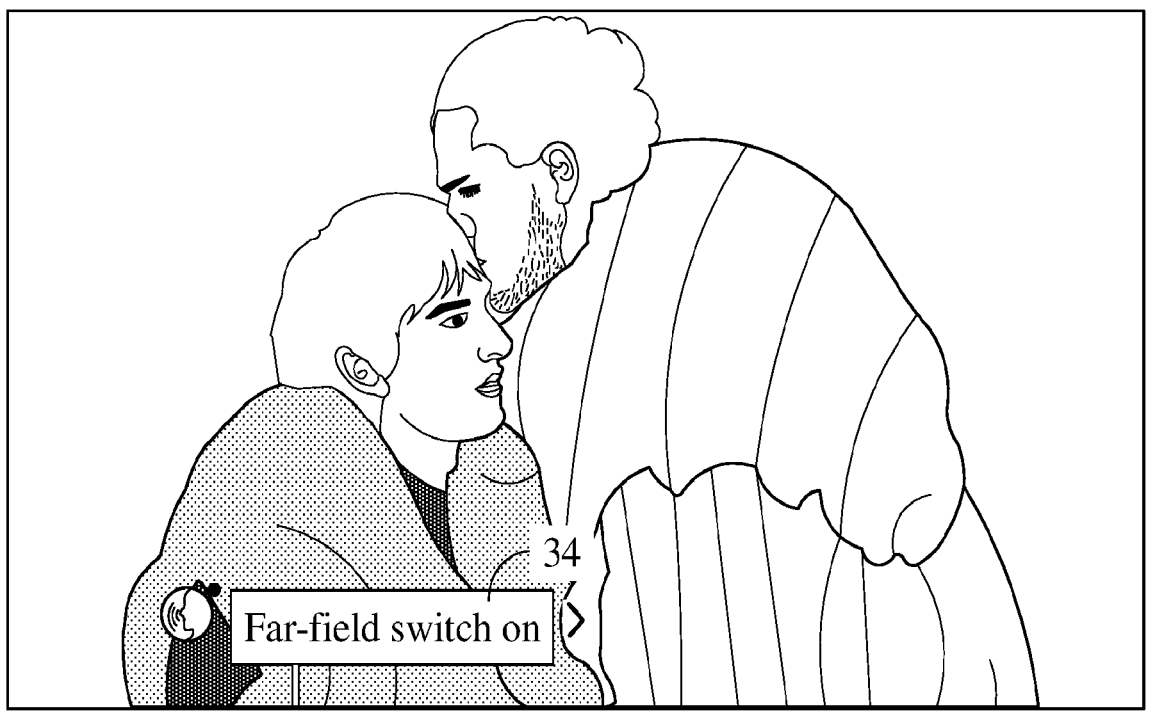
FIG. 34 is a schematic diagram of an interface 3 in FIG. 28.

The presenting manner of the first prompt information will be illustrated below with reference to the accompanying drawings. The presenting manner of the first prompt information may refer to FIG. 34, which is a schematic diagram of an interface 3 in FIG. 28. The far-field switch is in the on state, and the controller controls the display to present the first prompt information "Far-field switch on" 34.

In some embodiments, a wake-up switch and the far-field switch are configured such that when the wake-up switch is turned off, the far-field switch is turned off. The wake-up switch is configured to control whether the controller responds to the user voice command. If the wake-up switch is turned off, the controller will not make any response to the user voice command. In this case, continuing to turn on the far-field switch is undoubtedly a waste of display apparatus resources. Therefore, in some embodiments, when the wake-up switch is turned off, the far-field switch is turned off. In some embodiments, when the far-field switch is turned off, the wake-up switch may be turned on or turned off. In some embodiments, if the far-field switch is turned off, the controller cannot use the far-field sound receiving function. In this case, the user may still utilize the sound receiving function of the remote control to receive a user voice command. Therefore, in the present embodiments, when the far-field switch is turned off, the wake-up switch may be turned on or turned off.

In some embodiments, if the far-field switch is in the on state, the controller may be further configured to read the state of the wake-up switch, and if the wake-up switch is in the on state, the display may be controlled to present prompt information that the wake-up switch is in the on state.

In some embodiments, if the far-field switch is in the on state, the controller may be further configured to read the state of the wake-up switch, and if the wake-up switch is in the off state, the display may be controlled to present prompt information that the wake-up switch is in the off state.

In some embodiments, in order to prevent presenting of the first prompt information for a long time from affecting the playback effect, in some embodiments, the controller may count the display time of the first prompt information, and if the display time reaches a preset time, the controller controls the display to cancel the first prompt information.

Figure 35:
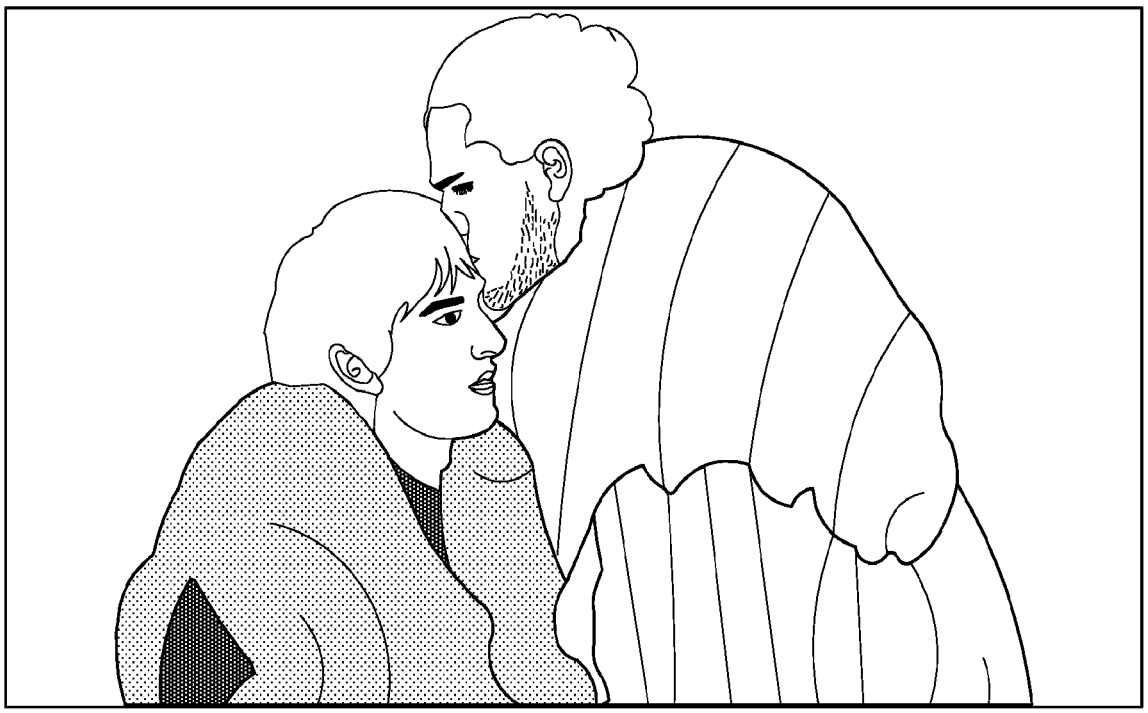
FIG. 35 is a schematic diagram of an interface 4 in FIG. 28.
Figure 36:
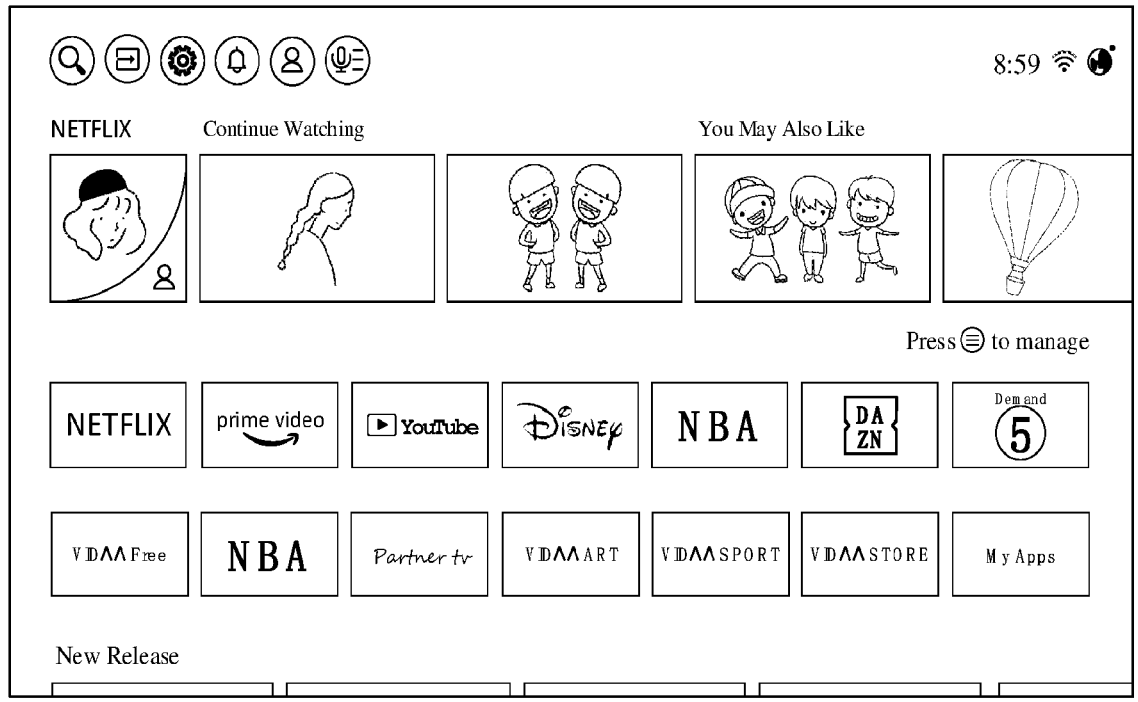
FIG. 36 is a schematic diagram of an interface 5 in FIG. 28.
Figure 37:
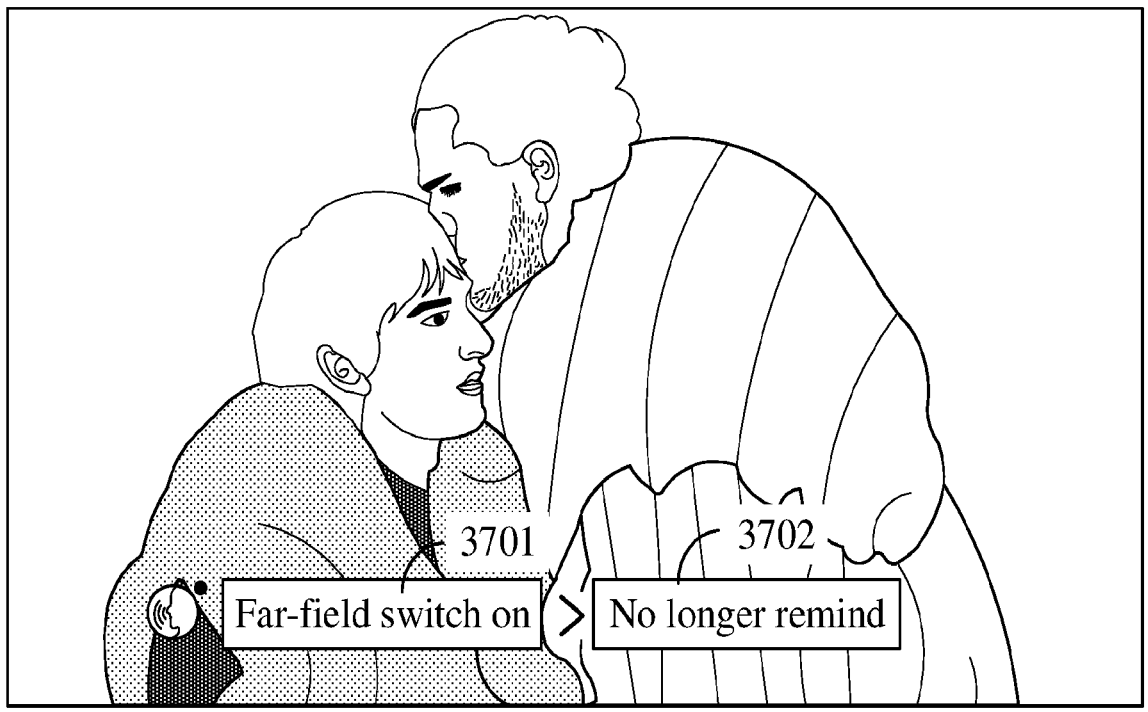
FIG. 37 is a schematic diagram of an interface 6 in FIG. 28.
Figure 38:
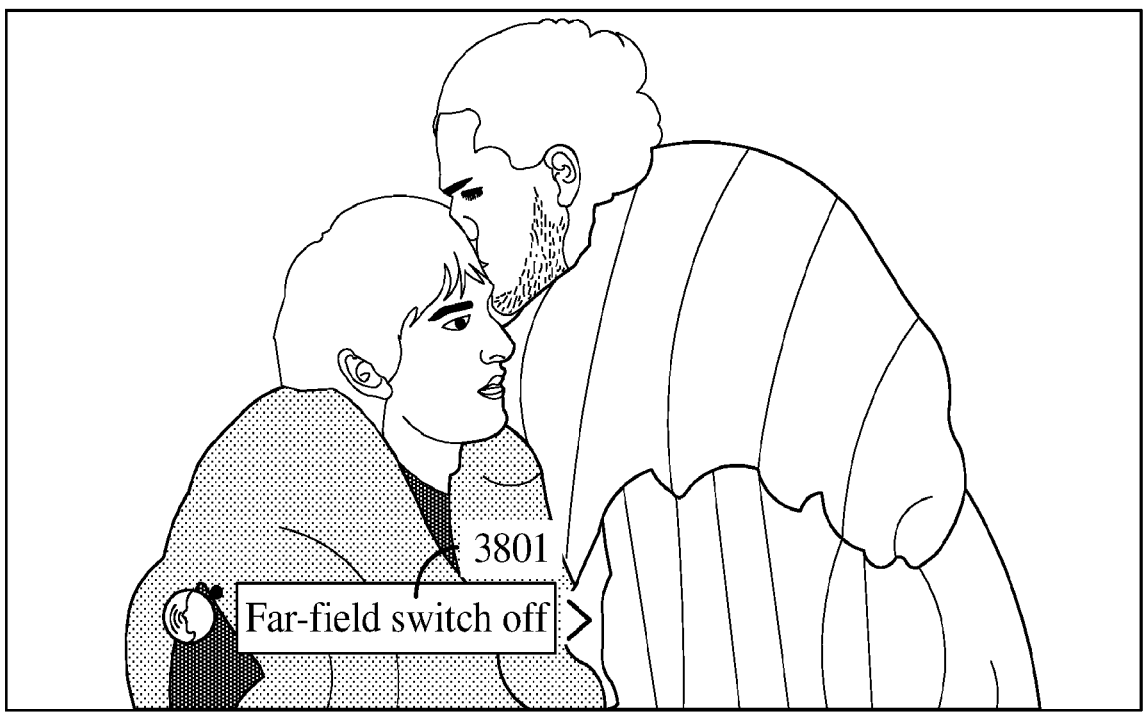
FIG. 38 is a schematic diagram of an interface 7 in FIG. 28.
Figure 39:
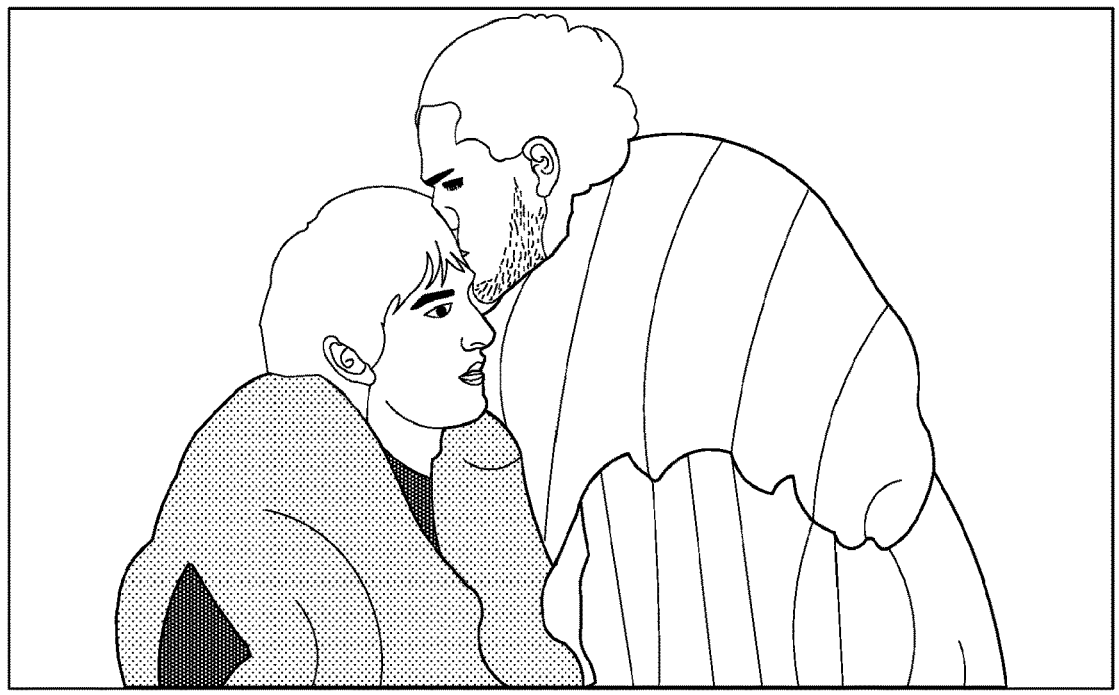
FIG. 39 is a schematic diagram of an interface 8 in FIG. 28.
Figure 40:
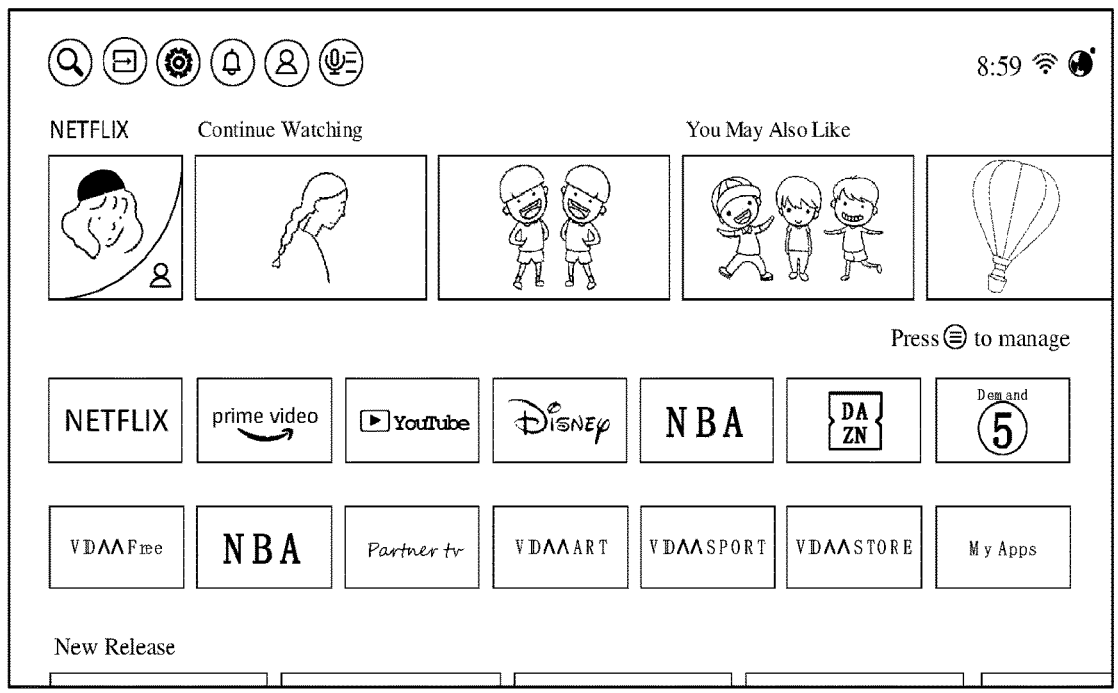
FIG. 40 is a schematic diagram of an interface 9 in FIG. 28.

Cancelling the first prompt information is illustrated below with reference to the accompanying drawings. A display page of the display after the first prompt information is canceled may refer to FIG. 35, which is a schematic diagram of an interface 4 in FIG. 28. After the first prompt information is canceled, the display apparatus continues to present the play content. FIG. 36 is a schematic diagram of an interface 5 in FIG. 28. FIG. 37 is a schematic diagram of an interface 6 in FIG. 28, where 3701 refers to prompt information of "Far-field switch on" and 3702 refers to prompt information of "No longer remind". FIG. 38 is a schematic diagram of an interface 7 in FIG. 28, where 3801 refers to prompt information of "Far-field switch off". FIG. 39 is a schematic diagram of an interface 8 in FIG. 28. FIG. 40 is a schematic diagram of an interface 9 in FIG. 28.

It should be noted that "Far-field switch is off" is only an exemplary introduction of the display content of second prompt information, and the above content does not construe as limitation. In practical applications, the display content of the second information may be configured according to user's requirements. Any content that may remind the user that the far-field switch is in the off state can be used as the content of the second prompt information.

In some embodiments, in order to prevent presenting of the second prompt information for a long time from affecting the display effect, the controller may count the display time of the second prompt information, and if the display time reaches a preset time, the controller controls the display to cancel the prompt information. The preset time may be set according to user's requirements. For example, the preset time may be equal to 3 s.

Figure 33:
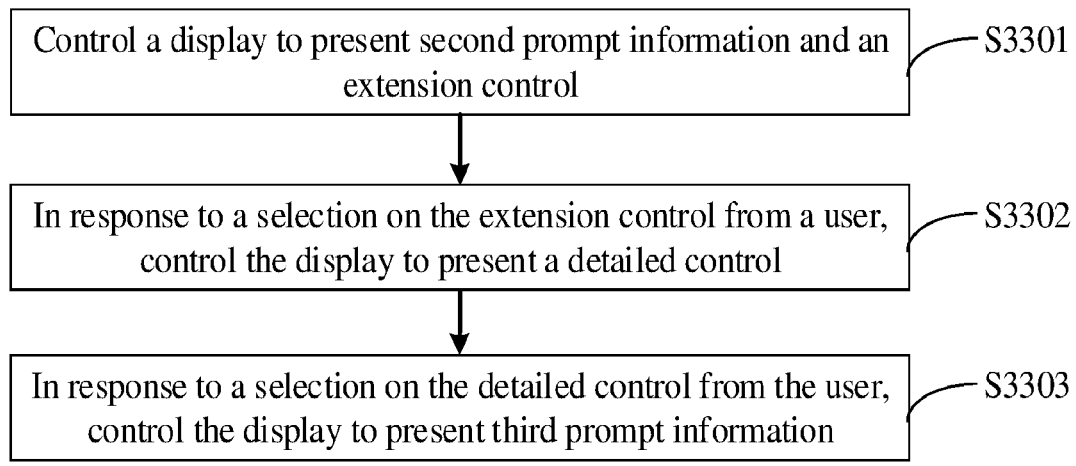
FIG. 33 is a flow diagram of a display process of first prompt information and second prompt information according to some embodiments of the present disclosure.

In order to prevent presenting of the second prompt information and third prompt information for a long time from covering more play content, the present embodiment displays the second prompt information and the third prompt information step by step, as shown in FIG. 33, which is a flow diagram of a display process of the second prompt information and the third prompt information according to some embodiments of the present disclosure. The controller is further configured to execute S3301-S3303.

The display is controlled to present the second prompt information and an extension control (S3301).

The display is controlled to present a detailed control in response to a selection on the extension control from a user (S3302).

The display is controlled to present the third prompt information in response to a selection on the detailed control from the user (S3303).

Figure 41:
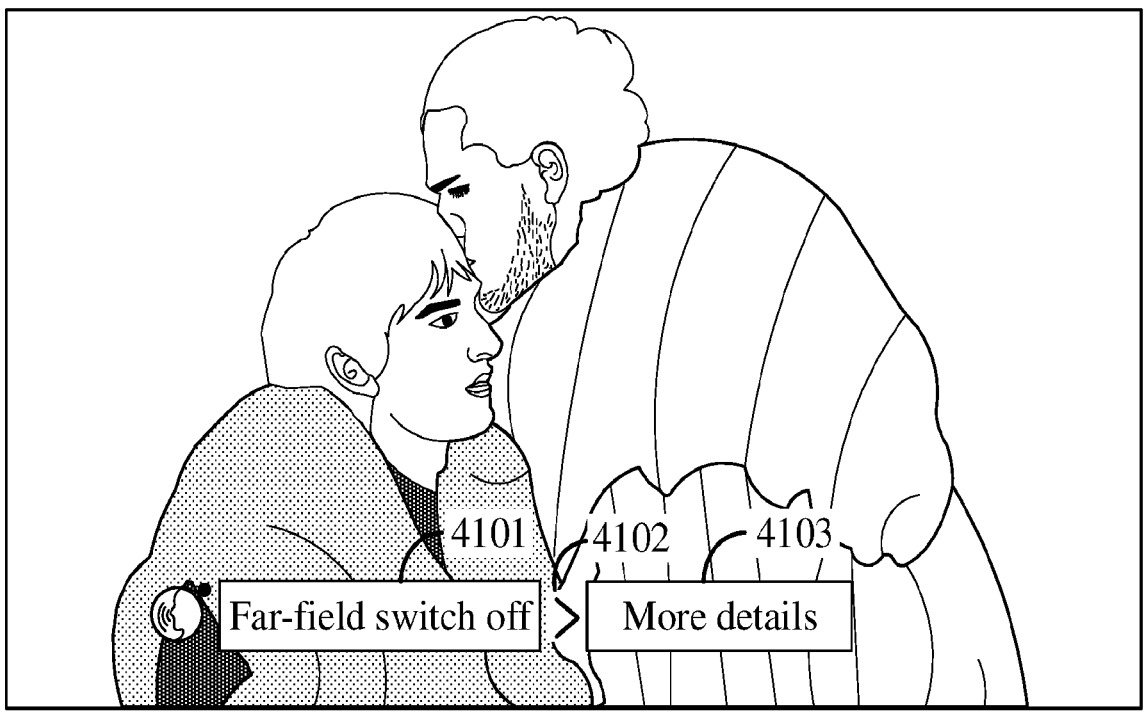
FIG. 41 is a schematic diagram of an interface 10 in FIG. 28.
Figure 42:
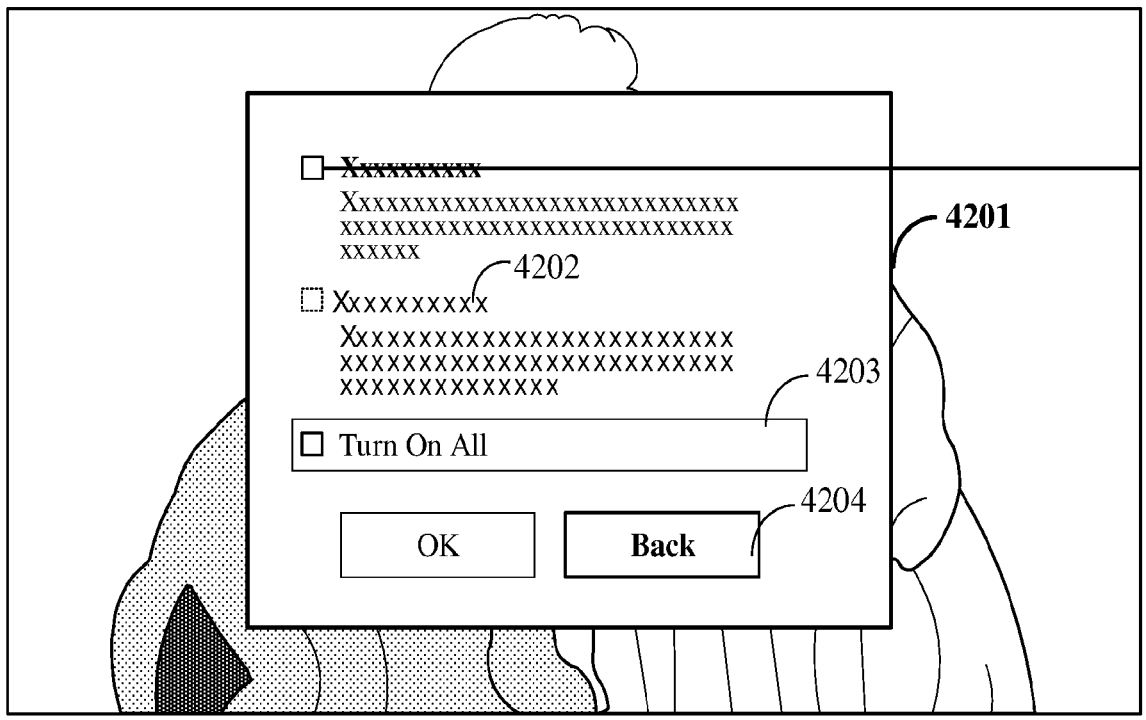
FIG. 42 is a schematic diagram of an interface 11 in FIG. 28.

The presenting manner of the home page is illustrated below with reference to the accompanying drawings. In the present embodiments, the preset rule is "Whether the user is a new user within 2 months, and whether the user has used the display apparatus for more than 7 days since the last time." In the present embodiments, the user is a new user within 2 months, and the user has not used the display apparatus for more than 7 days since the last time. In this case, an interface displayed by the display apparatus may refer to FIG. 41. FIG. 41 corresponds to a schematic diagram of an interface 10 in FIG. 28. The display displays the second prompt information "Far-field switch off" 4101, the extension control 4102 and the detailed control 4103 for presenting more details. The display apparatus displays the third prompt information in response to a selection on the detailed control 4103. FIG. 42 is a schematic diagram of the interface 11 in FIG. 28. The interface shown in FIG. 42 is configured to display the third prompt information 4201. In the present embodiments, the third prompt information may include an on-off setting option 4202 of the wake-up switch, and an on-off setting option 4203 of the far-field switch. Optionally, in order to prevent displaying of the third prompt information for a long time from affecting a viewing effect of the user, in some embodiments, the third prompt information may further include a back control 4204, and the controller controls the display to cancel the third prompt information in response to a selection on the back control 4204.

Figure 43:
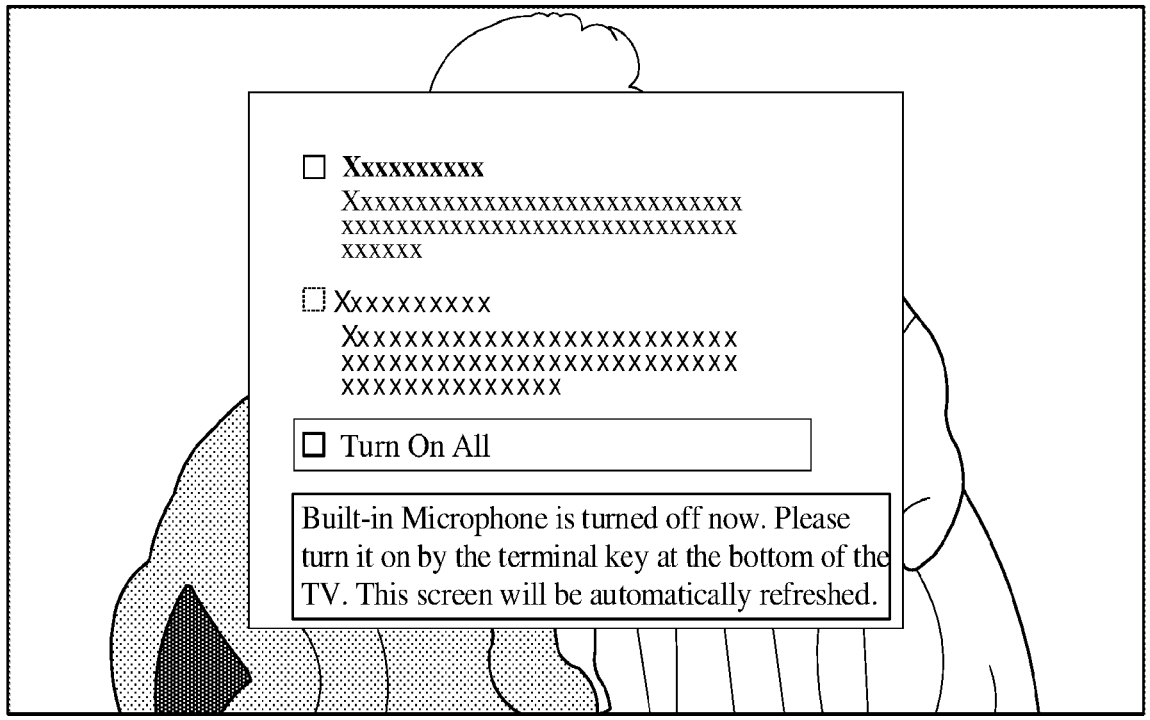
FIG. 43 is a schematic diagram of an interface 12 in FIG. 28.

In some embodiments, the controller may further determine whether the sound receiving device is in the on state. The specific determining manner may refer to the above determining manner of whether the wake-up switch or the far-field switch being turned on, which is not repeated herein. If the sound receiving device is in the off state, the interface displayed by the display may refer to FIG. 43, which corresponds to a schematic diagram of an interface 12 in FIG. 28. The display presents prompt information for turning on the sound receiving device.

In some embodiments, the display apparatus further includes a remote control, the remote control is provided with the voice key, and the remote control may send a starting instruction to the controller in response to a selection on the voice key, so that the controller is started in response to the starting instruction.

The voice key in the present embodiments includes at least two functions. One is that when the display apparatus is in the off state, the user may control the display to turn on by pressing the voice key; the other is that when the display apparatus is in the on state, the user presses the voice key for a long time, and thus the remote control may start the sound receiving function. The key code corresponding to the voice key is different from the key code corresponding to the power key.

Figure 44:
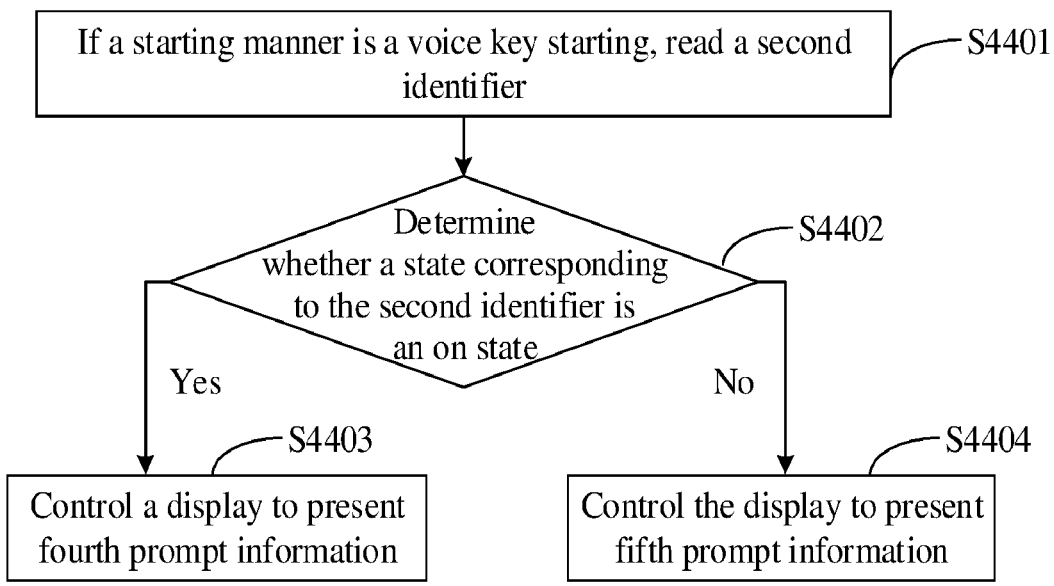
FIG. 44 is a flow diagram of a prompt information display process according to some embodiments of the present disclosure.

The following illustrates the presenting process of the prompt information in a scenario where the starting manner is the voice key starting with reference to the specific drawings. FIG. 44 is a flow diagram of the presenting process of the prompt information according to some embodiments of the present disclosure. The controller is further configured to execute S4401-S4404.

If the starting manner is the voice key starting, a second identifier is read (S4401). The second identifier is an identifier for the wake-up switch.

In some embodiments, the wake-up switch is configured to control whether the controller responds to the user voice, and the user voice content includes voice content received by the remote control and voice received by the controller using the far-field sound receiving function. When the wake-up switch is in the on state, the controller may respond to the user voice command; and when the wake-up switch is in the off state, the controller cannot respond to the user voice command.

In some embodiments, the second identifier may be configured for the wake-up switch, so that the controller knows that the wake-up switch is in the on state or in the off state. When the wake-up switch is turned off, the state corresponding to the second identifier is the off state, and when the wake-up switch is turned on, the state corresponding to the second identifier is the on state. Therefore, the controller may determine the state of the wake-up switch through the second identifier.

Whether a state corresponding to the second identifier is an on state is determined (S4402).

If a state corresponding to the second identifier is the on state, the display is controlled to present fourth prompt information (S4403), the fourth prompt information is configured to prompt the user for a new starting manner, and the new starting manner is different from the starting manner adopted during a current starting manner of the display apparatus.

Figure 46:
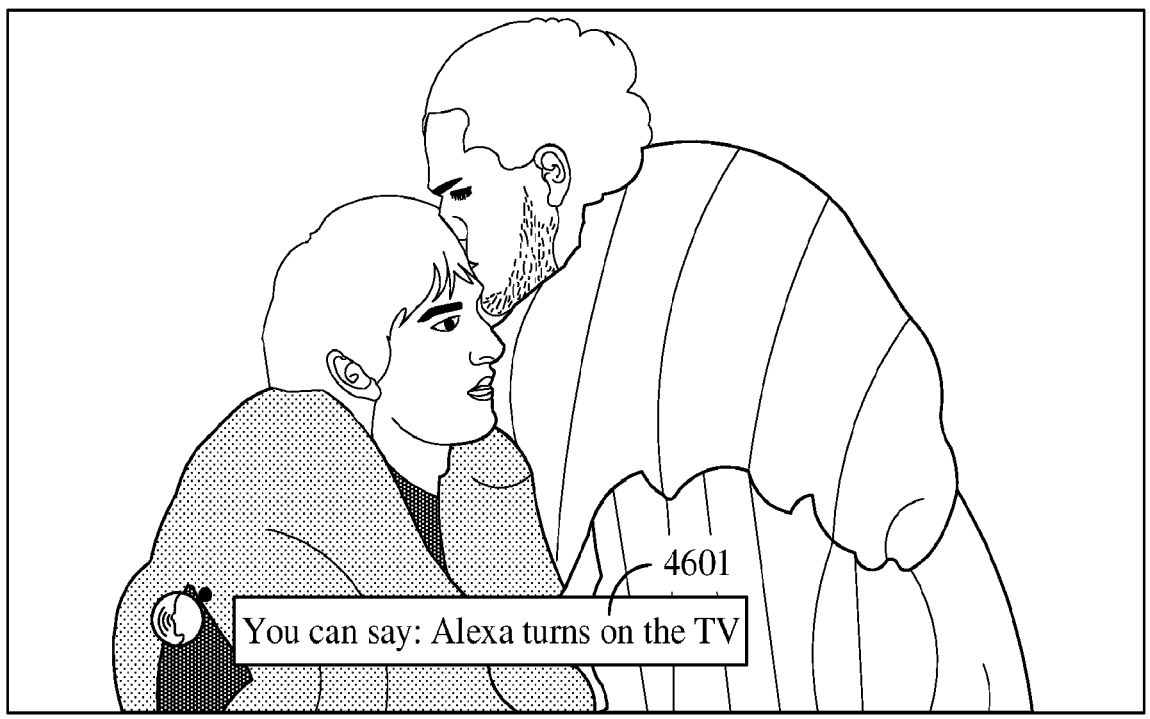
FIG. 46 is a schematic diagram of an interface 13 in FIG. 28.

The fourth prompt information is illustrated below with reference to the accompanying drawings. The presenting manner of the fourth prompt information may refer to FIG. 46, which is a schematic diagram of an interface 13 in FIG. 28. The wake-up switch is in the on state, and the controller controls the display to present the fourth prompt information "You can say: Alexa turns on the TV" (4601).

It should be noted that "You can say: Alexa turns on the TV" is for illustration, and other information may also be used.

If the wake-up switch is in the on state, the controller may not read the state of the far-field switch, because the display apparatus may collect the user voice by utilizing the sound receiving function of the remote control.

If the wake-up switch is in the on state, the controller may continue to read the state of the far-field switch, and generate corresponding prompt information according to the state of the far-field switch.

In some embodiments, in order to prevent presenting of the fourth prompt information for a long time from affecting the view effect, the controller may count a display time of the fourth prompt information, and if the display time reaches a preset time, the controller controls the display to cancel the prompt information. The preset time may be set. For example, the preset time may be 3 s.

Figure 47:
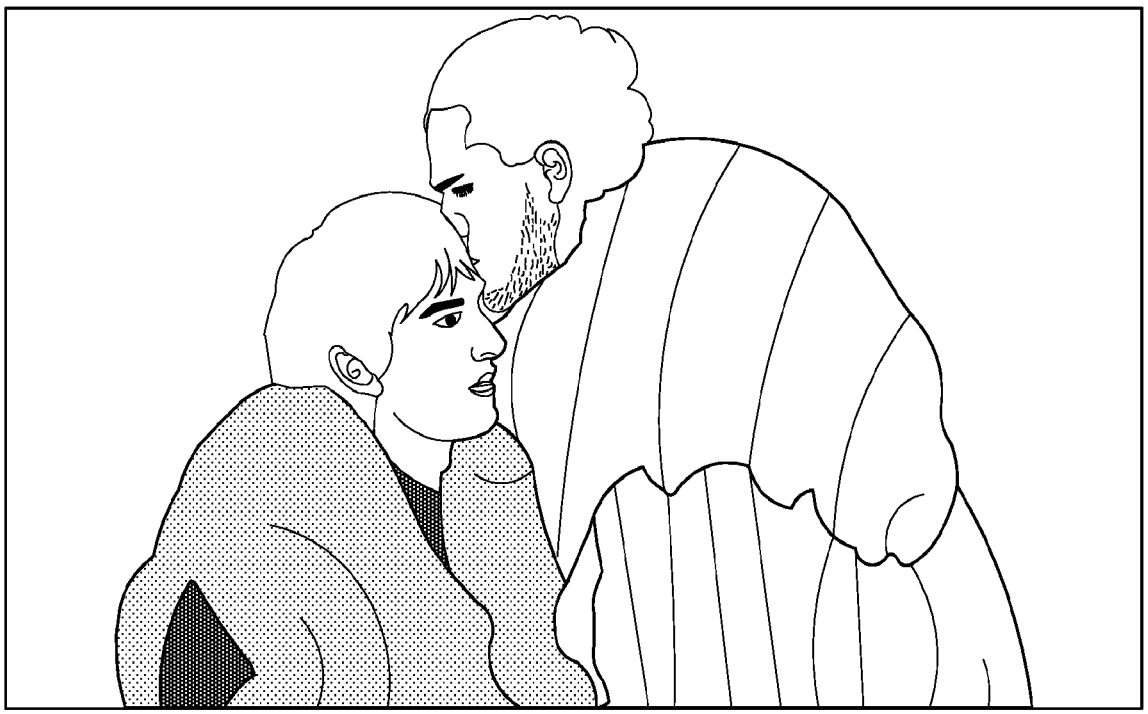
FIG. 47 is a schematic diagram of an interface 14 in FIG. 28.

Cancelling the fourth prompt information is illustrated below with reference to the accompanying drawings. A display page of the display after the fourth prompt information is canceled may refer to FIG. 47, which is a schematic diagram of an interface 14 in FIG. 28. After the fourth prompt information is canceled, the display apparatus continues to present the play content.

In some embodiments, the user may control the display to present the home page by pressing a home key.

The presenting manner of the home page is illustrated below with reference to the accompanying drawings. In the present embodiments, the user presses the home key, and the display presents the home page. At this time, the display page of the display may refer to FIG. 36, which corresponds to a schematic diagram of an interface 5 in FIG. 28.

If the state corresponding to the second identifier is the off state, the display is controlled to present fifth prompt information (S4404). The fifth prompt information is configured to remind the user that the wake-up switch is in the off state.

The fifth prompt information is illustrated below with reference to the accompanying drawings. The presenting manner of the fifth prompt information may refer to FIG. 48, which is a schematic diagram of an interface 15 in FIG. 28. The wake-up switch is in the off state, and the controller controls the display to present the fifth prompt information "Wake-up switch off" (4801).

In some embodiments, the fifth prompt information is further configured to remind a manner for turning on the wake-up switch, or the fifth prompt information is further configured to remind a manner for turning on the wake-up switch and the far-field switch.

Figure 45:
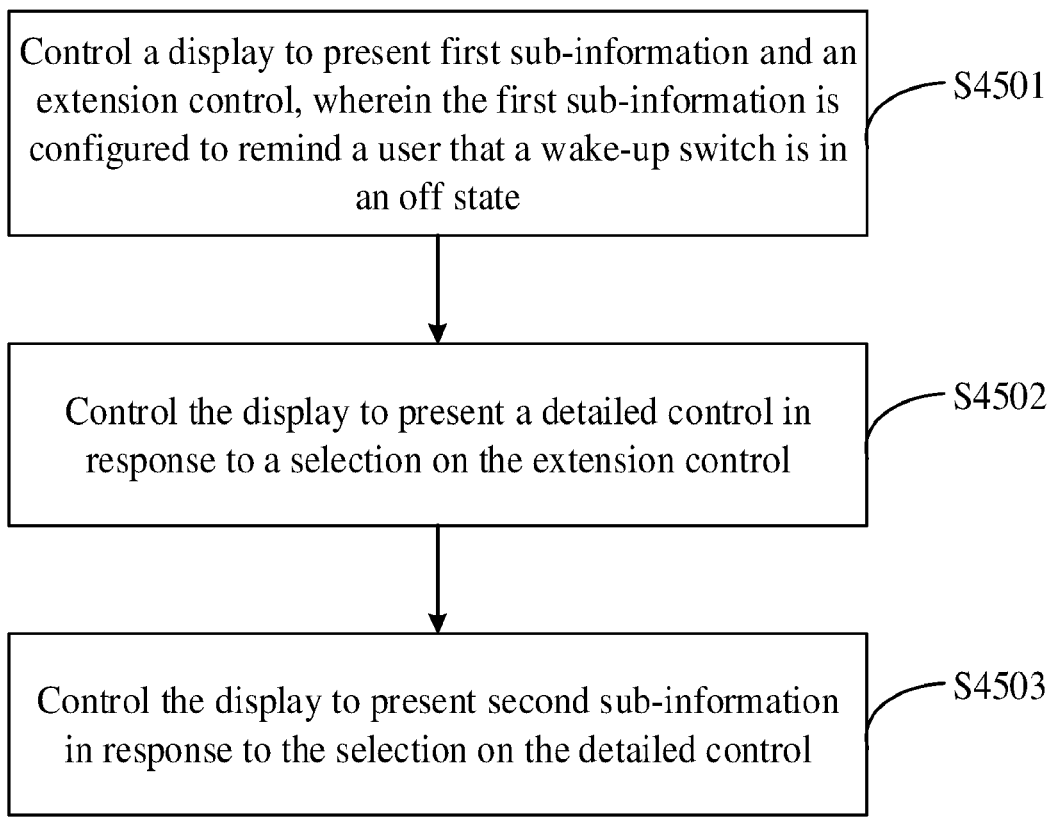
FIG. 45 is a flow diagram of a display process of fifth prompt information according to some embodiments of the present disclosure.

In order to prevent the fifth prompt information from covering more play content, the present embodiments provide a manner for presenting the fifth prompt information. FIG. 45 illustrates a flow diagram of a presenting process of the fifth prompt information according to some embodiments. In the present embodiments, the fifth prompt information includes first sub-information, an extension control, a detailed control and second sub-information. The controller is further configured to execute S4501-S4503.

If the state corresponding to the second identifier is the off state, the display is controlled to present first sub-information and an extension control, and the first sub-information is configured to remind the user that the wake-up switch is in the off state (S4501).

The display is controlled to present a detailed control in response to a selection on the extension control (S4502).

The display is controlled to present the second sub-information in response to the selection on the detailed control (S4503). The second sub-information is configured to remind a manner for turning on the wake-up switch, and the fifth prompt information is further configured to remind a manner for turning on the wake-up switch and the far-field switch.

Figure 48:
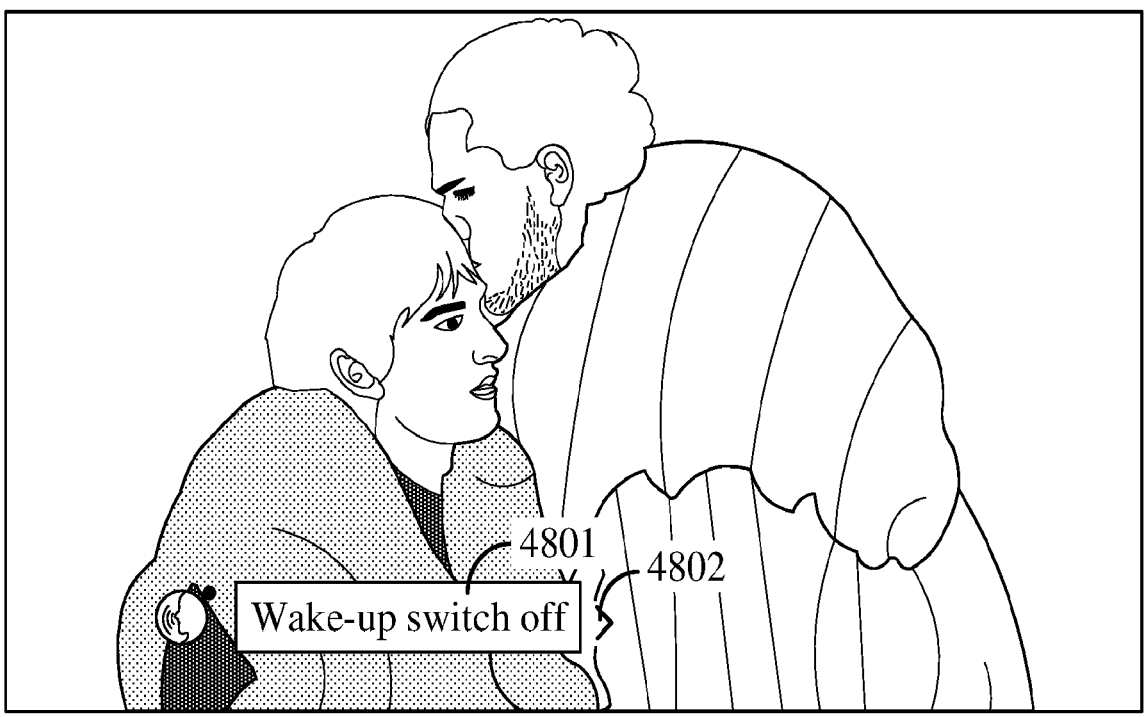
FIG. 48 is a schematic diagram of an interface 15 in FIG. 28.
Figure 49:
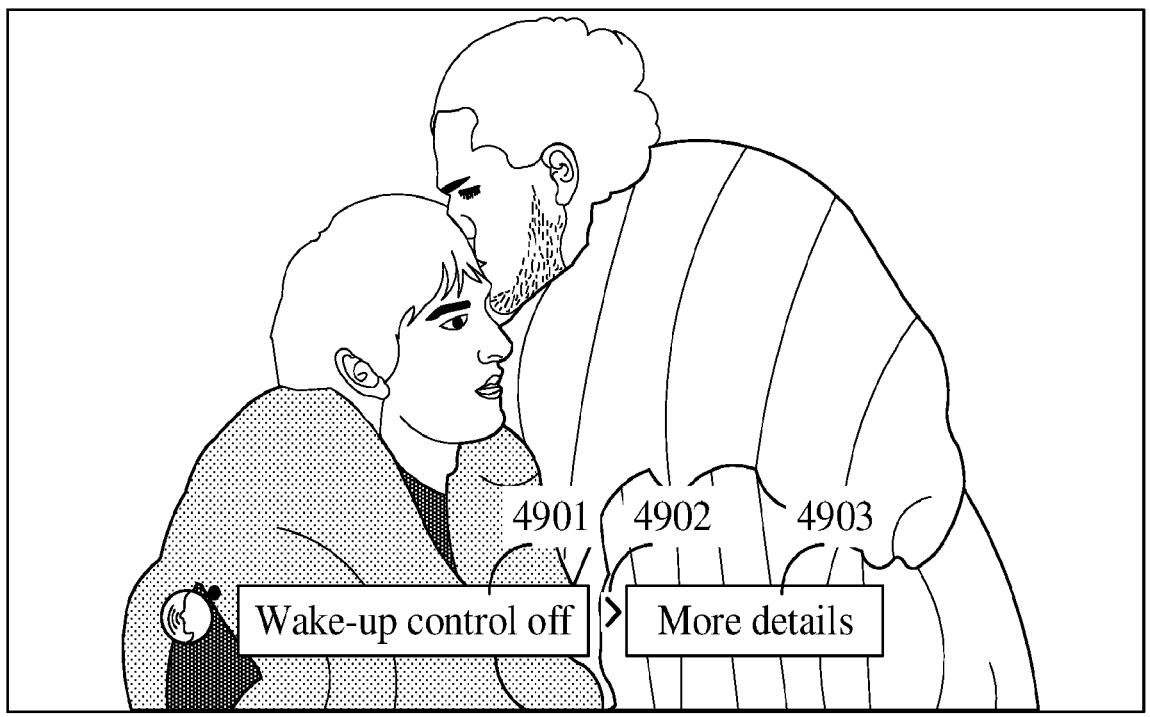
FIG. 49 is a schematic diagram of an interface 16 in FIG. 28.
Figure 50:
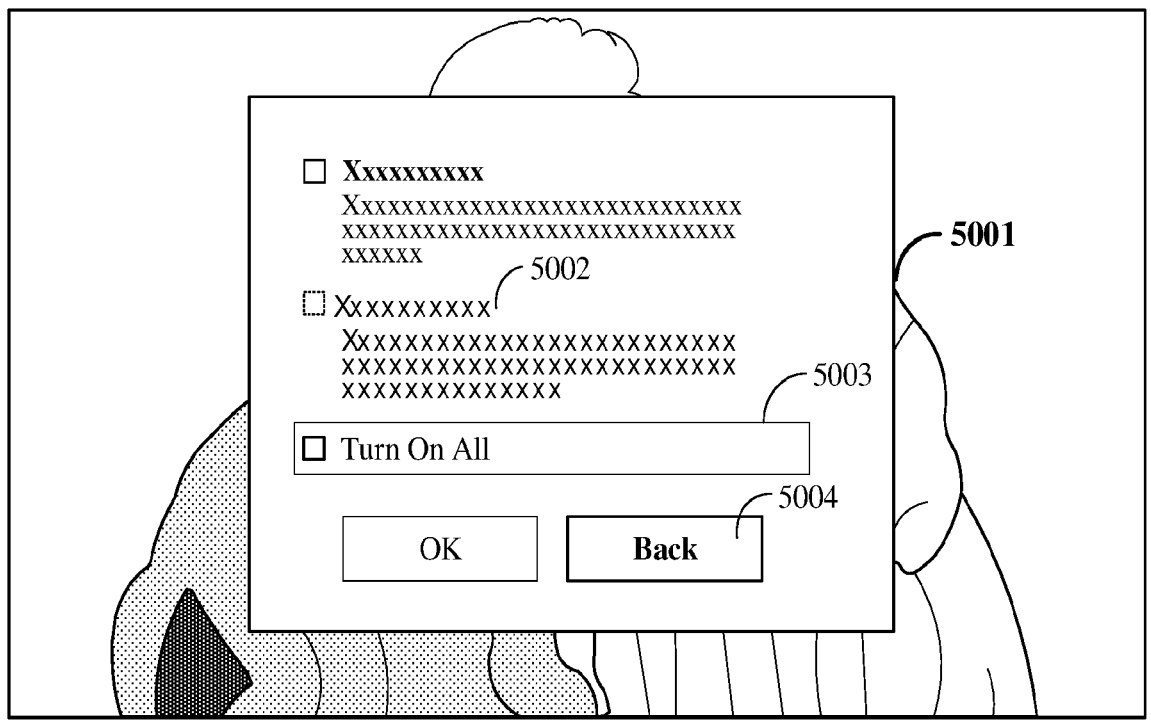
FIG. 50 is a schematic diagram of an interface 17 in FIG. 28.

As shown in FIG. 48, when it is determined that the wake-up switch is in the off state, the controller controls the display to present the first prompt information "Wake-up switch off" 4801 and an extension control 4802. The user may choose the extension control or not choose the extension control according to requirements. In a scenario where the user selects the extension control, an interface displayed by the display may refer to FIG. 49, which corresponds to a schematic diagram of an interface 16 in FIG. 28. The display presents a first sub-control 4901, an extension control 4902 and a detailed control 4903. The user may choose to select the detailed control or not to select the detailed control according to requirements. In a scenario where the user selects the detailed control, an interface presented by the display may refer to FIG. 50, which corresponds to a schematic diagram of an interface 17 in FIG. 28. The display presents second sub-information 5001, and the second sub-information may include an on-off setting option 5002 of the wake-up switch, and an on-off setting option 5003 of the far-field switch. In some embodiments, in order to prevent presenting of the third prompt information for a long time from affecting a view effect, the second sub-information may further include a back control 5004, and the controller controls the display to cancel the second sub-information in response to a selection on the back control 5004.

A method for voice interaction according to embodiments of the present disclosure includes: a starting manner of the starting instruction is read in response to a starting instruction for starting a display apparatus; and prompt information is generated according to the starting manner, where the prompt information is configured to remind a manner of voice interaction between a user and the display apparatus. It can be seen that the method shown in the present embodiments may generate different prompt information according to the starting manner, the prompt information is configured to remind the manner of voice interaction between the user and the display apparatus, the user may better understand the display apparatus through the prompt information, to thereby improve user's experience.

Some mainstream voice services on the display apparatus 200 are currently only available in some countries. In order to cover more countries, a display apparatus 200 may contain various voice services, voice command standards for controlling the same function in each voice service are different. If the various voice services are used, different types of voice commands need to be processed on the display apparatus 200. Furthermore, adding modes to process various voice commands on the display apparatus 200 will increase the amount of codes in the display apparatus 200 and the maintenance cost of the display apparatus 200.

In some embodiments, the above server 400 may uniformly convert the voice commands of several voice services into voice commands that conform to one command standard, so that the display apparatus 200 does not need to parse voice contents of the different voice services separately, and thus the maintenance cost of the display apparatus 200 is also reduced while the amount of codes for parsing the voice command in the display apparatus 200 is reduced.

Figure 51:
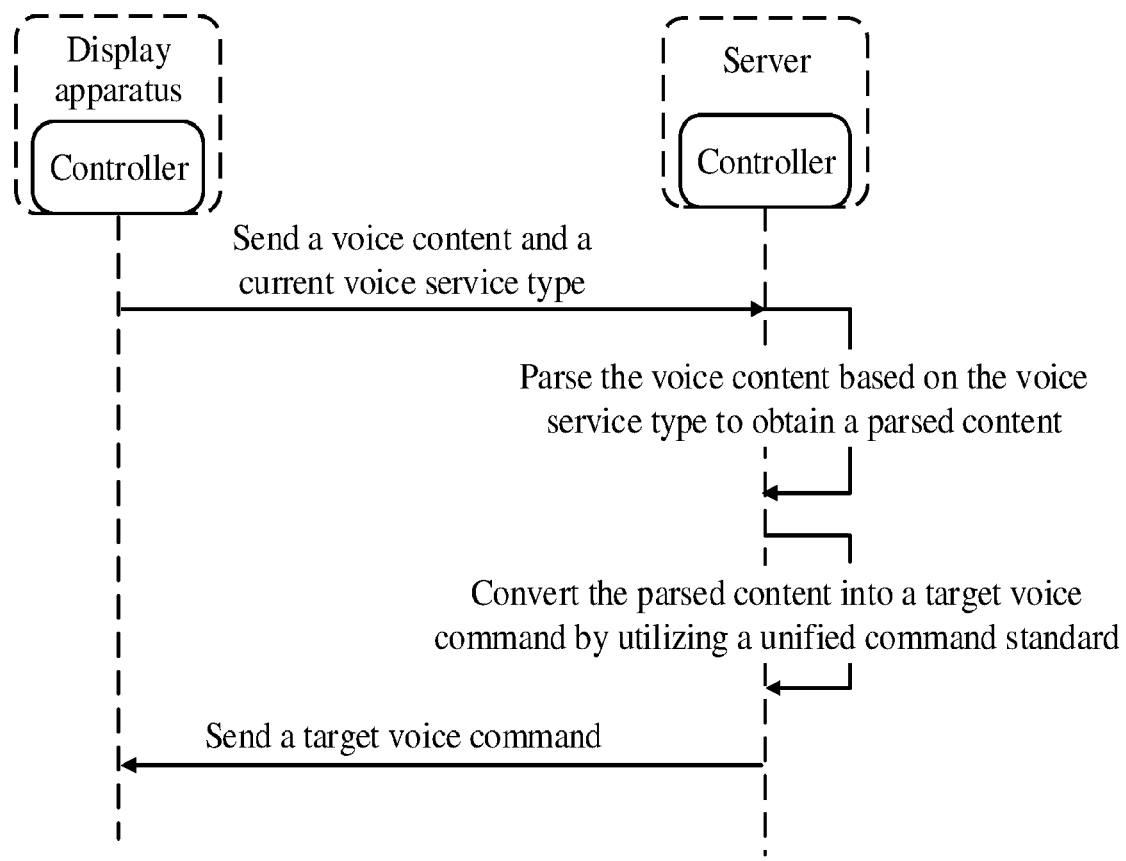
FIG. 51 shows a communication flow diagram of a server 400 and a display apparatus 200 according to some embodiments of the present disclosure.

FIG. 51 shows a communication flow diagram of the server 400 and the display apparatus 200 according to some embodiments. As shown in FIG. 51, the server 400 in the embodiments of the present disclosure also parses the voice content according to a current voice service type based on the display apparatus 200, but does not generate a voice command conforming to the current voice service, but utilizes a unified command standard to convert the parsed content into a target voice command. In this way, the display apparatus 200 will always receive one type of target voice command, and will only perform parsing processing for this one type of target voice command; and there is no need to configure codes for parsing the various voice commands.

The target voice command sent back to the display apparatus 200 by a traditional server may be "turnOn" or "true". At this time, the display apparatus 200 should not only configure a code 1 for parsing the target voice command of "turnOn", but also configure a code 2 for parsing the target voice command of "true". However, if the server 400 in the embodiment of the present disclosure converts all the voice contents "turnOn" and "true" based on a voice service A and a voice service B into "1" of the unified command standard, then "1" serves as the target voice command to be sent back to the display apparatus 200, the display apparatus 200 only needs to parse the command "1", and only needs to configure one set of codes, which can effectively avoid the problem of code redundancy in the display apparatus 200.

In the above process, the controller of the server 400 may be configured to: receive the voice content sent from the display apparatus 200 and the voice service type currently used by the display apparatus 200. Furthermore, the voice content in the current voice service scenario may be parsed, and the user intention is analyzed to obtain the parsed content. Then, the parsed content is converted into the target voice command that conforms to the target command standard. Finally, the target voice command is sent back to the display apparatus 200, so that the display apparatus 200 performs corresponding operations according to the requirements of the target voice command.

In some embodiments, the above server 400 may uniformly convert the voice commands of the several voice services into the voice commands that conform to one command standard, so that the display apparatus 200 does not need to parse the voice contents of the different voice services separately, and thus the maintenance cost of the display apparatus 200 is also reduced while the amount of code for parsing the voice command in the display apparatus 200 is reduced.

Figure 52:
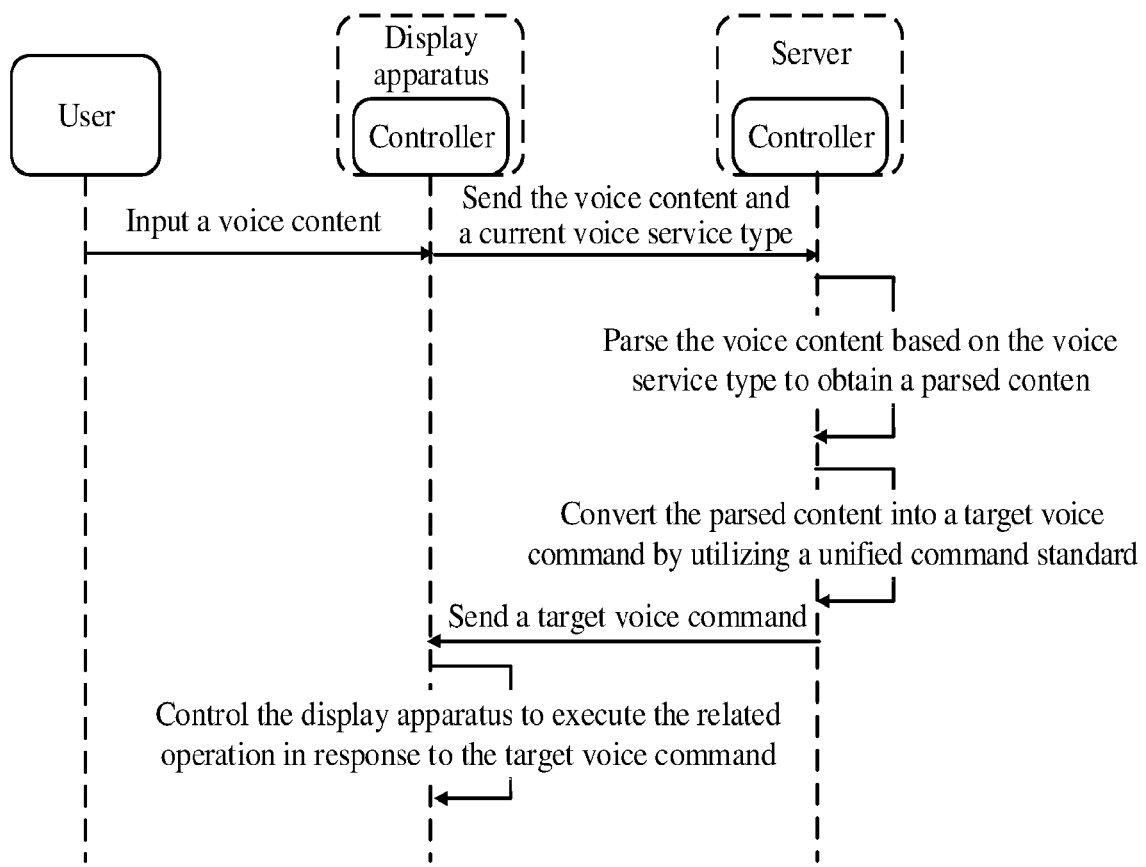
FIG. 52 shows another communication flow diagram of a server 400 and a display apparatus 200 according to some embodiments of the present disclosure.

An embodiment of the present disclosure further provides a display apparatus 200. As shown in FIG. 52, the display apparatus 200 may provide different voice services for a user to use according to user's requirements, and then receive a voice content input from the user in a current voice service scenario. The display apparatus 200 sends the voice content and a type of the current voice service to a server 400, and the server 400 generates a target voice command and sends the target voice command back to the display apparatus 200. The display apparatus 200 then executes related operations and the like according to the requirements of the target voice command.

In this process, a controller 250 of the display apparatus 200 may be configured to: send the voice content input from the user to the server 400, then, receive the target voice command sent back by the server 400; and finally, control the display apparatus 200 to execute the related operation in response to the target voice command.

Before the user inputs a voice command to control the display apparatus 200, the user may select different voice services to use on the display apparatus 200 according to their needs, such as Google Assistant, amazon alexa (Amazon artificial intelligence assistant), etc. In order to provide the user with more convenient and diverse voice services, the display apparatus 200 may display a voice service selection page in various forms, for example, display during a navigation process when the display apparatus 200 is started for the first time, display on a startup page after the display apparatus 200 is started, or display on a setting page of the display apparatus 200, or directly display on the display apparatus 200 according to a control command input from the user.

Figure 53:
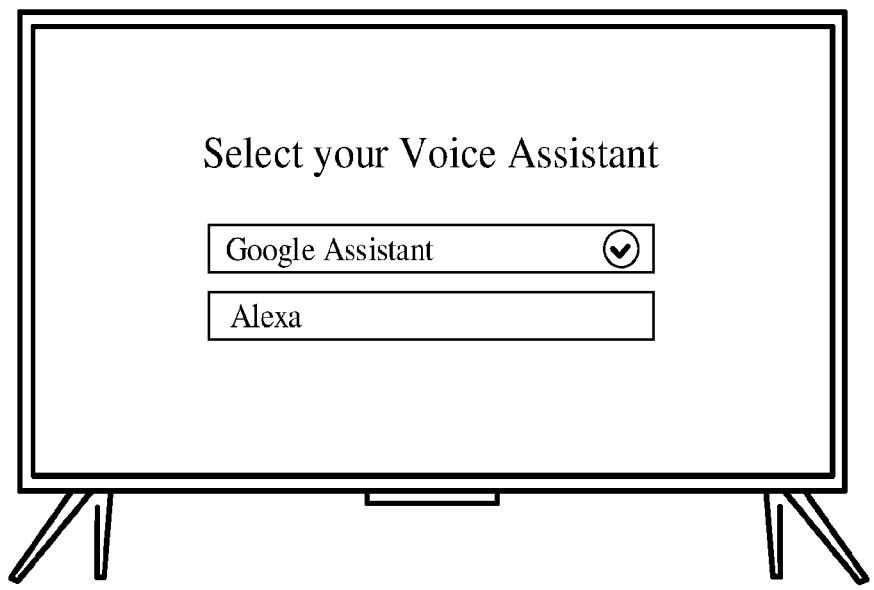
FIG. 53 shows a schematic diagram of a voice service selection page according to some embodiments of the present disclosure.

In some embodiments, the voice service selection page displayed during the navigation process when the display apparatus 200 is started for the first time is shown in FIG. 53. The voice services for selection in FIG. 53 include "Google Assistant" and "Alexa", and also prompt content "Select your Voice Assistant" that prompts the user to make a selection. The user may select the target voice service on the voice service selection page through voice control or a control device 100 such as a remote controller or the like.

Figure 54:
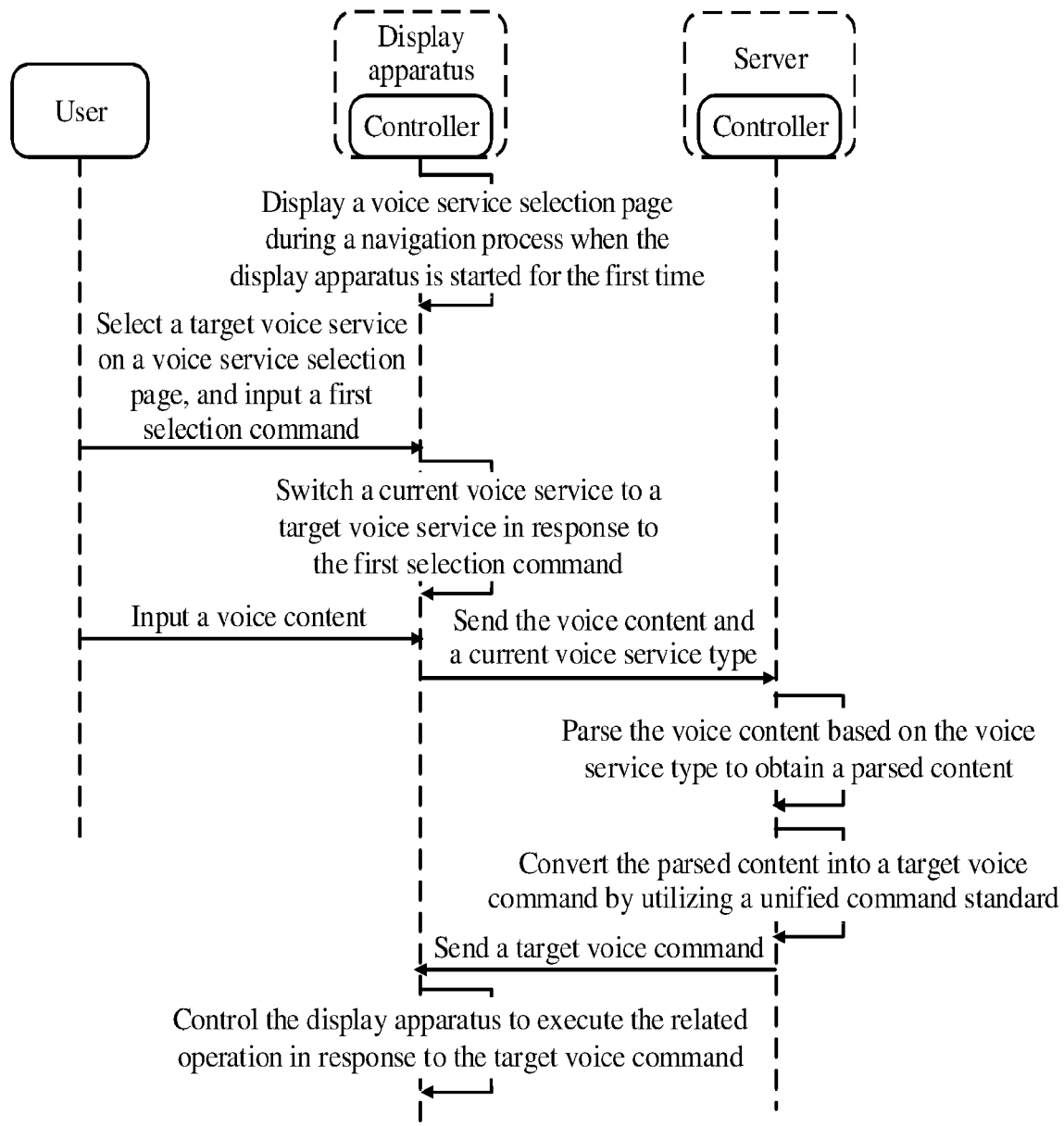
FIG. 54 shows a processing flow diagram of a display apparatus 200 according to some embodiments of the present disclosure.

In this process, as shown in FIG. 54, the controller 250 of the display apparatus 200 is configured to: display the voice service selection page shown in FIG. 53 during a navigation process when the display apparatus 200 is started for the first time. The user selects the target voice service on the voice service selection page, that is, a first selection command is input to the display apparatus 200, and the controller 250 switches the voice service on the display apparatus 200 to the target voice service, for example "Google Assistant" in response to the first selection command.

After the display apparatus 200 sets the voice service, as shown in FIG. 54, the user may input the voice content to the display apparatus 200 in the scenario of the current target voice service, then the controller 250 of the display apparatus 200 sends the voice content and a type of the target voice service together to the server 400, and the server 400 continues processing.

In some embodiments, the user inputs the first selection command by pressing a direction key of the control device 100 such as a remote control, or inputting a voice command directly to the display apparatus 200.

In some embodiments, the control device 100 is also configured with a function key specially used for receiving the voice content. The user may input the voice content to the control device 100 by pressing a voice function key on the control device 100, and then the control device 100 forwards the voice content to the display apparatus 200. Alternatively, some display apparatuses 200 are themselves configured with a voice receiving device, the user may directly input the voice content to the display apparatus 200, and the voice receiving device directly receives the voice content.

Figure 55:
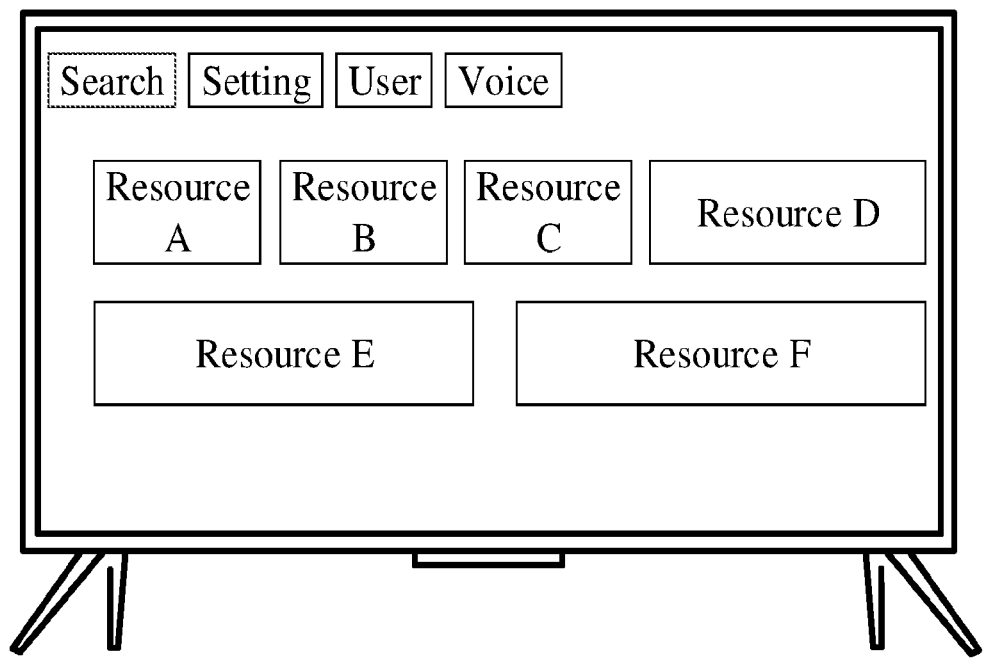
FIG. 55 shows a schematic diagram of a startup page of a display apparatus 200 according to some embodiments of the present disclosure.

In some embodiments, a startup page after the display apparatus 200 is started is shown in FIG. 55. The startup page in FIG. 55 displays many resource options, and displays some function options at the top of the startup page, such as "Search", "Setting", "User", "Voice", etc. A microphone icon may be used as a "voice" option, and the user may select the voice option on the startup page.

Figure 56:
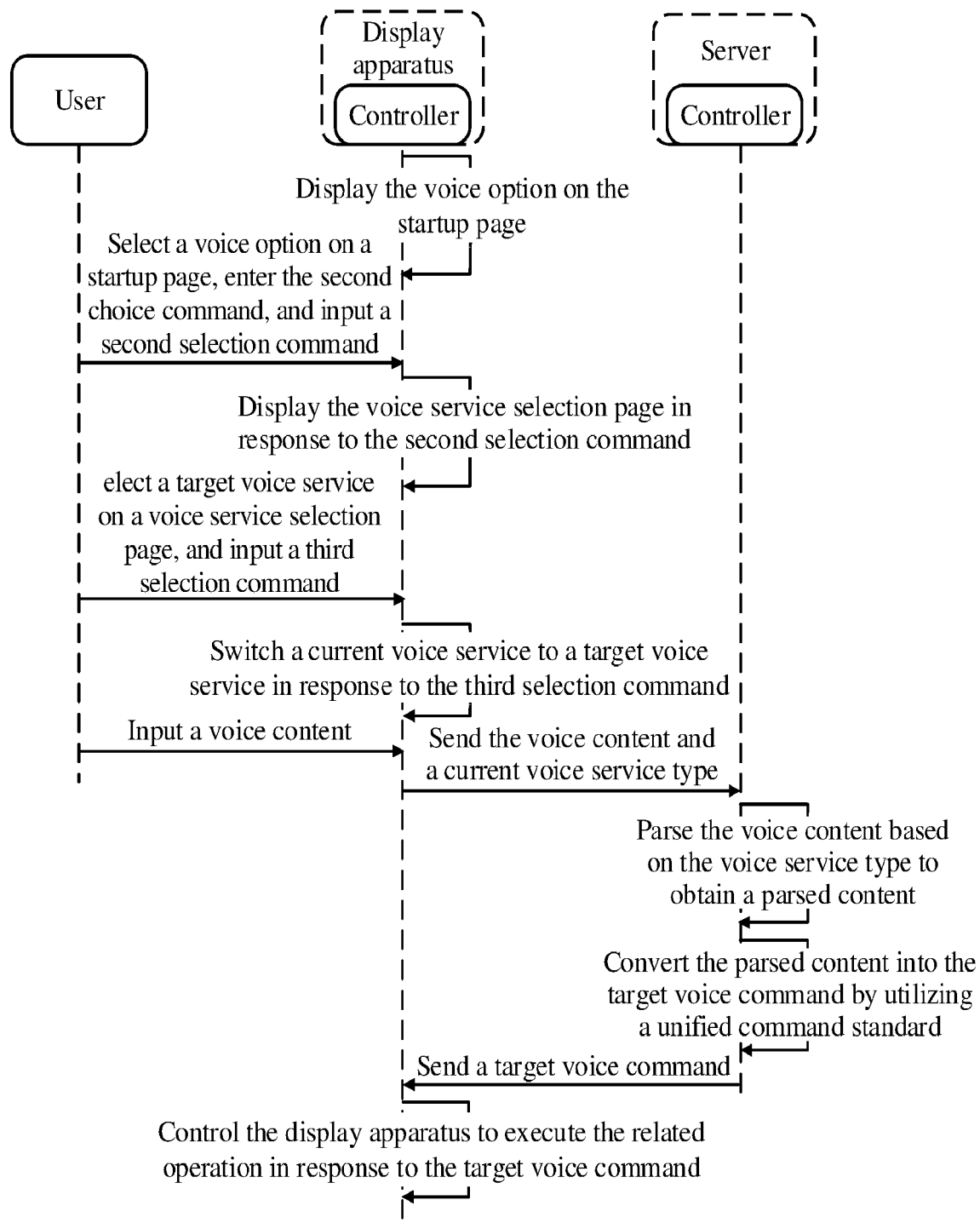
FIG. 56 shows a second processing flow diagram of a display apparatus 200 according to some embodiments of the present disclosure.

In this process, as shown in FIG. 56, the controller 250 of the display apparatus 200 may further be configured to: display the voice option shown in FIG. 55 on the startup page of the display apparatus 200. Then, the user selects the voice option on the startup page, that is, inputs a second selection command to the display apparatus 200, and the controller 250 controls a display 260 to display a voice service selection page in response to the second selection command. The user may continue to select a target voice service on the voice service selection page, that is, continue to input a third selection command to the display apparatus 200, and the controller 250 continues to switch the voice service currently used by the display apparatus 200 to the target voice service selected by the user in response to the third selection command.

After the display apparatus 200 sets the voice service, as shown in FIG. 56, the user may input the voice content to the display apparatus 200 again in the scenario of the current target voice service, then the controller 250 of the display apparatus 200 sends the voice content and a type of the target voice service together to the server 400, and the server 400 continues processing.

Figure 57:
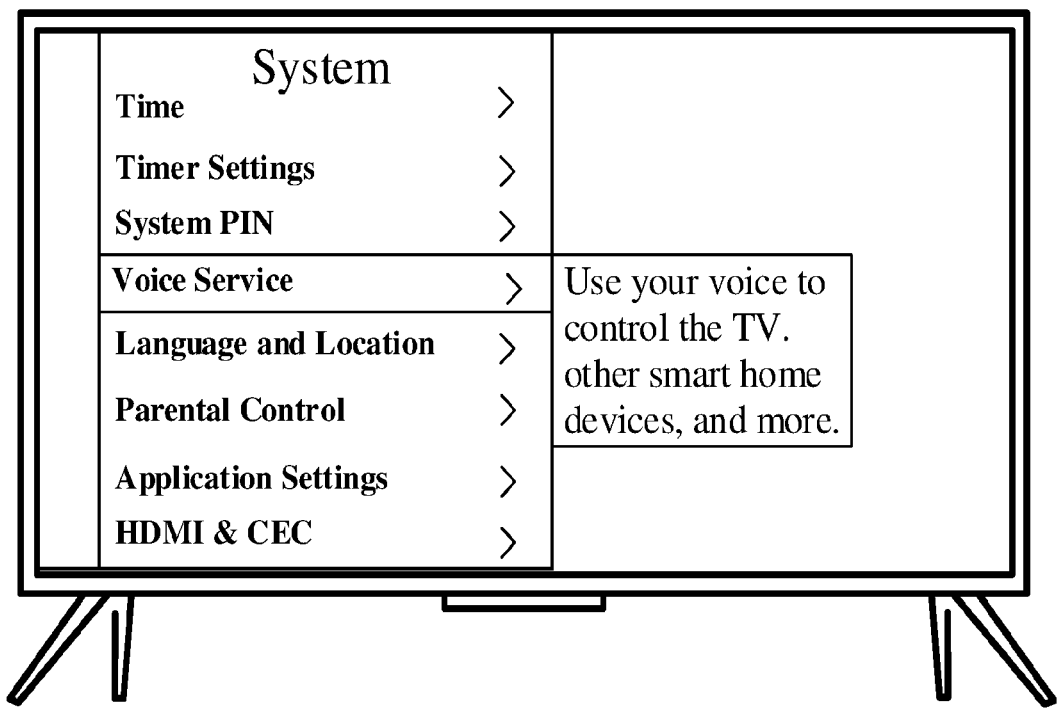
FIG. 57 shows a schematic diagram of a setting page according to some embodiments of the present disclosure.

In some embodiments, the setting page of the display apparatus 200 is shown in FIG. 57. Taking a "System" page as an example, which includes several function setting items, such as "Time", "Timer Settings", "System PIN", "Parental Control", "Language and Location", "Voice Service", "Application Settings", "HDMI & CEC", etc. The user may select a Voice Service setting item on the setting page, and then control the display apparatus 200 to display the voice service selection page. And when a focus frame lands on the Voice Service setting item, the corresponding prompt content will also be displayed on the setting page, such as "Use your voice to control the TV, other smart home devices, and more.

Figure 58:
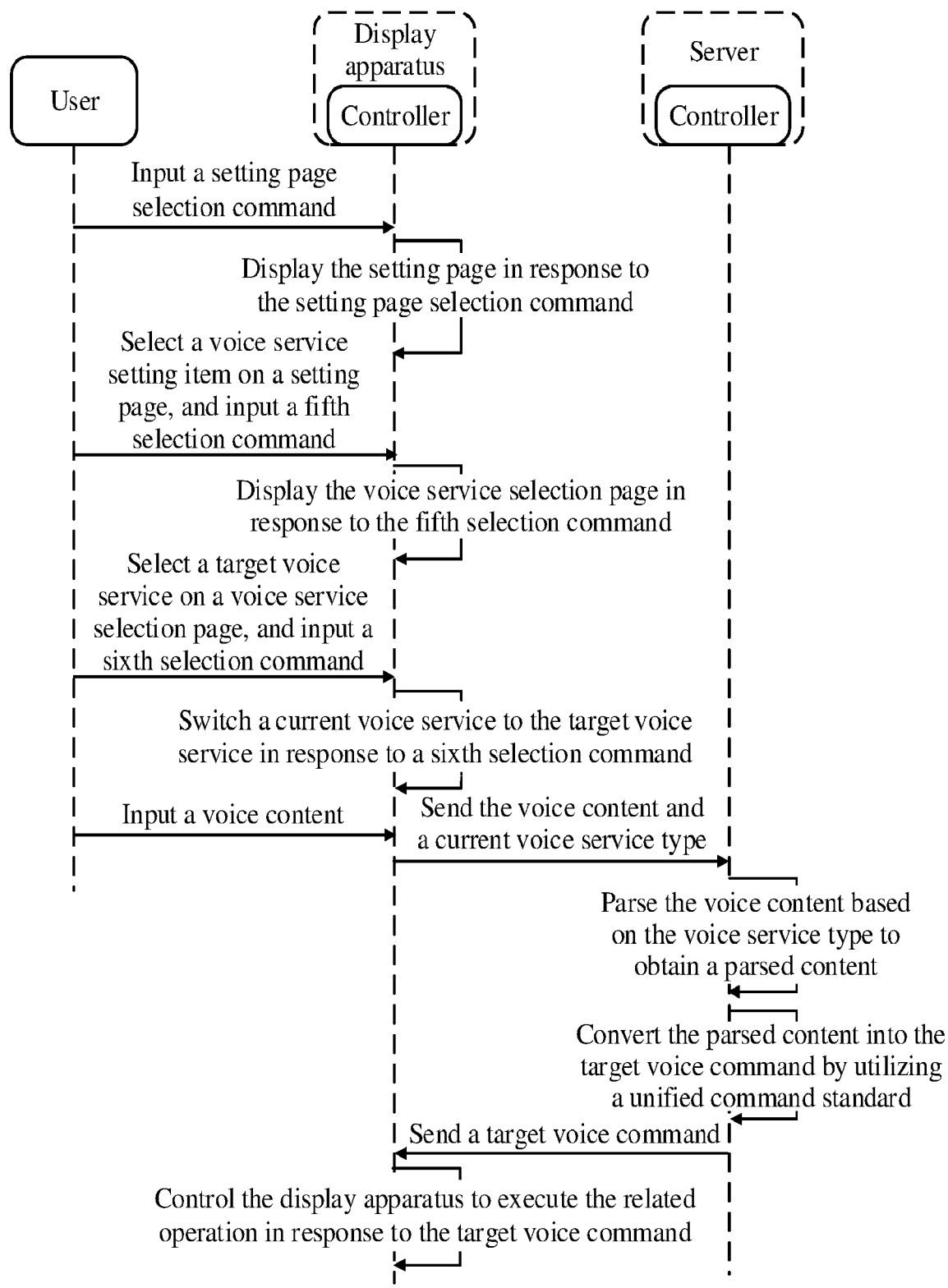
FIG. 58 shows a third processing flow diagram of a display apparatus 200 according to some embodiments of the present disclosure.

In this process, as shown in FIG. 58, the controller 250 of the display apparatus 200 may further be configured to: control the display 260 to display a setting page in response to a setting page selection command input from the user. Then, the user selects a voice service setting option on the setting page, that is, inputs a fifth selection command to the display apparatus 200, and the controller 250 controls the display 260 to display the voice service selection page in response to the fifth selection command. The user continues to select a target voice service on the voice service selection page, that is, inputs a sixth selection command to the display apparatus 200, and the controller 250 switches the voice service currently used by the display apparatus 200 to the target voice service in response to the sixth selection command.

After the display apparatus 200 sets the voice service, as shown in FIG. 58, the user may input the voice content to the display apparatus 200 again in the scenario of the current target voice service, then the controller 250 of the display apparatus 200 sends the voice content and the type of the target voice service together to the server 400, and the server 400 continues processing.

In some embodiments, the control device 100 associated with the display apparatus 200 may further configured with a voice service function key, and the user may control the display apparatus 200 to directly display the voice service selection page by pressing the function key on the control device 100.

Figure 59:
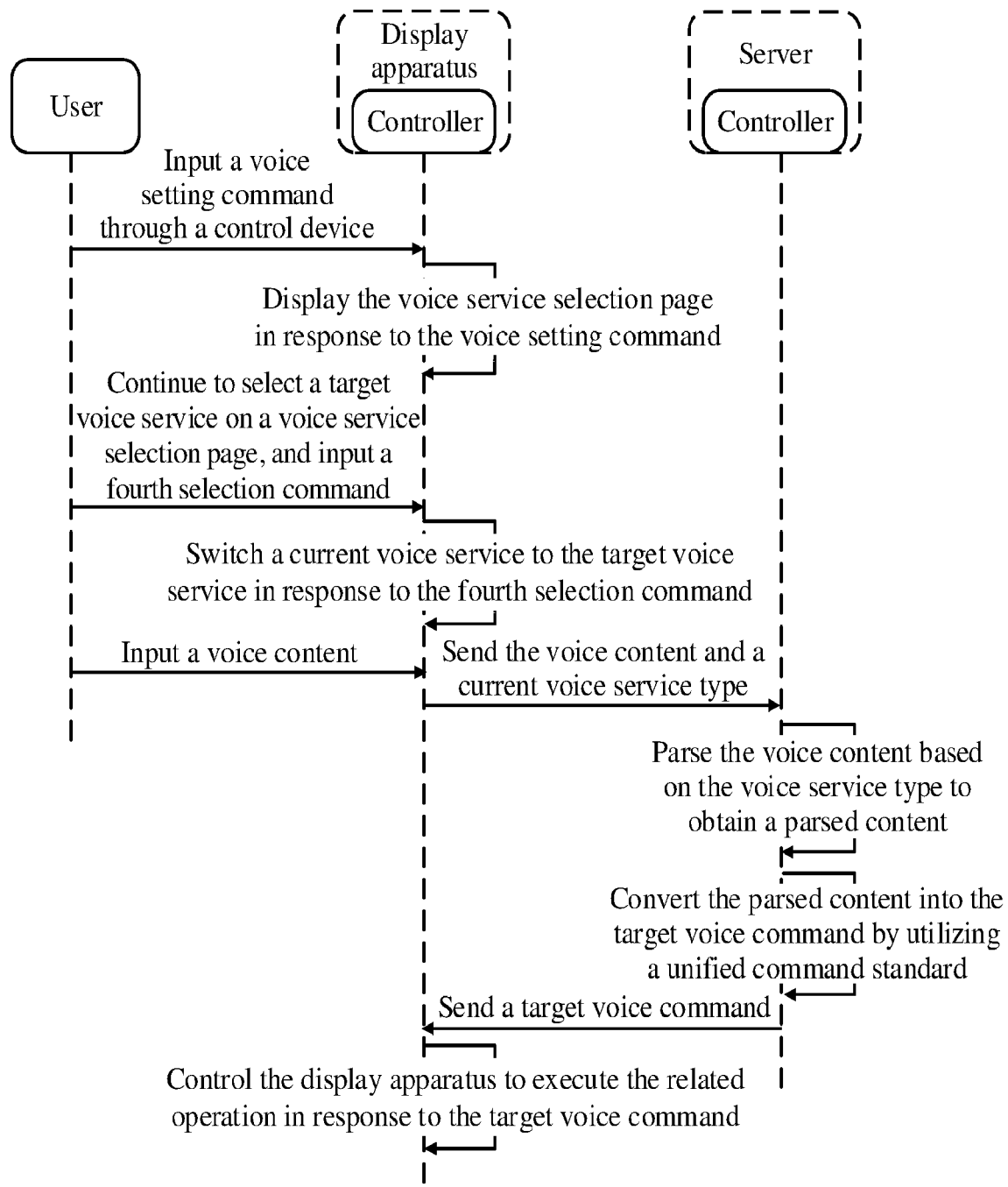
FIG. 59 shows a fourth processing flow diagram of a display apparatus 200 according to some embodiments of the present disclosure.

In this process, as shown in FIG. 59, the controller 250 of the display apparatus 200 may further be configured to: control the display 260 to directly display the voice service selection page in response to a voice setting command input from the user through the control device 100. The voice setting command is a command issued from the user by pressing the above voice service function key. Then the user may continue to select a target voice service on the voice service selection page, that is, inputs a fourth selection command to the display apparatus 200, and the controller 250 switches the voice service currently used by the display apparatus 200 to the target voice service in response to the fourth selection command.

After the display apparatus 200 sets the voice service, as shown in FIG. 59, the user may input the voice content to the display apparatus 200 again in the scenario of the current target voice service, then the controller 250 of the display apparatus 200 sends the voice content and the type of the target voice service together to the server 400, and the server 400 continues processing.

Figure 60:
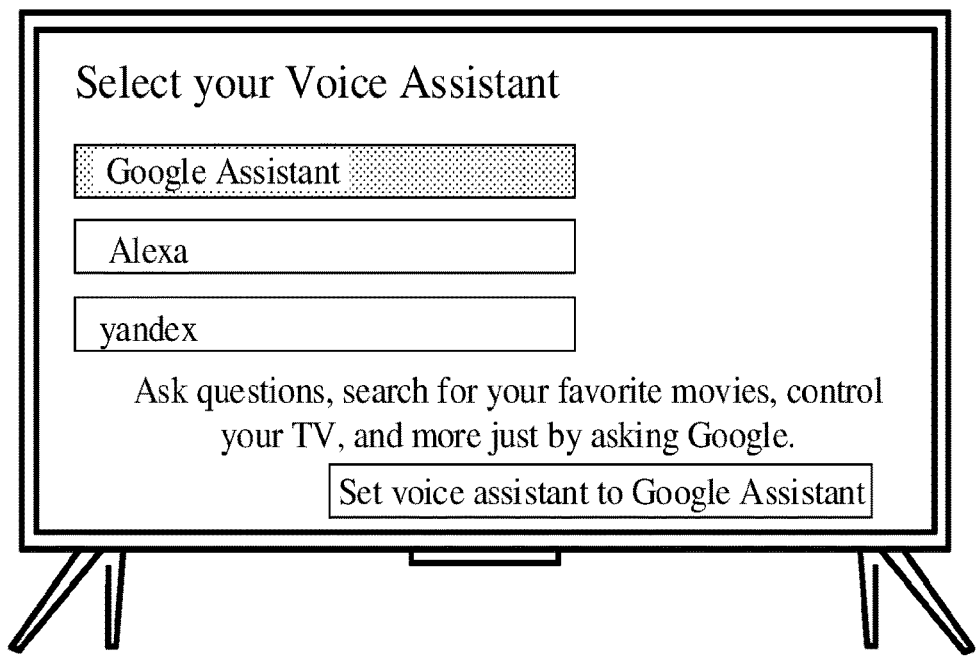
FIG. 60 shows a second schematic diagram of a voice service selection page according to some embodiments of the present disclosure.

FIG. 60 shows a second schematic diagram of the voice service selection page according to some embodiments of the present disclosure. As shown in FIG. 60, the voice service selection page shows three voice services, such as "Google Assistant", "amazon alexa", and "yandex". Furthermore, there are further prompt contents for prompting the user to make a selection "Ask questions, search for your favorite movies, control your TV, and more just by asking Google.". There is also a confirmation option on the voice service selection page and a prompt for "Set voice assistant to Google Assistant".

Figure 61:
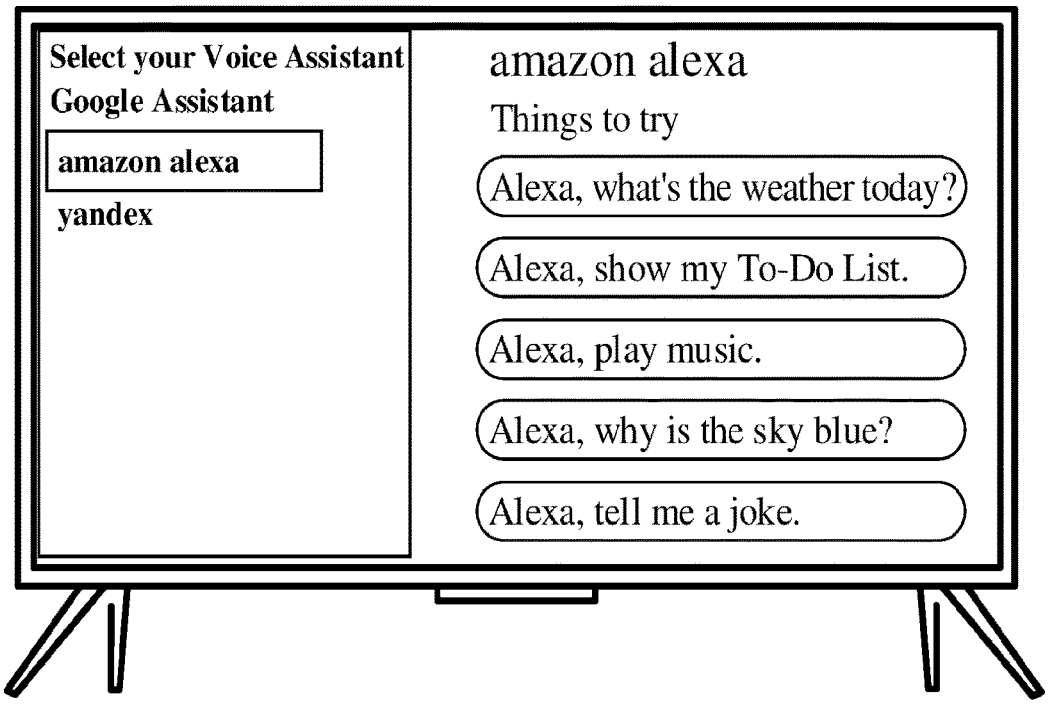
FIG. 61 shows a third schematic diagram of a voice service selection page according to some embodiments of the present disclosure.

FIG. 61 shows a third schematic diagram of the voice service selection page according to some embodiments of the present disclosure. As shown in FIG. 61, when a focus frame lands on "amazon alexa" voice service option, some voice content prompts will further be displayed on the right side of the page, such as "Alexa, what's the weather today?", "Alexa, show my To-Do List.", "Alexa, play music.", "Alexa, why is the sky blue?", "Alexa, tell me a joke." etc.

The voice service selection page described in the foregoing embodiments may all adopt the content shown in FIG. 60 or FIG. 61. After the user selects the target voice service on the voice service selection page, the display apparatus 200 may switch a voice service used by a current system to the target voice service.

Usually, most display apparatuses 200 require registration of a local voice function before using the voice service, so as to ensure that the display apparatus 200 collects the user's voice content reasonably and legally, and further ensure the legitimacy and security of the voice service. After the voice function is registered, the voice service may enhance the accuracy of semantic identification or content identification according to historical needs of the user, so that the user may use the voice service more conveniently.

In some embodiments, the display apparatus 200 further needs to detect whether the voice function is registered on the display apparatus 200 before the user selects the voice service. For example, after the user selects the voice option on the above startup page, the display apparatus 200 can detect whether the voice function thereon is registered, or activated. In this process, the controller 250 of the display apparatus 200 is configured to: detect whether the voice function on the display apparatus 200 is registered after receiving the second selection command. And in a case that the voice function is not registered, the controller 250 controls the display 260 to display a voice registration page, so that the user completes a voice registration operation. In addition, in a case that the voice function is registered, the controller 250 may control the display 260 to directly display the voice service selection page.

Alternatively, after the user presses the voice service function key of the above control device 100, the display apparatus 200 also detects whether the voice function thereon is registered or activated before displaying the voice service selection page. In this process, the controller 250 of the display apparatus 200 is configured to: detect whether the voice function on the display apparatus 200 is registered after receiving a voice setting command. And in the case that the voice function is not registered, the controller 250 controls the display 260 to display the voice registration page, so that the user completes the voice registration operation. In addition, in the case that the voice function is registered, the controller 250 may control the display 260 to directly display the voice service selection page.

Alternatively, after the user selects the voice service setting option on the above setting page, the display apparatus 200 also detects whether the voice function thereon is registered or activated before displaying the voice service selection page. In this process, the controller 250 of the display apparatus 200 is further configured to: detect whether the voice function on the display apparatus 200 is registered after receiving a fifth selection command. And in the case that the voice function is not registered, the controller 250 controls the display 260 to display the voice registration page, so that the user completes the voice registration operation. In addition, in the case that the voice function is registered, the controller 250 may control the display 260 to directly display the voice service selection page.

It can be seen that the display apparatus 200 in the above embodiment of the present disclosure can not only provide the user with an entry of various voice service selection pages, but also parse and respond to the target voice command sent back by the server 400. Since the server 400 may generate a voice command that conforms to one command standard, the display apparatus 200 only needs to process one voice command, and there is no need to add various processing codes for various voice commands, thereby reducing the amount of codes and reducing the maintenance cost of the display apparatus 200.

The display apparatus 200 may identify the voice content input from the user through a voice service provider, etc., and use a voice technology to analyze the identified content, understand the real purpose of the user, and then realize the non-manual control of the display apparatus 200 to improve the user experience.

At present, the voice function on the display apparatus 200 may realize operations such as searching for content, switching channels, and controlling the volume. However, in terms of channel processing, a voice parsing technology supported by the display apparatus 200 is relatively simple. When the input voice content contains a channel name, the server 400 for identifying the voice content will issue a switching command to the display apparatus 200 uniformly to control the display apparatus 200 to switch directly to the target channel, regardless of whether the purpose of the user inputting the voice content is to switch the channels or search for the channels. For example, if the user inputs the voice content of "search for tv1" to the display apparatus 200, since the voice content contains "tv1", the display apparatus 200 will directly switch the display content to the content of a "tv1" channel under the control of the server 400 instead of searching for the "tv1" channel according to the user needs.

It can be seen that the switching command generated after semantic identification based on the server 400 does not fully meet the real intention of the user, and the actions executed by the display apparatus 200 in response to the switching command are also difficult to fully meet the user needs, which affects the use experience of the user.

An embodiment of the present disclosure provides a display apparatus 200. Even if the server 400 uniformly issues a switching command, the display apparatus 200 may also adjust a channel switching operation and a channel searching operation according to its own application running conditions, instead of being just in response to the switching command, and a situation that the switching command is inconsistent with the user intention is avoided.

The display apparatus 200 in the embodiment of the present disclosure may be provided with a voice component or a voice receiving device for collecting the voice content.

Figure 62:
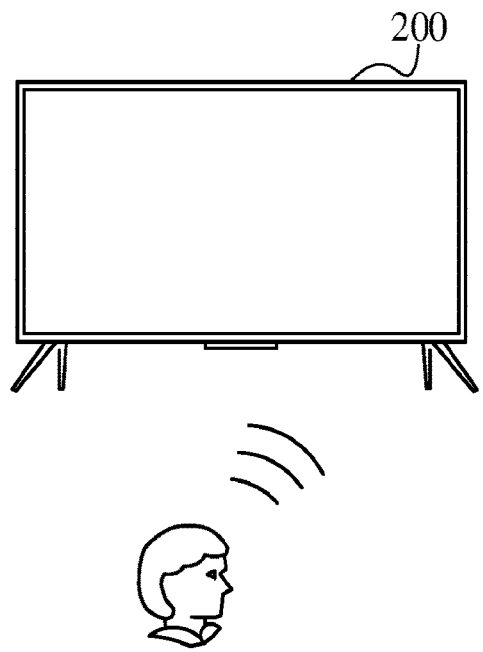
FIG. 62 is a schematic diagram for showing interaction between a user and a display apparatus 200 with a voice component according to some embodiments of the present disclosure.

Referring to FIG. 62, which shows a schematic diagram of interaction of a display apparatus 200 with a voice component and a user according to some embodiments. The user may directly input the voice content to the display apparatus 200, for example, say "Teleplay XX" to the display apparatus 200.

Figure 63:
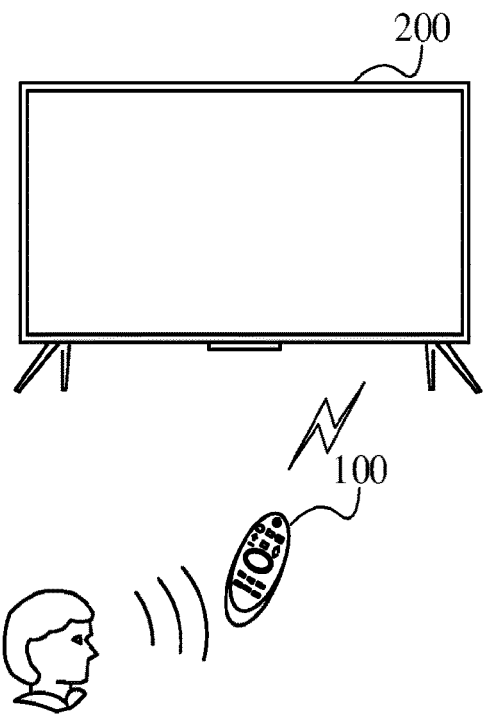
FIG. 63 is a schematic diagram for showing interaction between a user, a control device 100 with a voice component and a display apparatus 200 according to some embodiments of the present disclosure.

Alternatively, the display apparatus 200 in the embodiment of the present disclosure may further be connected with a control device 100 such as a remote control via Bluetooth, and the control device 100 is provided with a voice mode or a voice receiving module or device for collecting the voice content. Referring to FIG. 63, which shows a schematic diagram of interaction of the control device 100 with the voice component and the display apparatus 200 as well as the user according to some embodiments of the present disclosure. The user may input the voice content to the control device 100, and the control device 100 sends the voice content to the display apparatus 200.

After receiving the voice content input from the user, the display apparatus 200 will first send the voice content to the server 400 for content recognition, and then the server 400 analyzes the user intention to generate an instruction for the display apparatus 200, namely, a voice reply.

For example, if the voice content input from the user is "Teleplay XXX", then the server 400 may determine that the user intention is to search for relevant resources of the Teleplay XXX through content recognition and semantic analysis; or, the voice content input from the user is "Adjust the volume to 10", then the server 400 may determine that the user intention is to adjust the volume through content recognition and semantic analysis.

After the server 400 generates the voice reply, the voice reply is issued to the display apparatus 200 for controlling the display apparatus 200 to execute specific operations. For example, the display apparatus 200 is controlled to search for resources related to the Teleplay XXX among all the current resources; or, the display apparatus 200 is controlled to adjust the current volume to 10.

Figure 64:
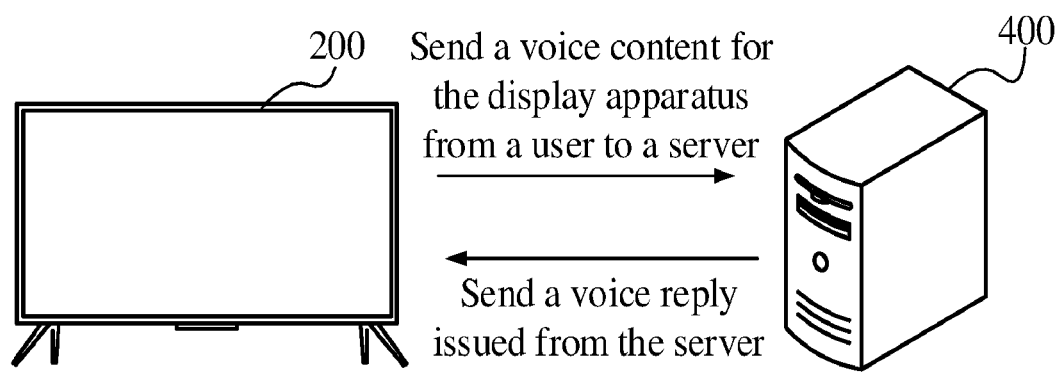
FIG. 64 is a schematic diagram for showing interaction between a display apparatus 200 and a server 400 according to some embodiments of the present disclosure.

Referring to FIG. 64, which shows a schematic diagram of interaction between the display apparatus 200 and the server 400 according to some embodiments. In the display apparatus 200, the controller 250 executes a specific operation process, and further, in the above interaction process of the display apparatus 200 and the server 400, the controller 250 of the display apparatus 200 may be configured to: send the voice content for the display apparatus from the user to the server; and obtain a voice reply issued from the server 400.

It can be known that when the server 400 identifies that the voice content includes a channel name, the switching command will be uniformly generated regardless of the user intention. For voice content containing other contents, the server 400 will normally generate the corresponding voice commands. Based on this, in the embodiment of the present disclosure, the voice commands generated by the server 400 may be roughly classified into the switching command, a parameter adjustment command, a resource search command and the like. When the server 400 identifies that the voice content includes the channel name, the switching command for switching to the target channel may be generated according to the voice content.

Since the server 400 may accurately generate the parameter adjustment command and the resource search command according to the voice content, the display apparatus 200 may accurately perform parameter adjustment or search for related resources according to the parameter adjustment command or the resource search command.

Regardless of whether the voice content about the channel input from the user is to switch the channel or to search for the channel, the server 400 uniformly generates the switching command. The switching command does not fully conform to true intention of the user, especially when the display apparatus 200 is running a certain application and the user wants to search for the target channel, the display apparatus 200 will still be switched to the target channel within the application in response to the switching command. If the application does not provide the target channel, neither the display apparatus 200 nor the application will respond, and it is difficult for the user to get feedback on whether the target channel is searched.

In some embodiments, after detecting that the voice command received is a switching command, the display apparatus 200 further needs to detect the running status of its own application, that is, detect whether an application is currently running. If there is an application running, the display apparatus 200 needs to convert the switching command to the channel searching command, and then, search for the target channel in the currently running application in response to the channel searching command. If no application is running, the display apparatus 200 may directly find the target channel among all the channels provided by itself, and switch to the target channel for play.

For example, when the user inputs a voice command "Search for channel a" to the display apparatus 200, the server 400 will generate a switching command 1 for switching a channel a according to the content of the "search for channel a", and issue the switching command 1 to the display apparatus 200. If the display apparatus 200 detects that an application A is currently running, the display apparatus 200 switches the switching command 1 to a channel searching command for searching the channel a, and then searches for the channel a in the application A in response to the channel searching command. If the display apparatus 200 detects there is no application running currently, then the display apparatus 200 is directly switched to the channel a and plays the content provided by channel a.

Alternatively, when the user inputs a voice command "Switch channel a" to the display apparatus 200, the server 400 will generate a switching command 2 for switching to the channel a according to the content of the "Switch channel a", and issue the switching command 2 to the display apparatus 200. If the display apparatus 200 detects that the application A is currently running, the display apparatus 200 switches the switching command 2 to the channel searching command for searching the channel a, and then searches the channel a in the application A in response to the channel searching command. If the display apparatus 200 detect there is no application currently running, then the display apparatus 200 is directly switched to the channel a and plays the content provided by channel a.

In some embodiments, the channels provided by the display apparatus 200 itself may include channels provided through various signal sources or channels that some applications may share with the display apparatus 200 for use.

When the display apparatus 200 runs the application, if the operation of searching for the channels is executed, the display apparatus 200 further needs to display prompt information to the user when the search operation is executed, so that the user knows the current processing of the display apparatus 200.

What is claimed is:
1. A display apparatus, comprising:
a display;

a control device configured to control the display apparatus and comprising a power key and a shortcut key for voice control;

a voice receiving device configured for receiving voice content from a user; and a controller, in connection with the display, the control device and the voice receiving device and configured to:

in response to a starting command for starting the display apparatus from the user, determine a starting manner of the starting command, wherein the starting manner comprises starting via the power key on a remote control, starting via the shortcut key for voice control and starting via the voice receiving device;

in response to the starting manner being starting via the power key, present first prompt information for indicating starting the display apparatus via voice control;

in response to the starting manner being starting via the shortcut key, present second prompt information for indicating starting the display apparatus via a voice control manner different from a current starting manner; and in response to the starting manner being starting via the voice receiving device, present no prompt information for indicating interaction via voice control;

wherein the controller is further configured to:

in response to a first selection command for selecting a target channel from the user, move a focus to an item bar to which the target channel belongs;

in response to a modification command for modifying a channel name of the target channel, modify an original name of the target channel in the item bar to a user-defined target name;

in response to a first confirmation command for the item bar, control the display to present an input box at the channel name in the item bar;

in response to a second confirmation command after inputting the target name in the input box, control the display to present the target name as the channel name of the target channel;

store the target name and the original name of the target channel both in correspondence with the target channel, wherein the target name is configured for facilitating voice control;

receive a voice command for searching a first channel, and send the voice command to a server; and receive a channel switch command for switching to the first channel from the server and determine whether an application is running in the display apparatus based on the channel switch command.

2. The display apparatus according to claim 1, wherein the controller is further configured to:

read a key code sent from the remote control to determine the starting manner of the starting command.

3. The display apparatus according to claim 1, wherein the controller is further configured to:

in response to a far-field switch in the display apparatus being on, present prompt information for indicating the far-field switch being on as the first prompt information; and in response to the far-field switch in the display apparatus being off, present prompt information for indicating the far-field switching being off as the second prompt information and an extension control for guiding the user to turn on the far-field switch.

4. The display apparatus according to claim 1, wherein the controller is further configured to:

in response to the application being running in the display apparatus, convert the channel switch command to a channel search command for searching the first channel, and search for the first channel in the application in response to the channel search command; and in response to no application being running in the display apparatus, directly switch to the first channel and play content provided by the first channel.

5. A display method for a display apparatus, comprising:

in response to a starting command for starting the display apparatus from a user, determining a starting manner of the starting command, wherein the display apparatus comprises a remote control with a power key and a shortcut key for voice control and a voice receiving device configured for receiving voice content from a user, the starting manner comprises starting via a power key on a remote control, starting via a shortcut key for voice control and starting via a voice receiving device;

in response to the starting manner being starting via the power key, presenting first prompt information for indicating starting the display apparatus via voice control;

in response to the starting manner being starting via the shortcut key, presenting second prompt information for indicating starting the display apparatus via a voice control manner different from a current starting manner; and in response to the starting manner being starting via the voice receiving device, presenting no prompt information for indicating interaction via voice control;

wherein the display method further comprises:

in response to a first selection command for selecting a target channel from the user, moving a focus to an item bar to which the target channel belongs;

in response to a modification command for modifying a channel name of the target channel, modifying an original name of the target channel in the item bar to a user-defined target name;

in response to a first confirmation command for the item bar, controlling the display to present an input box at the channel name in the item bar;

in response to a second confirmation command after inputting the target name in the input box, controlling the display to present the target name as the channel name of the target channel;

storing the target name and the original name of the target channel both in correspondence with the target channel, wherein the target name is configured for facilitating voice control;

receiving a voice command for searching a first channel, and sending the voice command to a server; and receiving a channel switch command for switching to the first channel from the server and determining whether an application is running in the display apparatus based on the channel switch command.

6. The display method according to claim 5, further comprising:

reading a key code sent from the remote control to determine the starting manner of the starting command.

7. The display method according to claim 5, further comprising:

in response to a far-field switch in the display apparatus being on, presenting prompt information for indicating the far-field switch being on as the first prompt information; and in response to the far-field switch in the display apparatus being off, presenting prompt information for indicating the far-field switching being off as the second prompt information and an extension control for guiding the user to turn on the far-field switch.

8. The display method according to claim 5, further comprising:
   in response to the application being running in the display apparatus, converting the channel switch command to a channel search command for searching the first channel, and searching for the first channel in the application in response to the channel search command; and
   in response to no application being running in the display apparatus, directly switching to the first channel and play content provided by the first channel.

9. A non-transitory computer storage medium, wherein the computer storage medium stores computer instructions which are configured to cause the computer to:
   in response to a starting command for starting a display apparatus from a user, determine a starting manner of the starting command, wherein the starting manner comprises starting via the power key on a remote control, starting via a shortcut key for voice control and starting via a voice receiving device;
   in response to the starting manner being starting via the power key, present first prompt information for indicating starting the display apparatus via voice control;
   in response to the starting manner being starting via the shortcut key, present second prompt information for indicating starting the display apparatus via a voice control manner different from a current starting manner;
   in response to the starting manner being starting via the voice receiving device, present no prompt information for indicating interaction via voice control;
   in response to a first selection command for selecting a target channel from the user, move a focus to an item bar to which the target channel belongs;
   in response to a modification command for modifying a channel name of the target channel, modify an original name of the target channel in the item bar to a user-defined target name;
   in response to a first confirmation command for the item bar, control the display to present an input box at the channel name in the item bar;
   in response to a second confirmation command after inputting the target name in the input box, control the display to present the target name as the channel name of the target channel;
   store the target name and the original name of the target channel both in correspondence with the target channel, wherein the target name is configured for facilitating voice control;
   receive a voice command for searching a first channel, and send the voice command to a server; and
   receive a channel switch command for switching to the first channel from the server and determine whether an application is running in the display apparatus based on the channel switch command.

* * * * *